United States Patent [19]
Arsenault et al.

[11] Patent Number: 5,224,457
[45] Date of Patent: Jul. 6, 1993

[54] DUAL FUEL ELECTRONIC CONTROL SYSTEM

[75] Inventors: Jeff Arsenault, Toronto; Wendelin Goetz, Kitchener; James Larocque, Eden Mills, all of Canada

[73] Assignee: Deere & Company, Moline, Ill.

[21] Appl. No.: 843,771

[22] Filed: Feb. 28, 1992

[51] Int. Cl.$^5$ ............................................. F02M 21/02
[52] U.S. Cl. .............................. 123/526; 123/27 GE; 123/577; 123/578
[58] Field of Search ................... 123/526, 27 GE, 525, 123/575, 577, 578

[56] References Cited

U.S. PATENT DOCUMENTS

| | | |
|---|---|---|
| Re. 26,145 | 1/1967 | Friddell . |
| 2,678,030 | 5/1954 | Bader et al. ............... 123/27 GE |
| 2,744,511 | 5/1956 | Kauffmann et al. ....... 123/27 GE |
| 3,187,728 | 6/1965 | Friddell . |
| 4,278,064 | 7/1981 | Regueiro .................... 123/526 |
| 4,463,734 | 8/1984 | Akeroyd ..................... 123/526 |
| 4,499,885 | 2/1985 | Weissenbach et al. ..... 123/526 |
| 4,505,249 | 3/1985 | Young ........................ 123/577 |
| 4,517,928 | 5/1985 | Wolters ...................... 123/526 |
| 4,520,766 | 6/1985 | Akeroyd ..................... 123/577 |
| 4,520,785 | 6/1985 | Batchelor .................. 123/27 GE |
| 4,527,516 | 7/1985 | Foster . |
| 4,535,728 | 8/1985 | Batchelor . |
| 4,603,674 | 8/1986 | Tanaka ........................ 123/575 |
| 4,614,168 | 9/1986 | Batchelor . |
| 4,619,240 | 10/1986 | Bedford et al. ............ 123/27 GE |
| 4,637,353 | 1/1987 | Codrington . |
| 4,679,538 | 7/1987 | Foster . |
| 4,846,126 | 7/1989 | Stannard . |
| 4,865,001 | 9/1989 | Jensen . |
| 4,876,988 | 10/1989 | Paul et al. . |
| 4,909,209 | 3/1990 | Takahashi .................. 123/27 GE |
| 4,936,280 | 6/1990 | Langlois ..................... 123/578 |
| 4,953,515 | 9/1990 | Fehr et al. .................. 123/526 |
| 4,955,326 | 9/1990 | Helmich ..................... 123/577 |
| 5,092,305 | 3/1992 | King .......................... 123/27 GE |
| 5,117,802 | 6/1992 | Durbin ....................... 123/27 GE |
| 5,136,986 | 8/1992 | Jensen ........................ 123/27 GE |

FOREIGN PATENT DOCUMENTS

| | | | |
|---|---|---|---|
| 0048730 | 4/1977 | Japan ......................... 123/577 |
| 0029764 | 2/1984 | Japan ......................... 123/577 |

OTHER PUBLICATIONS

Xylinx, Inc., "The Programmable Gate Array Data Book", pp. 1-3 to 1-7, 1989.

Primary Examiner—E. Rollins Cross
Assistant Examiner—Erick Solis

[57] ABSTRACT

A dual fuel system for a diesel engine includes a liquid (diesel) fuel injection system controlled by an engine electronic control unit (ECU) and a source of gaseous fuel such as natural gas. A metering valve and a mixer controls introduction of gaseous fuel from the natural gas fuel source into combustion air for the engine. An electronic governor controls the metering valve and a link controller coordinates operation of the ECU and the governor. Preferably, a regulator regulates the natural gas pressure supplied to the metering valve. A shut-off valve controls communication of natural gas between the source and the regulator. The link controller also controls the shut-off valve as a function of sensed conditions.

7 Claims, 57 Drawing Sheets

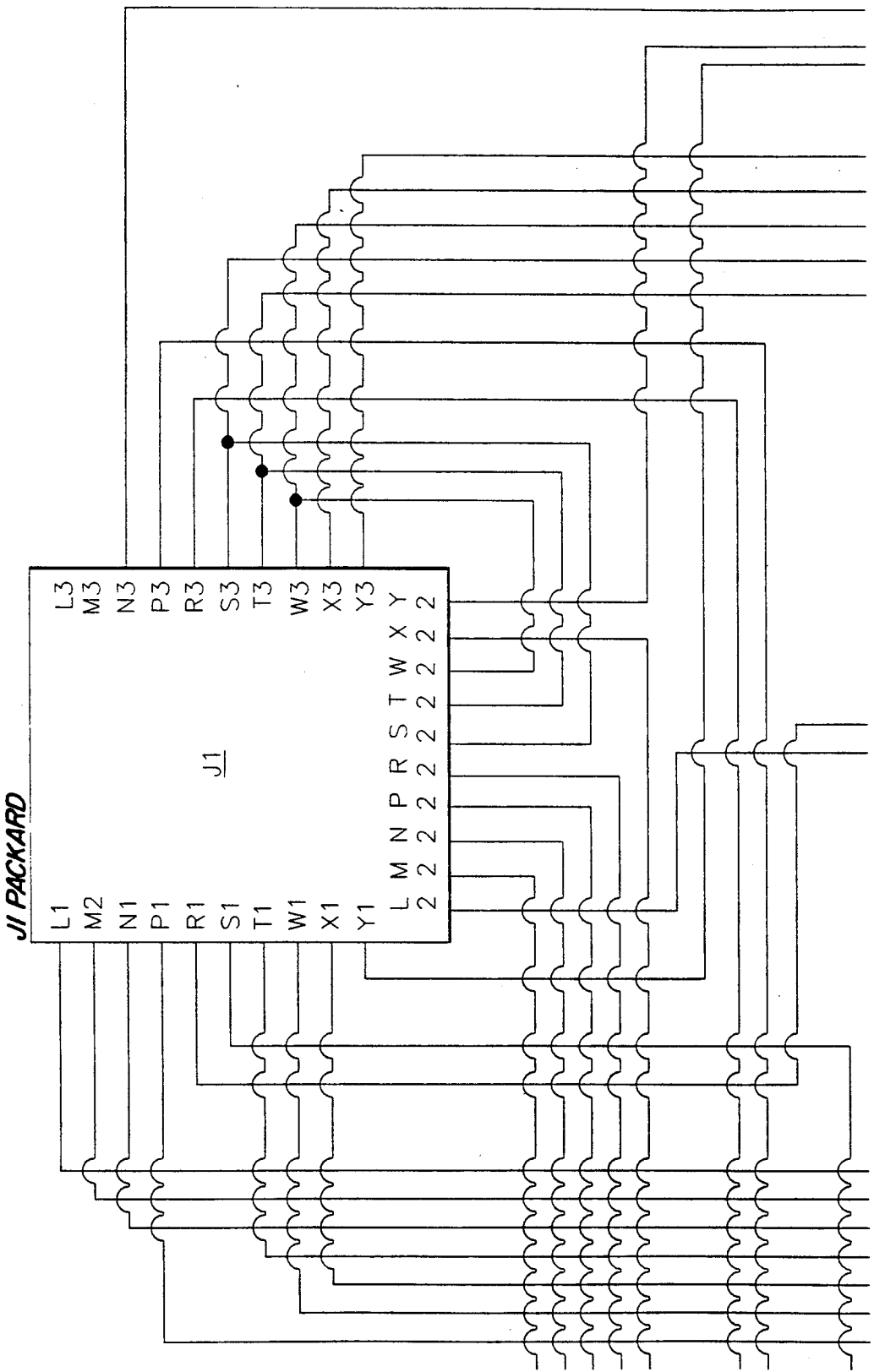

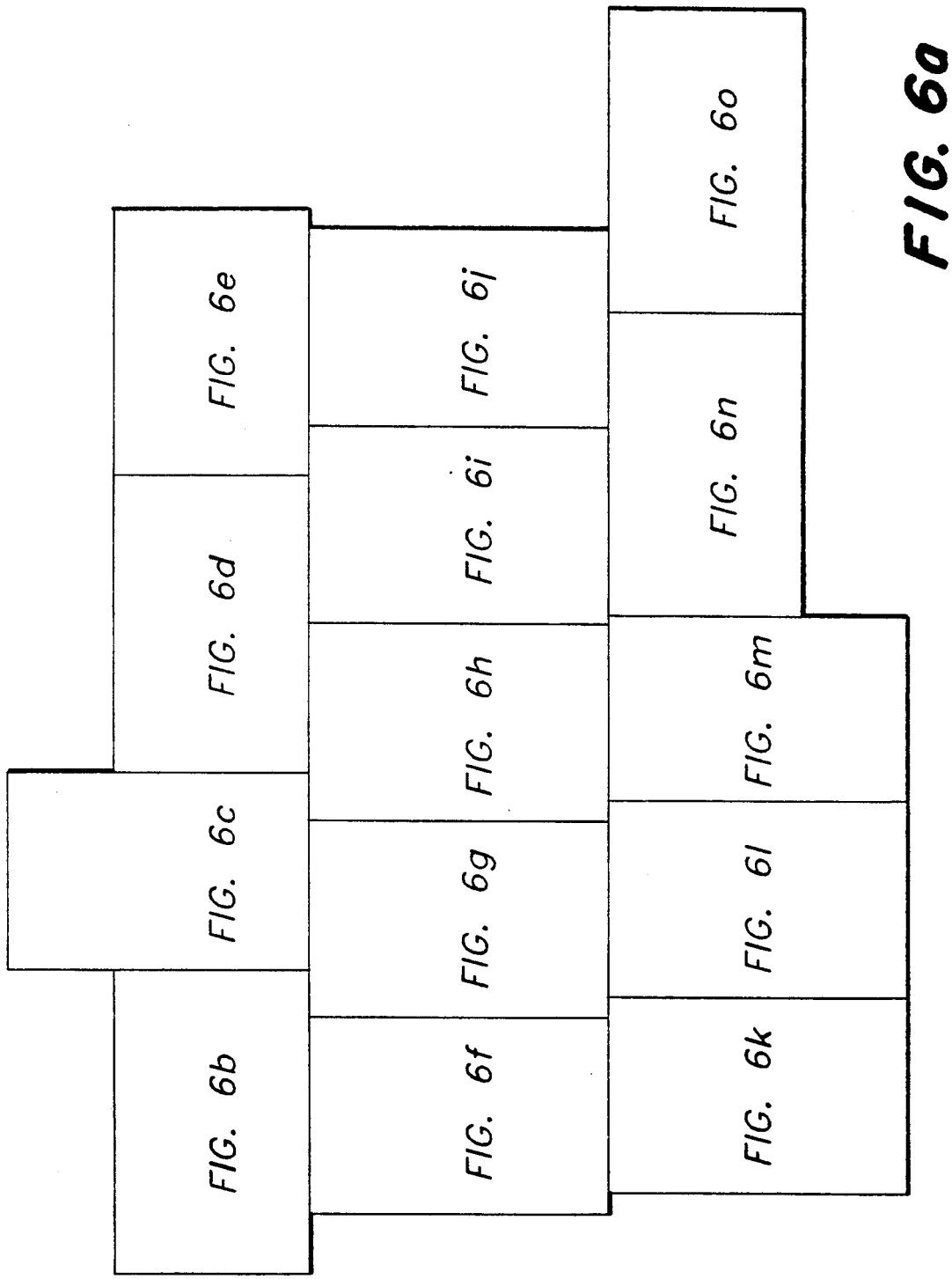

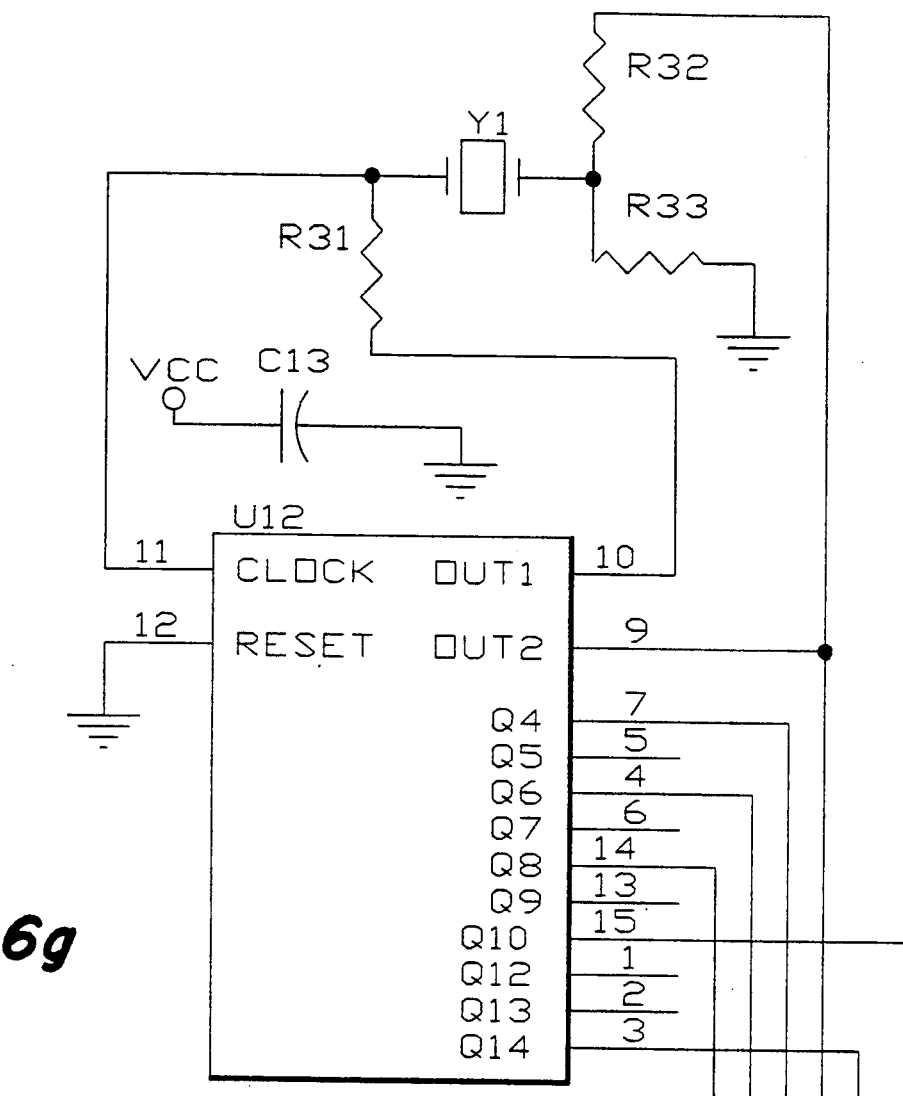
FIG. 6g
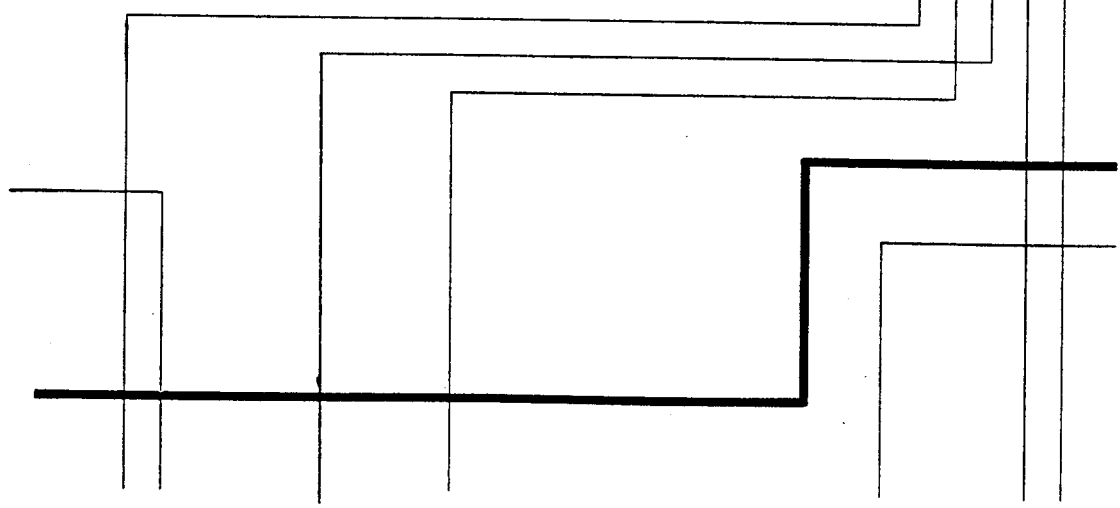

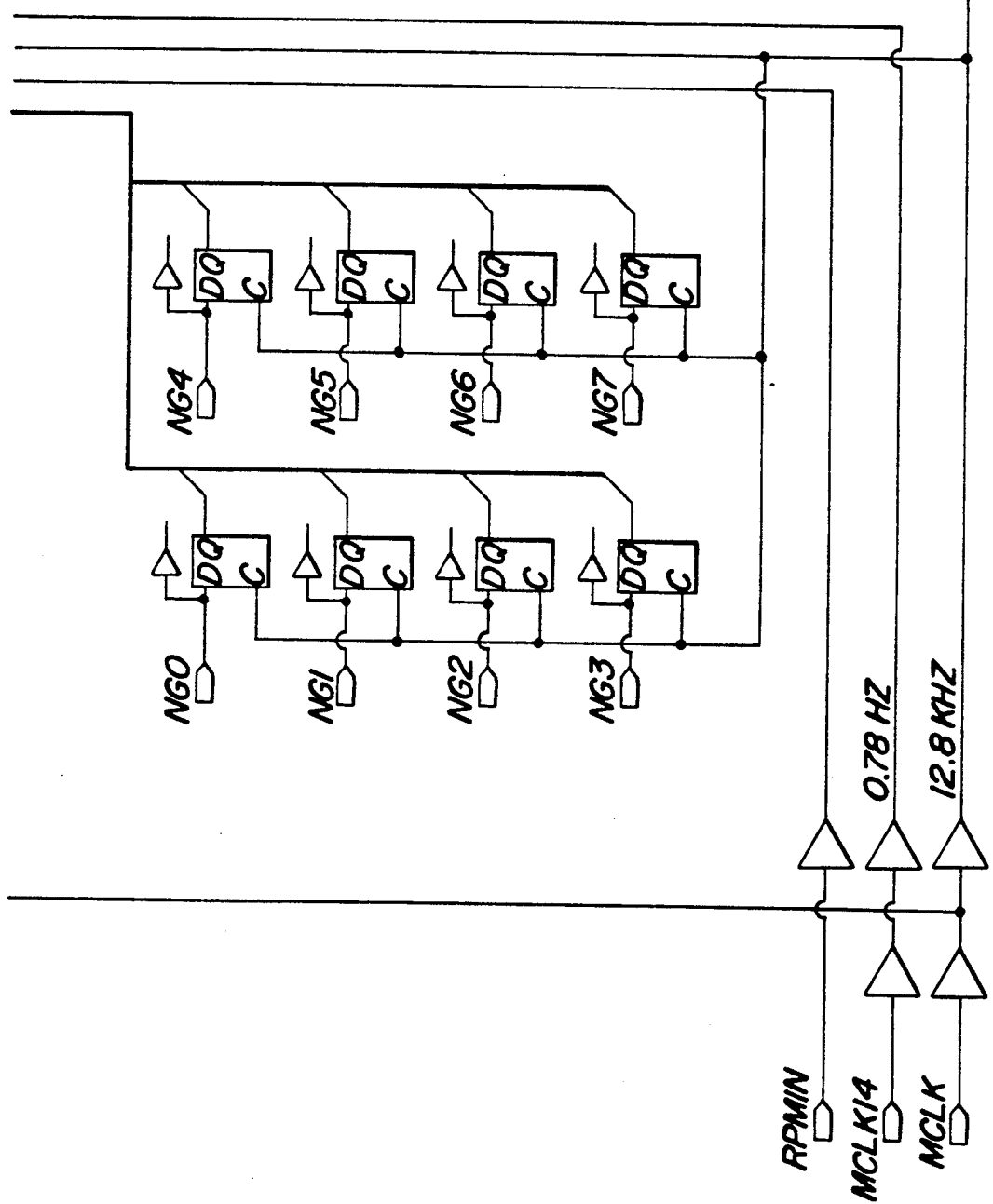

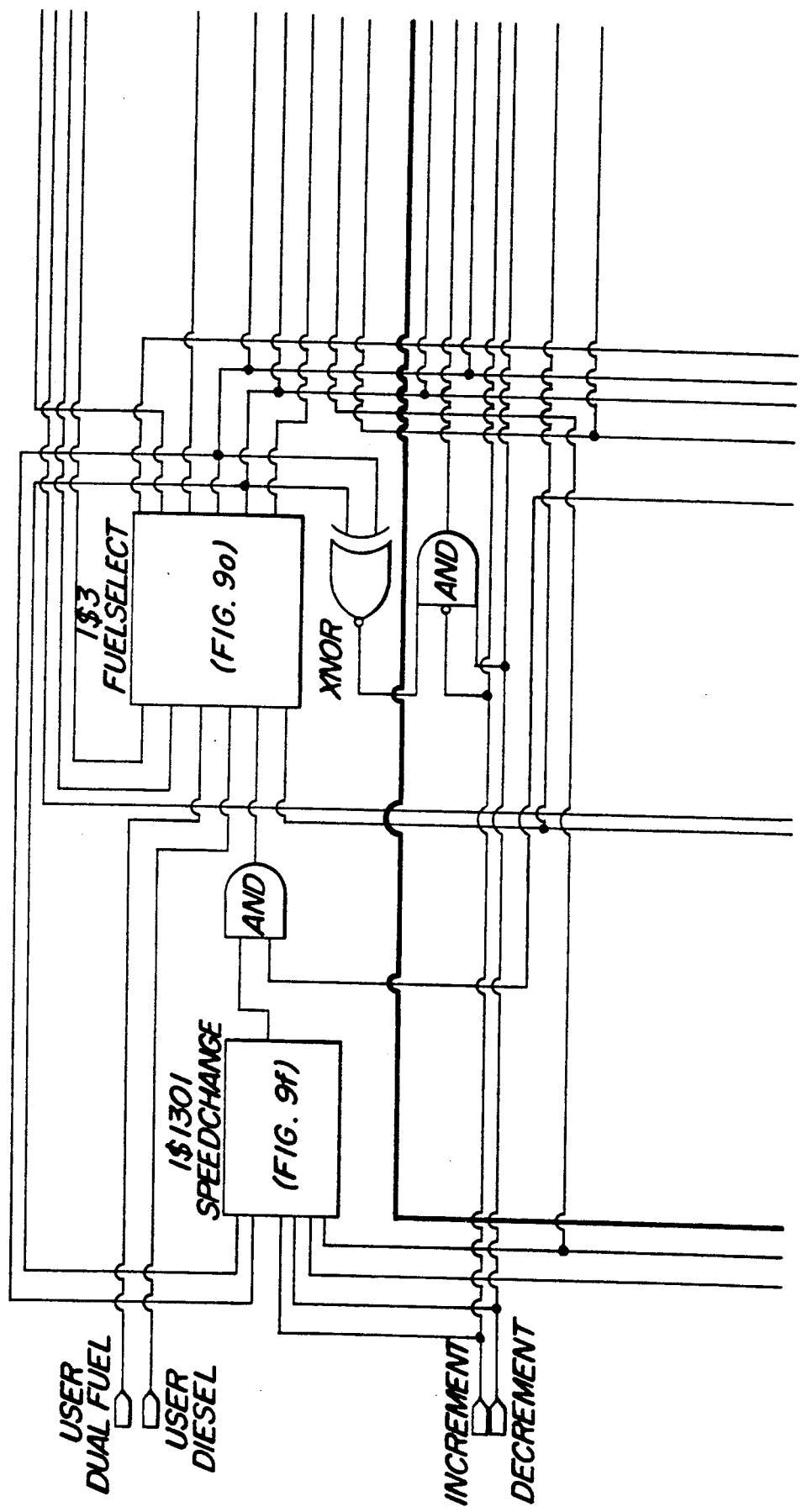

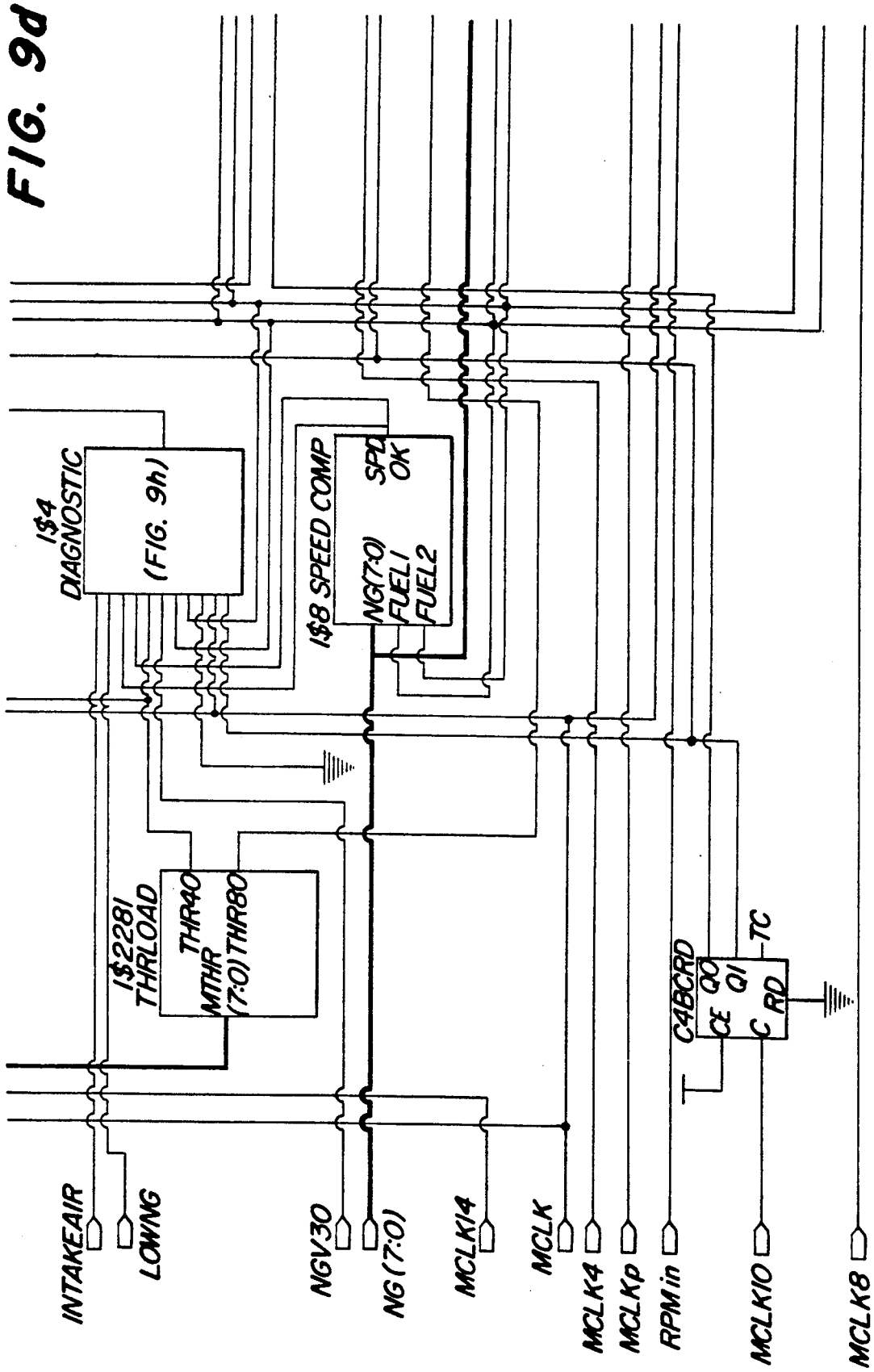

DUAL FUEL ELECTRONIC CONTROL SYSTEM

BACKGROUND OF INVENTION

The present invention relates to a system for selectively supplying a diesel engine with diesel fuel only or with a combination of diesel fuel and a gas fuel such as natural gas or propane, and for controlling operation of the engine in both fuel supply situations.

Dual fueled engines, using natural gas in the intake system and diesel pilot fuel to ignite the mixture, offer economic benefits with regard to lowering fuel costs. A stationary engine, used for irrigation or generator applications, offers high natural gas utilization due to its high load factor.

Currently available natural gas engine fumigation systems use mechanical means to meter the natural gas, such as either venturi valves in combination with pressure regulators or mechanically controlled throttle valves. These systems do not allow for precise metering over the engine operating range. In fact, such systems typically included mechanical governing or no governing at all, except venturi type mixers in the intake system. Such systems are not very accurate. As a result, the engine may be over-fueled and harmed or destroyed, or it may operate in an unsatisfactory manner. Additionally, such systems do not adjust diesel engine operation to optimize the use of natural gas. Furthermore, the user of such a system must decide if the engine should be run on dual fuel or on diesel. Also, such systems do not provide for safety shutdowns when using natural gas fuel.

SUMMARY OF INVENTION

An object of the present invention is to provide an electronic control system for a diesel engine which may be selectively supplied with diesel fuel or with a combination of diesel and natural gas fuels.

Another object of the present invention is to provide a link controller which links together a production mechanical/electronic diesel injection system with a production stationary isochronous electronic natural gas governing system.

Another object of the present invention is to provide such a link controller which incorporates safety shutdown features, and which controls operation on either diesel or dual fuel, depending on sensed input conditions.

Another object of the present invention is to provide such a link controller which allows maximum use of natural gas as a fuel for a diesel engine, ensuring that the engine is operated within accepted temperature and pressure limits.

These and other objects are achieved by the present invention wherein a dual fuel system for a diesel engine includes a liquid (diesel) fuel injection system controlled by an engine electronic control unit (ECU) and a source of gaseous fuel such as natural gas. A metering valve and a mixer controls introduction of gaseous fuel from the gaseous fuel source into combustion air for the engine. An electronic governor controls the metering valve and a link controller coordinates operation of the ECU and the governor. Preferably, a regulator regulates the pressure of gaseous fuel supplied to the metering valve. A shut-off valve controls communication of gaseous fuel between the source and the regulator. The link controller also controls the shut-off valve as a function of sensed conditions. For example, a pressure sensor senses the natural gas pressure and the link controller automatically closes the shut-off valve and causes the engine to be run on solely diesel fuel under the control of the ECU if the sensed natural gas pressure is below a certain limit. The link controller also switches the engine from solely diesel fuel to a combination of natural gas and the diesel fuel in response to an operator generated command signal. Thus, the invention provides an all electronically controlled diesel pilot ignited natural gas engine. The link controller links together a production mechanical/electronic diesel injection system with a production isochronous electronic natural gas governing system. It includes safety shutdown features, and controls operation on either diesel or dual fuel, depending on the input conditions. The invention allows maximum use of natural gas as a fuel for a diesel engine, while ensuring that the engine is operated within accepted temperature and pressure limits.

BRIEF DESCRIPTION OF THE DRAWINGS

FIGS. 4b-4d are combined to form a schematic block diagram showing the three main components of the link controller and the connector which connects them to the other parts of the dual fuel system.

FIGS. 8b-8e are combined to form a top level schematic diagram illustrating the Programmable Gate Array of the link controller of the present invention.

DETAILED DESCRIPTION

Figure 1:
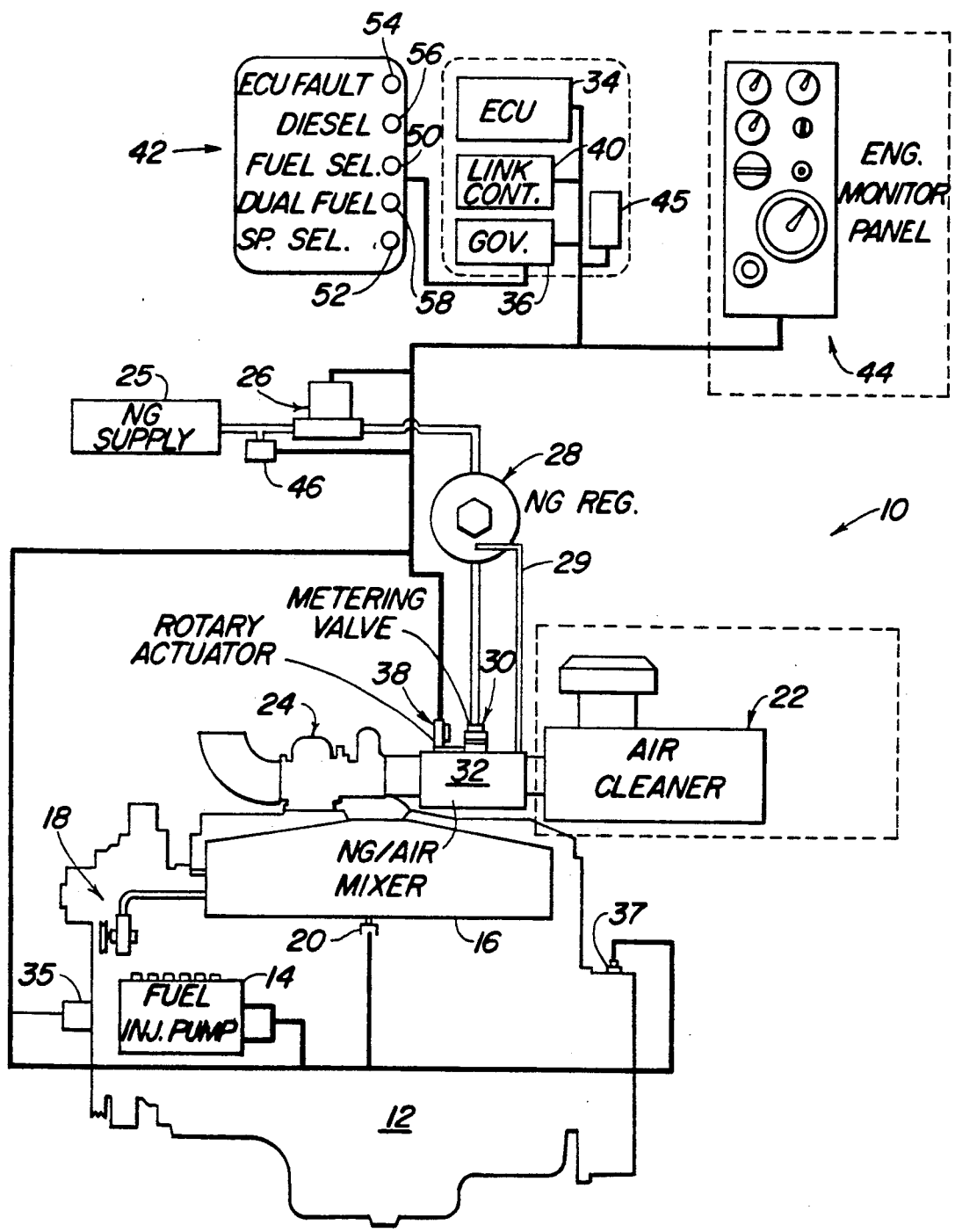
FIG. 1 is a schematic diagram of a dual fuel engine system according to the present invention.
Figure 2B:
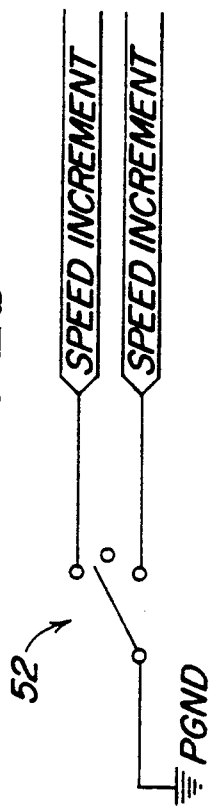
FIGS. 2a-2e are schematic diagrams illustrating the switches and indicators which are part of the operator's control panel of FIG. 1.
Figure 2D:
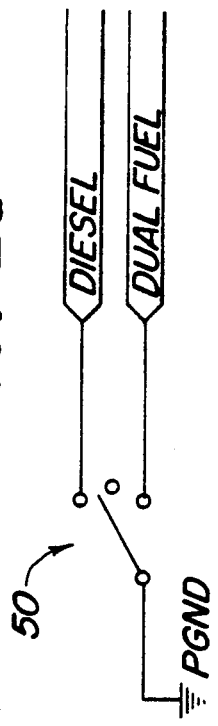
Figure 2A:
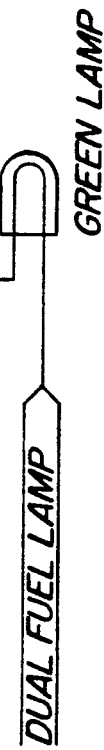
Figure 2C:
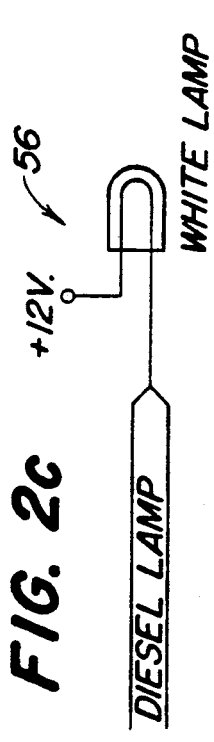
Figure 2E:
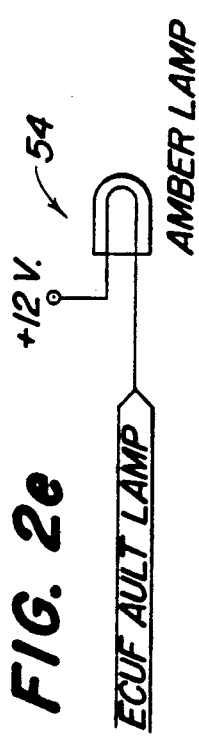

Referring to FIG. 1, the dual fuel engine system 10 includes a conventional diesel engine 12 which is supplied with diesel fuel from a standard diesel fuel injection pump 14. Also included is a conventional intake manifold 16. An optional intercooler pump 18 and charge air temperature switch 20 may be included in the case of an engine over a certain horsepower, such as 200 hp. Air is supplied to the engine 12 by a conventional air cleaner 22 and turbocharger 24. The turbocharger 24 preferably includes an o-ring seal (not shown) in the compressor housing to prevent leakage to atmosphere of the air/gas mixture which flows through the compressor.

Natural gas NG is supplied to the engine 12 from a NG source 25 (preferable 20 psi) via a solenoid-operated NG shutoff valve 26, a NG regulator 28, a metering or NG valve 30 and a NG/air mixer 32. Thus, the natural gas is introduced at the natural gas/air mixer 32 between the inlet to the compressor of the turbocharger 24 and the air cleaner 22.

The natural gas regulator 28 reduces the incoming pressure down to a useable pressure for the metering valve 30. The natural gas regulator 28 works in conjunction with a balance tube 29, and thus maintains the pressure of the NG supplied to the metering valve 30 higher than the air pressure at the entrance of the mixer 32 by a pressure differential in the range of 7 to 11 inches of water, depending on the engine application. This compensates for the fact that, as engine power is increased, more air is being pulled through the air cleaner 22 and more vacuum is drawn in the air mixer 32. In this way, the supply of NG to the air mixer 32 is automatically compensated for a dirty air cleaner or for the absence of an air cleaner, and for changes in engine loading.

The mixer 32 is essentially a cylindrical tube with an aperture (not shown) for connecting to the balance tube 29 and with an aperture (not shown) for receiving NG from the metering valve 30.

Figure 25:
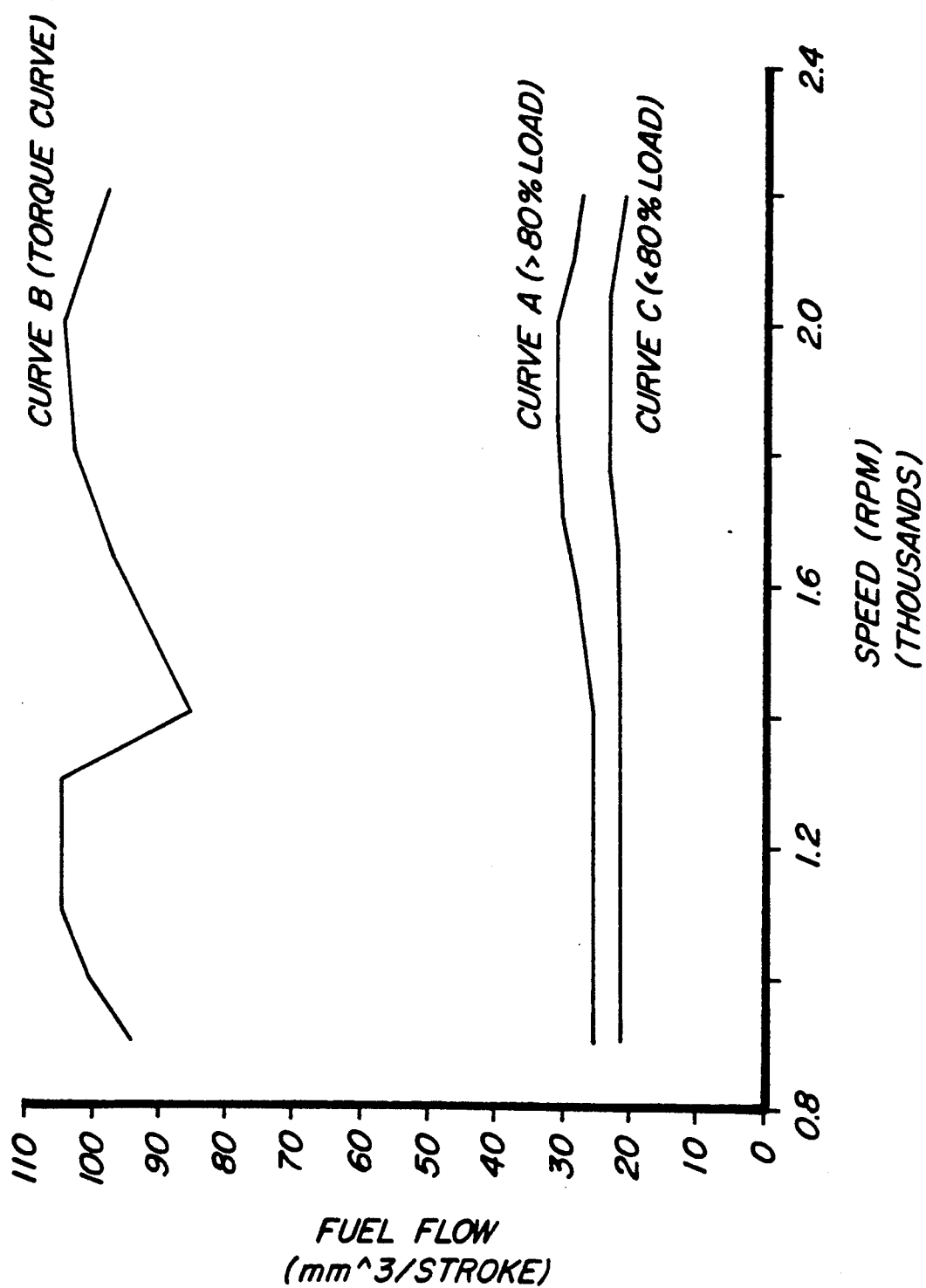
FIG. 25 is a graphical illustration of the ECU torque limiting curves which are "end programmed" into the ECU memory.

A diesel electronic control unit 34, ECU, controls the diesel fuel injection pump 14. Preferably, the ECU 34 is a commercially available ECU, such as manufactured by Nippondenso. The ECU 34 is preferably configured as a MIN/MAX governor for dual fuel operation, and receives an engine speed signal from a conventional engine speed pick-up 35 such as a magnetic pick-up. In MIN/MAX mode, diesel fuel delivery is primarily a function of the setting of a throttle (not shown), however, idle speed and maximum speed are still governed by the ECU 34. In addition, the required diesel pilot quantities for dual fuel operation are "end programmed" into the ECU memory as de-rated torque curves, as best seen in FIG. 25, wherein curve B is the torque curve for pure diesel fuel operation, curve A is the dual fuel boost pilot torque curve for greater than 80% load and curve C is the dual fuel pilot torque curve for less than 80% load.

A governor or NG controller 36 controls a rotary actuator 38, which in turn controls the metering valve 30. The metering valve 30 is preferably a commercially available metering valve, such as part number 252-688 manufactured by Century, and the rotary actuator 38 is preferably a commercially available rotary actuator, such as a "DYNA 7000" manufactured by Barber-Colman. The governor 36 receives an engine speed signal from a conventional engine speed pick-up 37 such as a magnetic pick-up.

Figure 26:
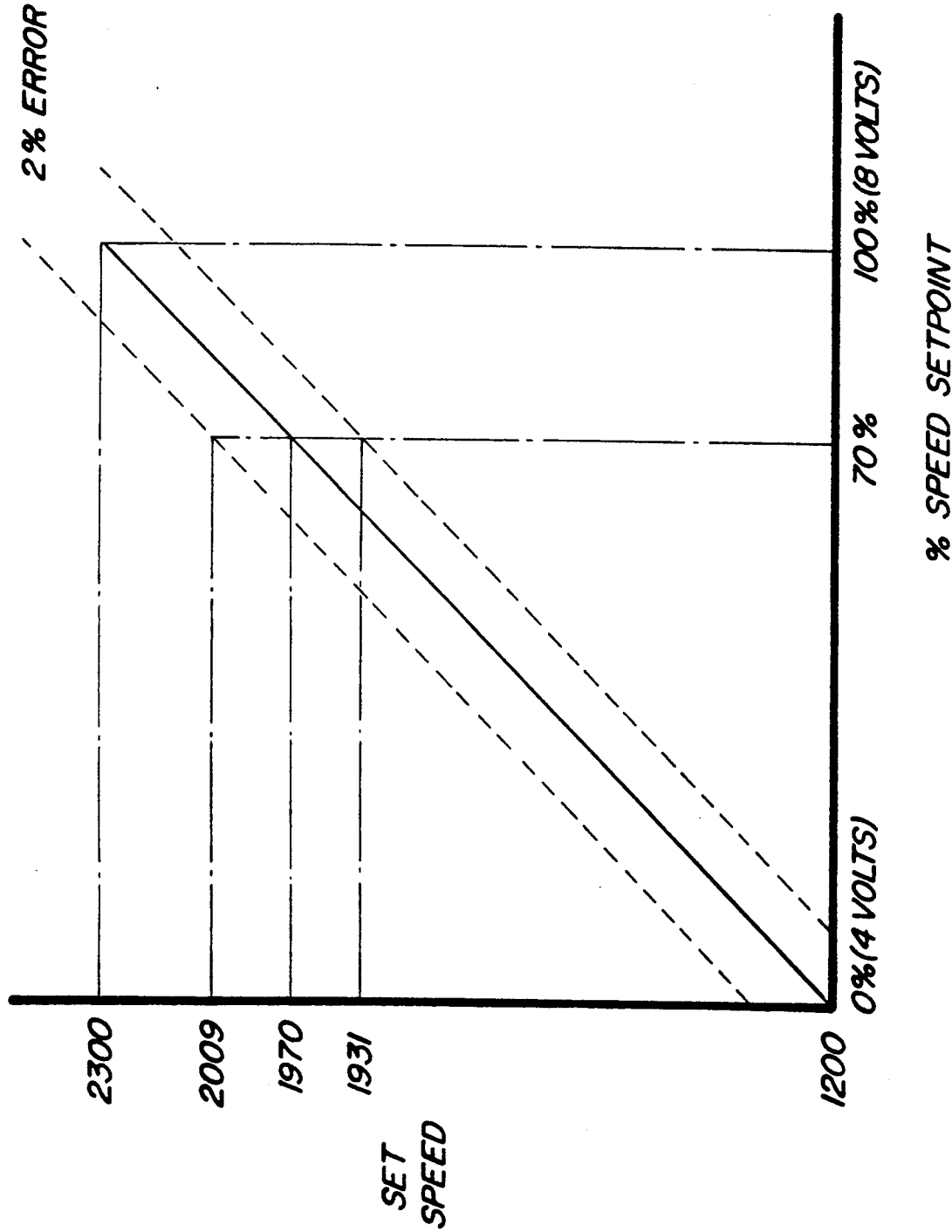
FIG. 26 is a graphical illustration of the speed setpoint requirements for the governor of the present invention.

The governor 36 is preferably a commercially available governor, such as model DYN1 10524, manufactured by Barber-Colman. The governor 36 includes an internal speed adjust potentiometer (not shown) which sets the low governing speed for dual fuel operation and the governor 36 provides the required speed governing range of 1200 to 2300 RpM which is controlled by a voltage from the link controller 40. Preferably, the governor 36 will have a speed setpoint versus RPM characteristic within the limits shown in FIG. 26.

The link controller 40 manages the operation of the diesel ECU 34 and NG controller 36, and provides operator controls via an operator's panel 42. In addition, the link controller 40 will automatically switch between diesel and dual fuel operation as conditions permit and as commanded by the operator. The governor 36 is a speed control governor which tries to maintain a constant engine speed. It receives signals from the link controller 40 which represent a desired engine speed, for example, 1800 rpm. The governor 36 functions to maintain this 1800 rpm engine speed by opening and closing metering valve 38.

A transient voltage protection device TVP 45 is a known current production circuit breaker type module that protects the ECU 34, link controller 40 and the governor 36 against voltage spikes and reverse battery connection.

A low pressure switch 46 detects whether the pressure supplied by the natural gas supply 25 is sufficient to fully power the engine 12. Switch 46 is preferably a normally-closed pressure sensitive switch which opens at pressures above approximately 18 psi. Once open, internal hysteresis prevents the switch 46 from closing until the pressure is below approximately 13 psi. If the low NG pressure switch 46 closes, the link controller 40 will force a return to pure diesel operation or prohibit a changeover to dual fuel operation.

The charge air temperature switch 20 senses air temperature in the intake manifold, and, is preferably a normally-open temperature sensitive switch, which closes at temperatures above 53° C. (128° F.). Once closed, internal hysteresis prevents the switch 20 from reopening until the temperature is below 48° C. (118° F.). If the intake air temperature is too high the switch 20 closes and the link controller 40 will force a return to pure diesel fuel operation or prohibit a changeover to dual fuel operation. This can help avoid knocking in higher horsepower engines, and protect the engine 12 if an external hose or if the belt that drives the intercooler pump 18 would break.

Appropriate connections may also be made to an engine monitoring panel 44 which could include conventional engine gauges such as a tachometer, a fuel gauge, a temperature gauge, an oil pressure gauge and etc.

Referring now to FIG. 2, the operator's panel 42 includes a fuel select switch 50 which is a single pole, double throw, momentary contact switch which selects diesel or dual fuel operation. A speed control switch 52 is a single pole, double throw, momentary contact switch which provides a speed increment or speed decrement signal to the link controller 40. The link controller 40 in turn generates a diesel throttle signal (% Throttle) which is supplied to the ECU 34. The diesel throttle signal is in effect a fuel setting. Engine speed is determined by the engine load.

The operator's panel 42 also includes the following indicator lamps. A diesel fault lamp 54 is controlled by the ECU 34 and is lit to indicate the presence of an ECU 34 fault. A diesel lamp 56 which is controlled by the link controller 40 and is lit to indicate that the engine 12 is running on pure diesel fuel. A dual fuel lamp 58 is controlled by the link controller 40 and is lit to indicate that the engine 12 is running in its dual fuel mode. The ECU 34, the NG governor 36 and the link controller 40 are preferably mounted in a housing (not shown) to which the panel 42 is mounted.

The following Table describes the operation of lamps 56 and 58:

| Diesel Lamp | Dual Fuel Lamp | Operation Mode |
| --- | --- | --- |
| ON | OFF | Diesel mode/switch over to diesel |
| ON | FLASH | User select dual fuel/switchover to dual fuel disabled/speed adjustment while running dual fuel |
| OFF | ON | Dual fuel mode/switchover to dual fuel |
| FLASH | ON | Switchover to diesel fault |

Figure 3:
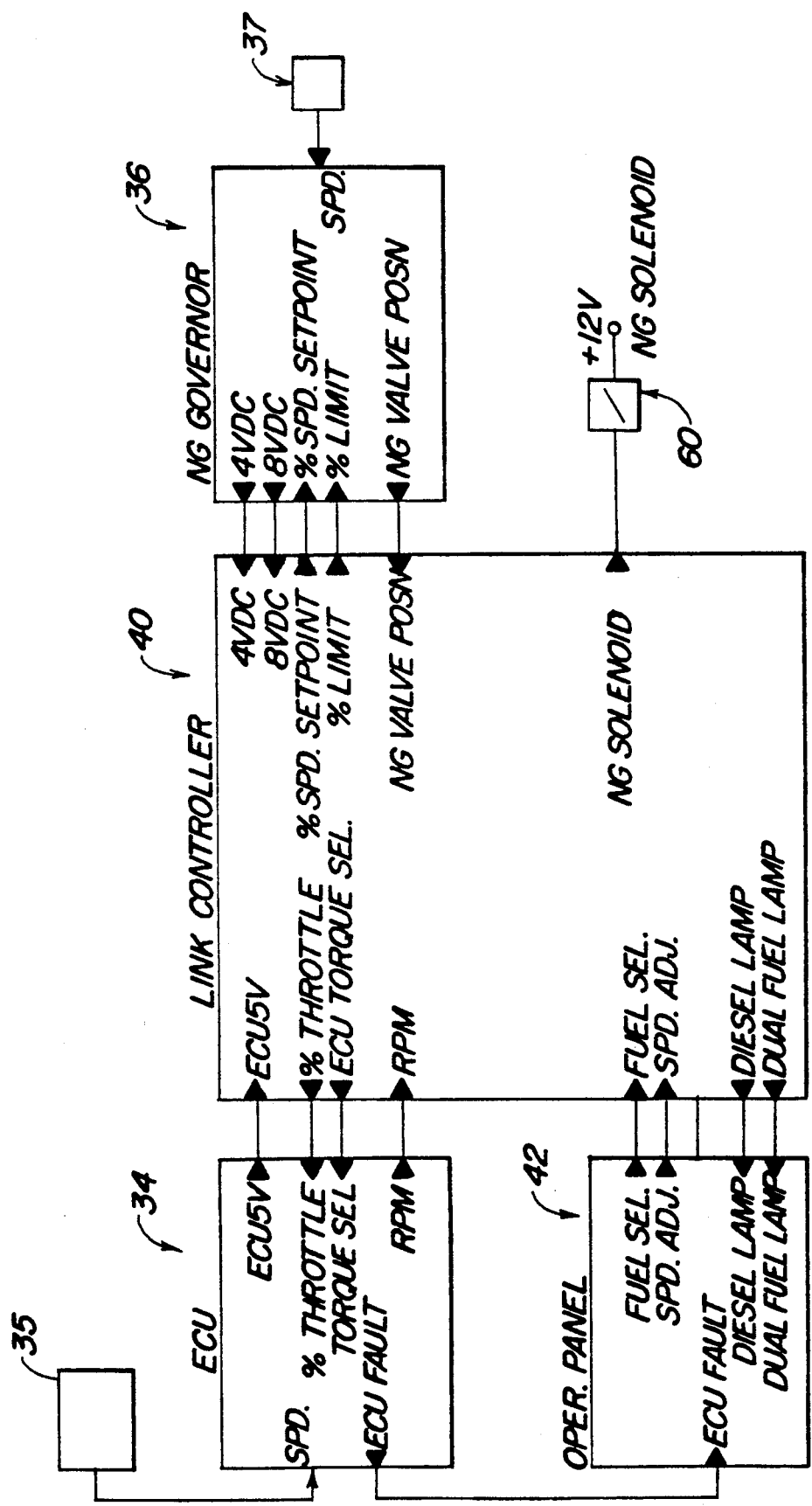
FIG. 3 is a schematic block diagram illustrating the connections of the link controller of the present invention with other components of a dual fuel engine system.

FIG. 3 illustrates the interconnections between the link controller 40, the ECU 34, the operator's panel 42, the governor 36 and the solenoid-operated NG shut-off valve 26. Thus, the link controller 40 is not a "stand-alone" electronic controller. It functions as an interface between the operator and the ECU 34 (used for governing the engine 12 in diesel operation) and the governor 36 (used for speed control in dual fuel operation). Thus, the electronics for the complete dual fuel control system consists of an operator's panel 42, the link controller 40, the ECU 34 and the governor 36.

Link Controller

Figure 4A:
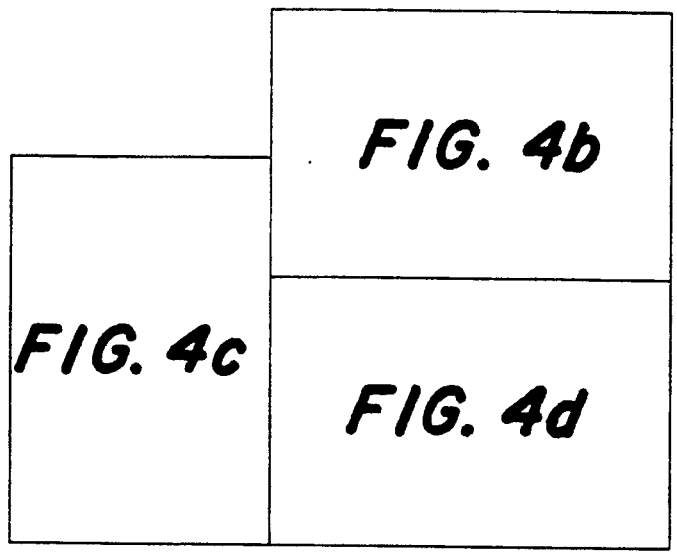
FIG. 4a shows the arrangement of FIGS. 4b-4d.
Figure 4C:
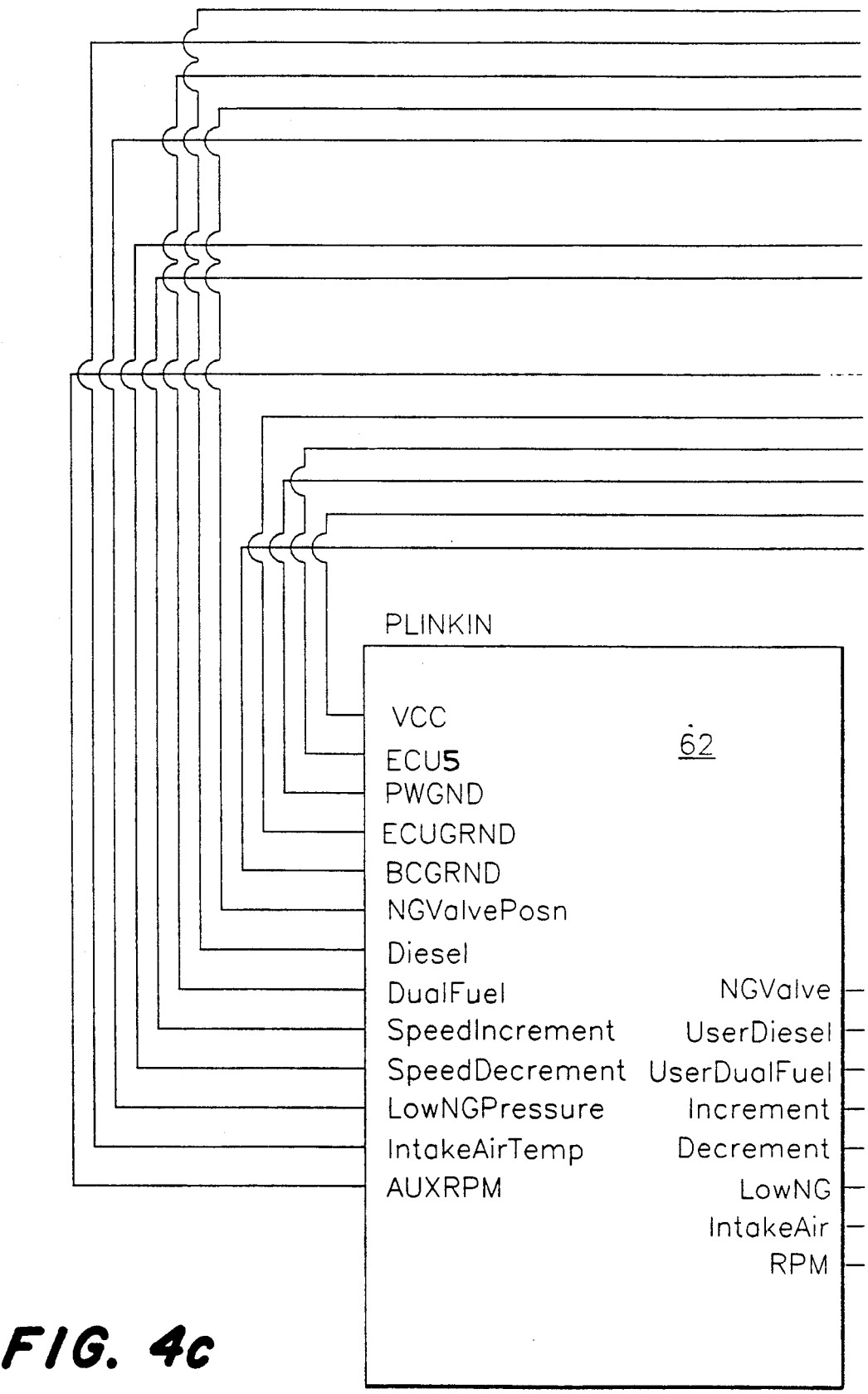
Figure 4D:
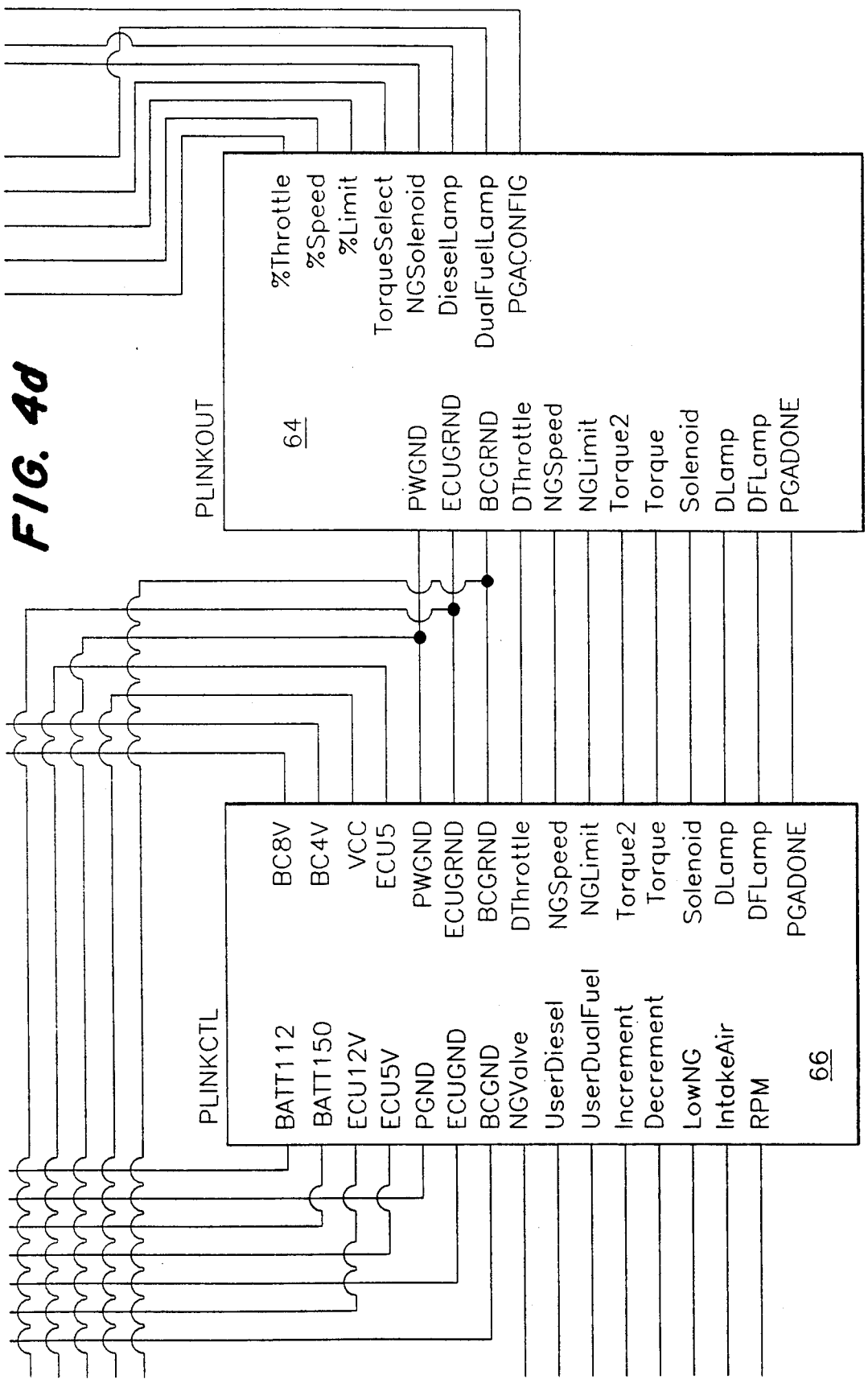

FIG. 4 shows the overall link controller 40 system. The design is partitioned into input and output conditioning circuitry 62, 64 and control circuitry 66, and is integrated into the dual fuel system via a connector (J1), such as a 30-pin Packard-type connector.

Figure 5A:
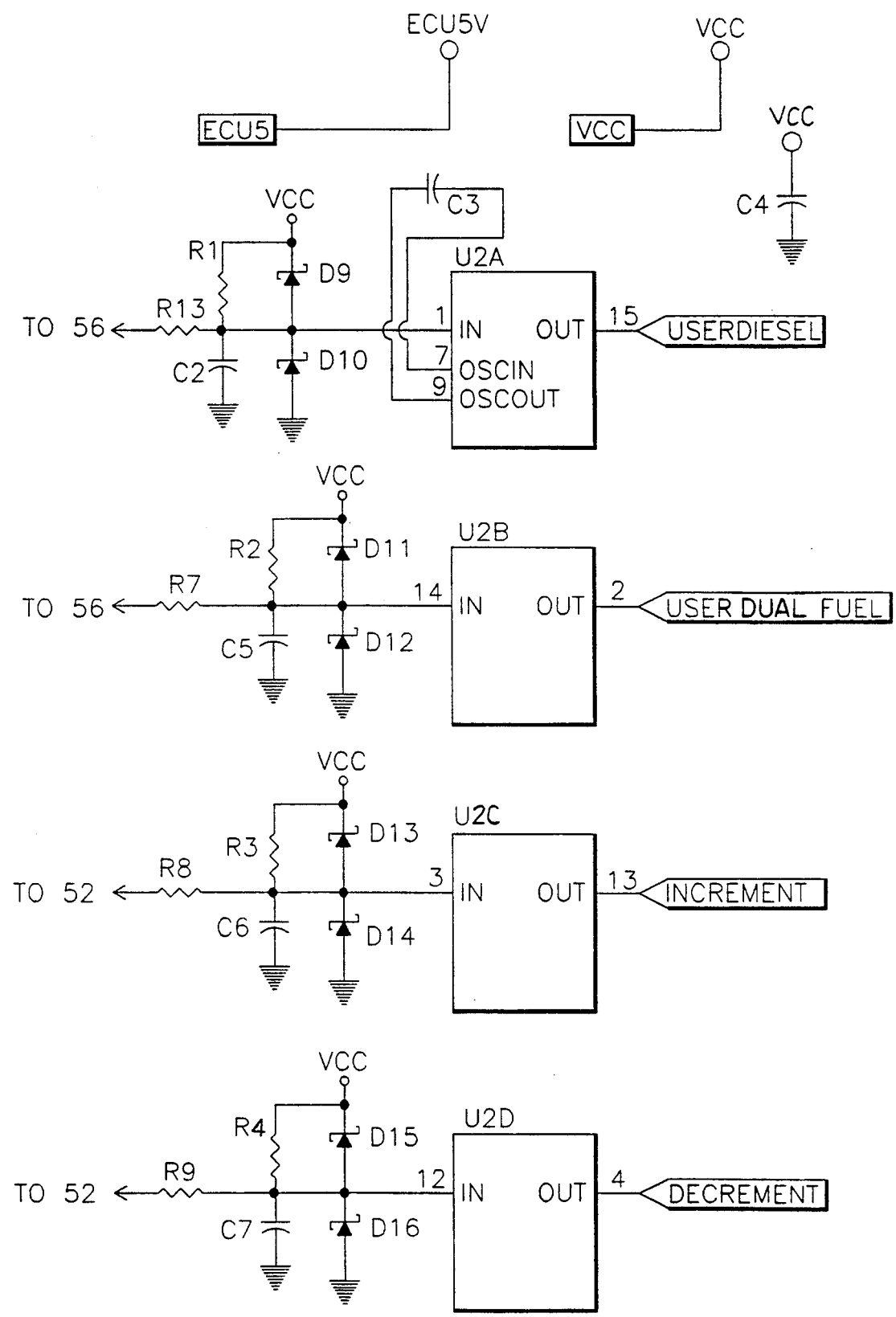
FIGS. 5a and 5b are circuit diagrams illustrating the link controller input conditioning circuitry of the present invention.
Figure 5B:
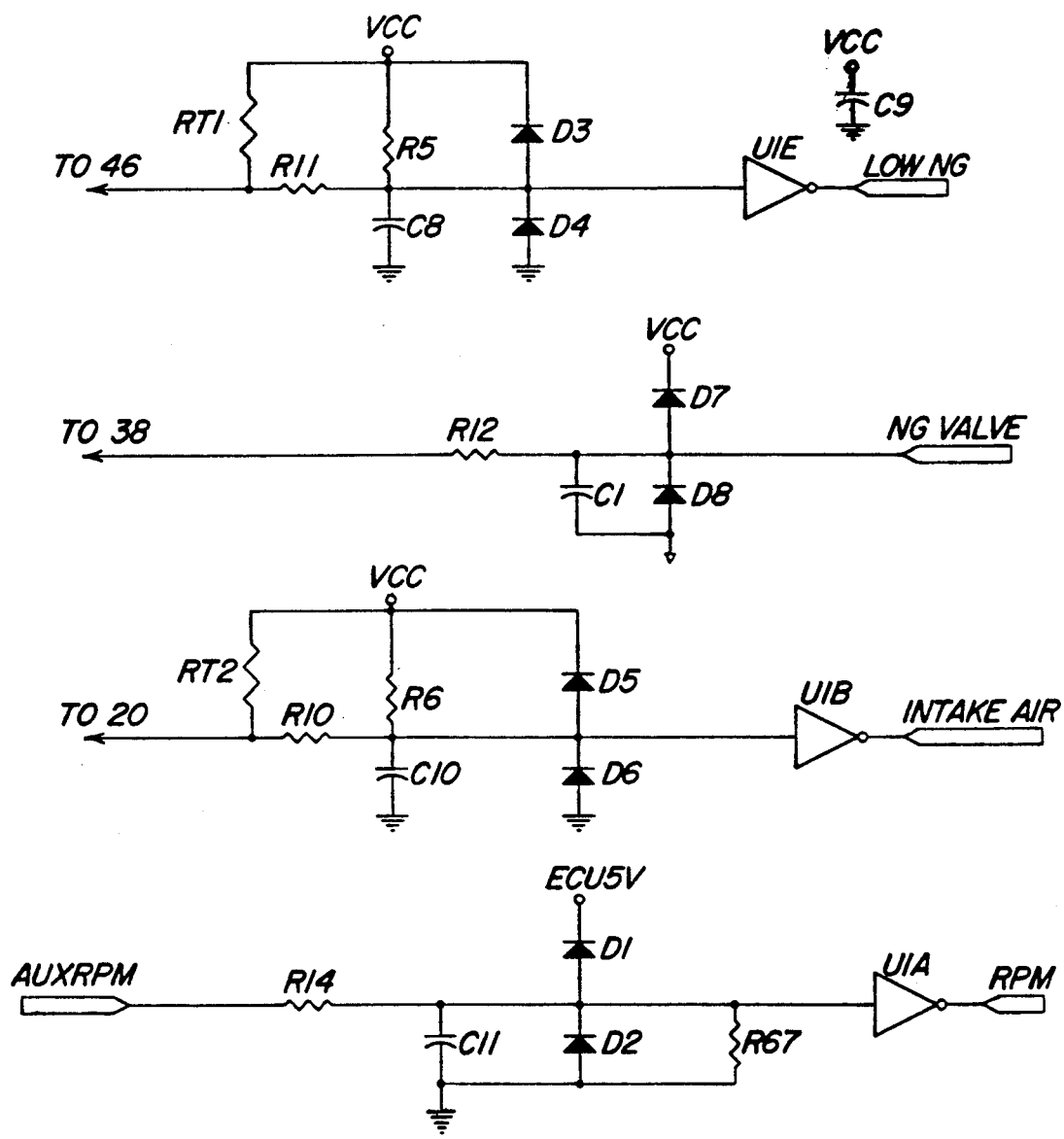
Figure 6B:
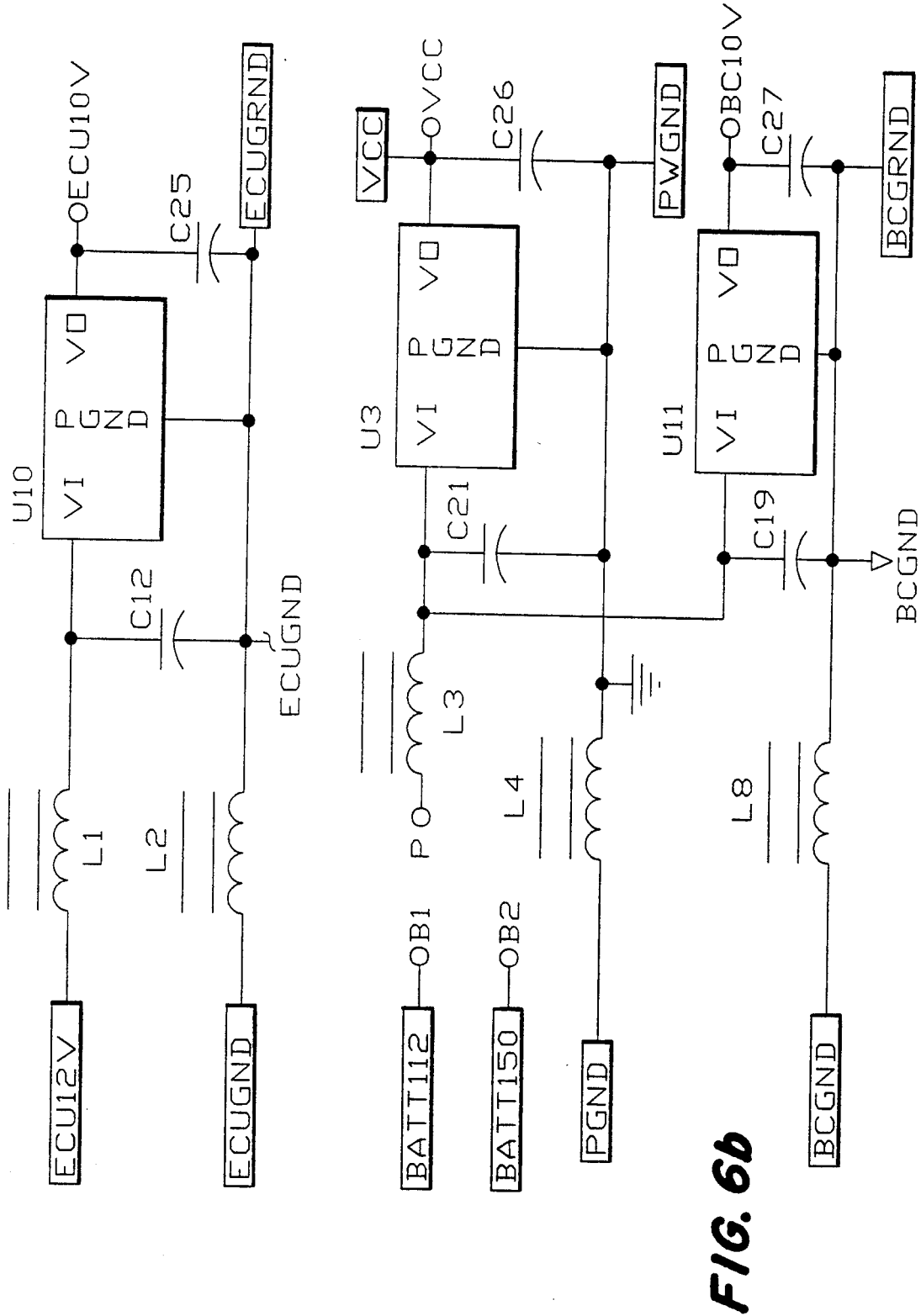
FIGS. 6b-6o are combined to form a circuit diagram illustrating the link controller control circuitry of the present invention.
Figure 6C:
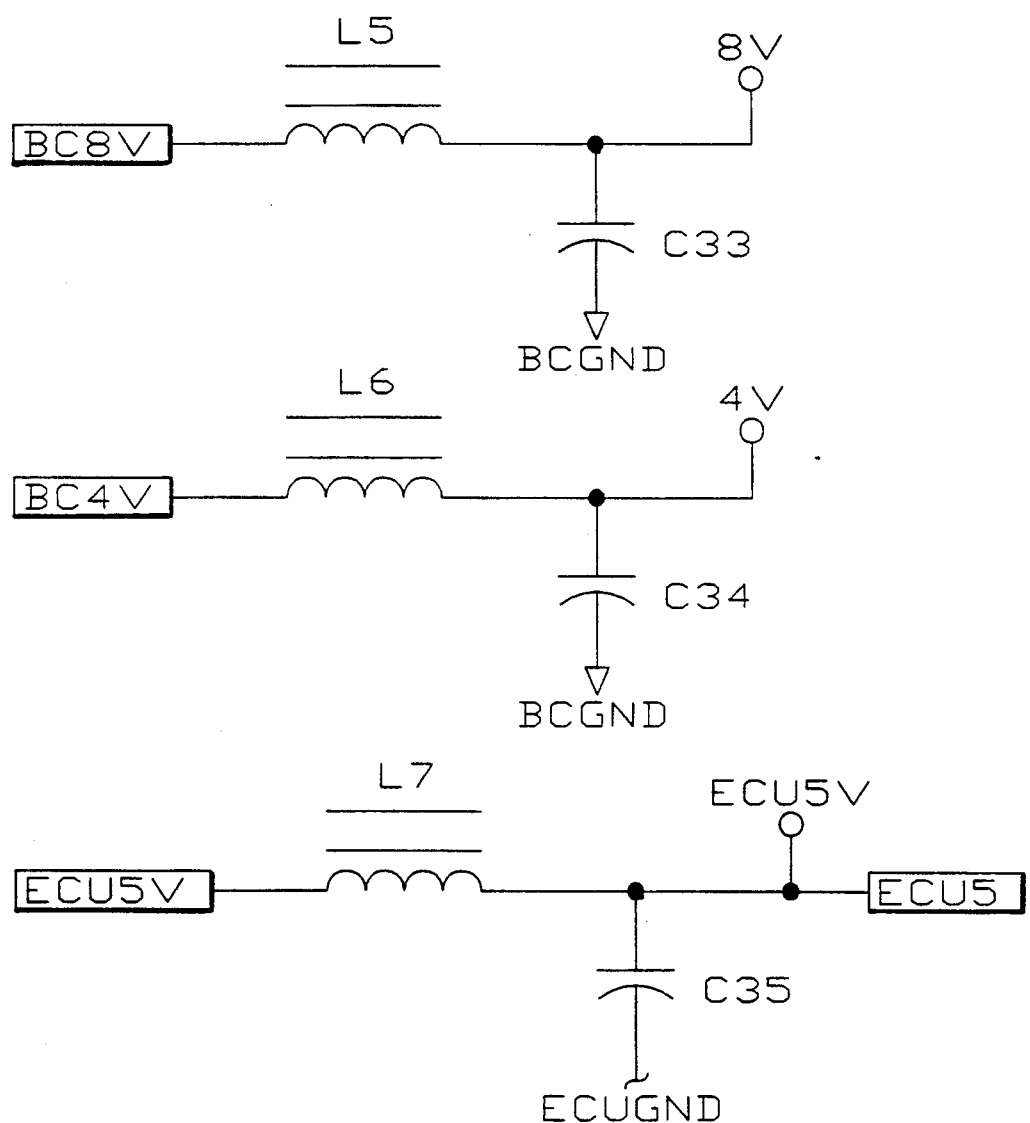
FIG. 6a shows the arrangement of FIGS. 6b-6o.
Figure 6D:
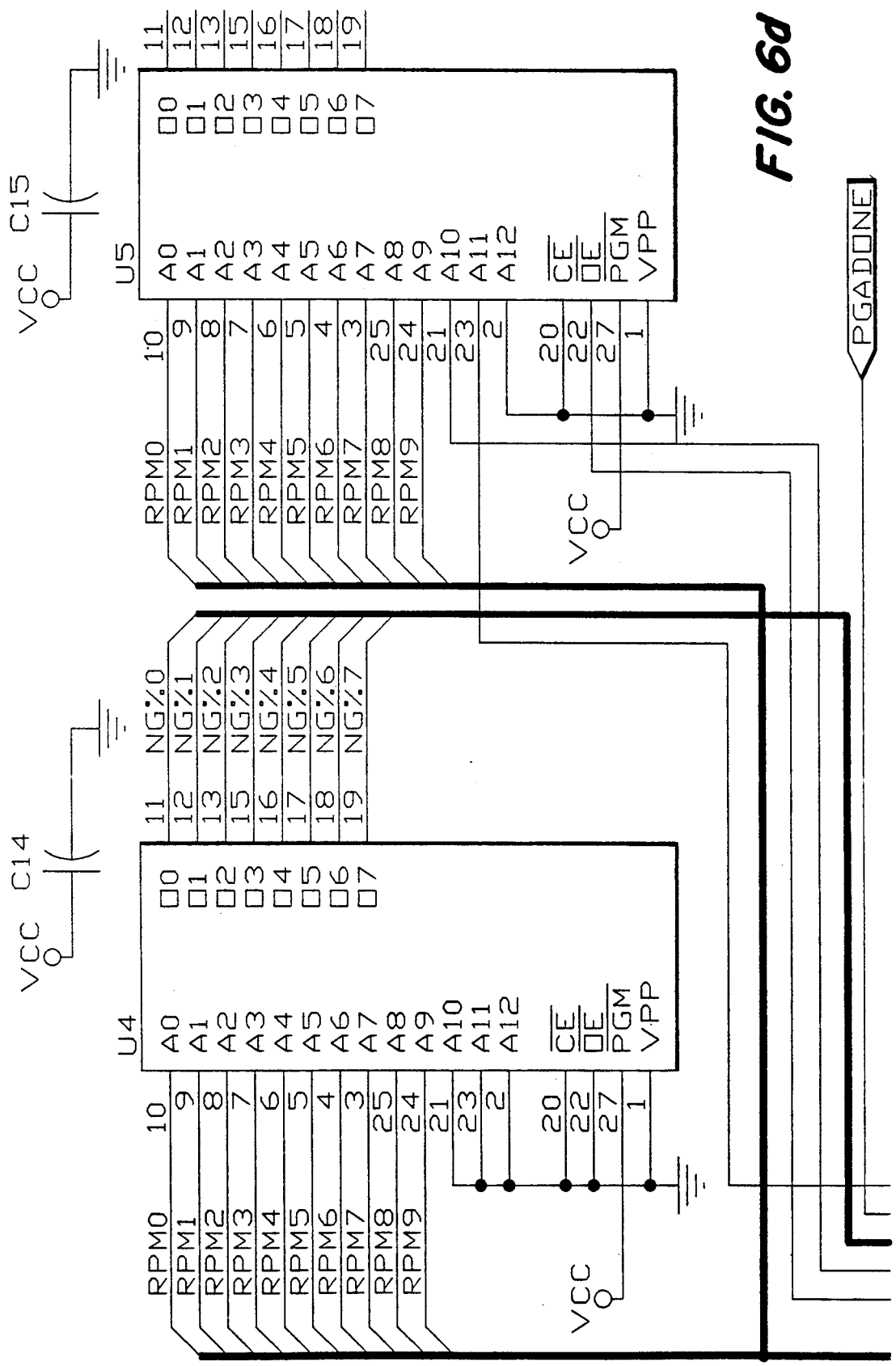
Figure 6E:
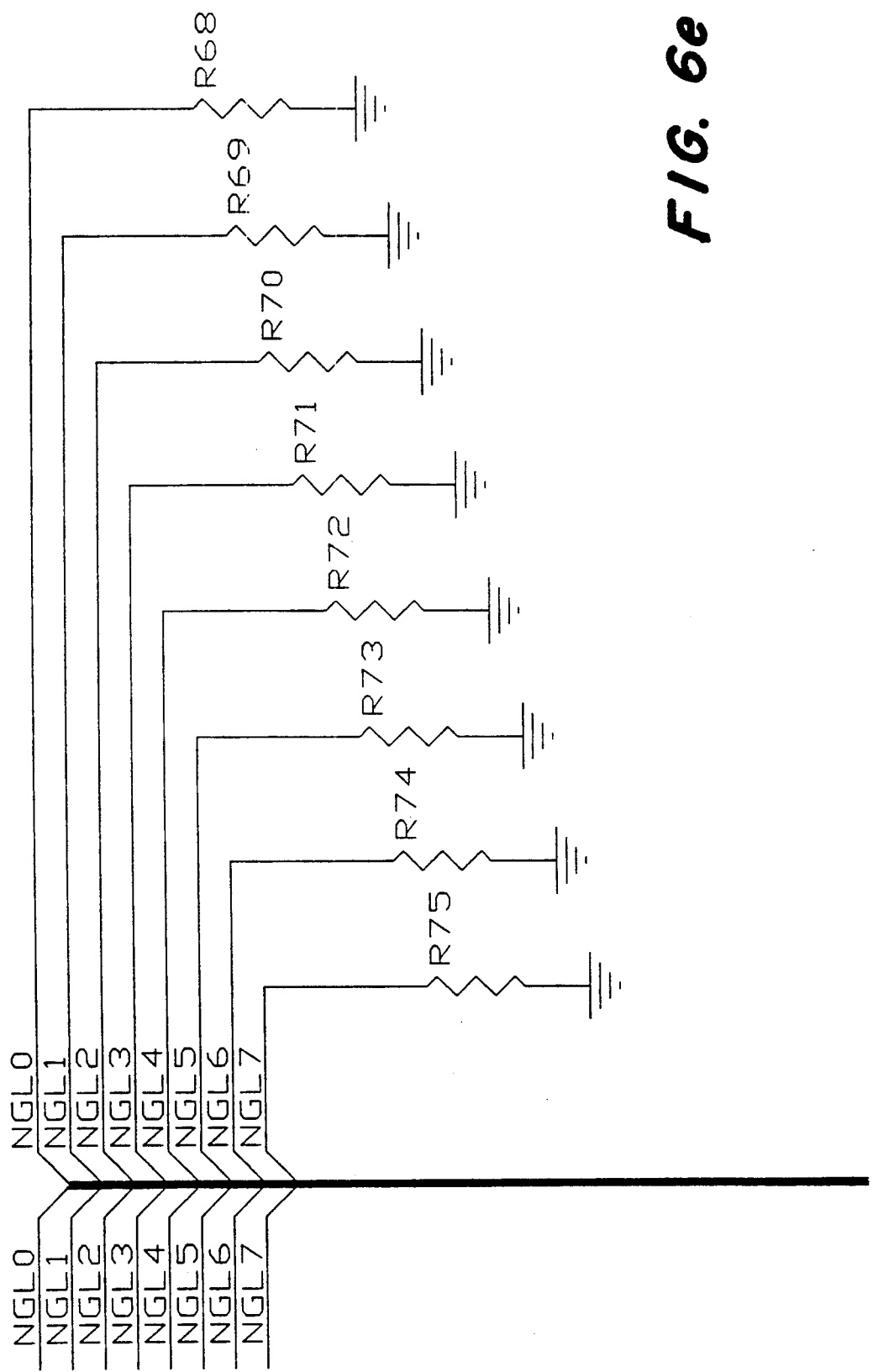
Figure 6F:
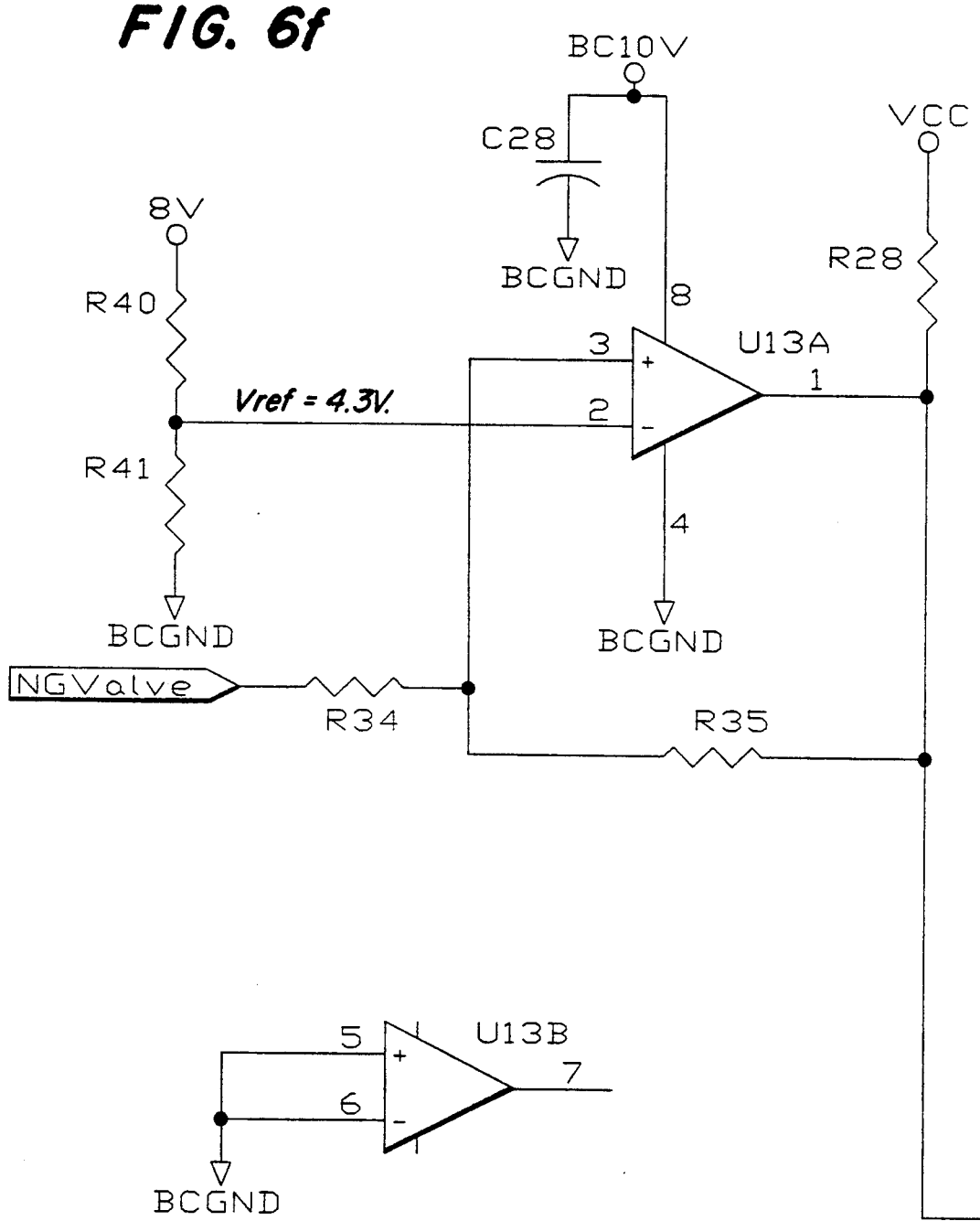
Figure 6H:
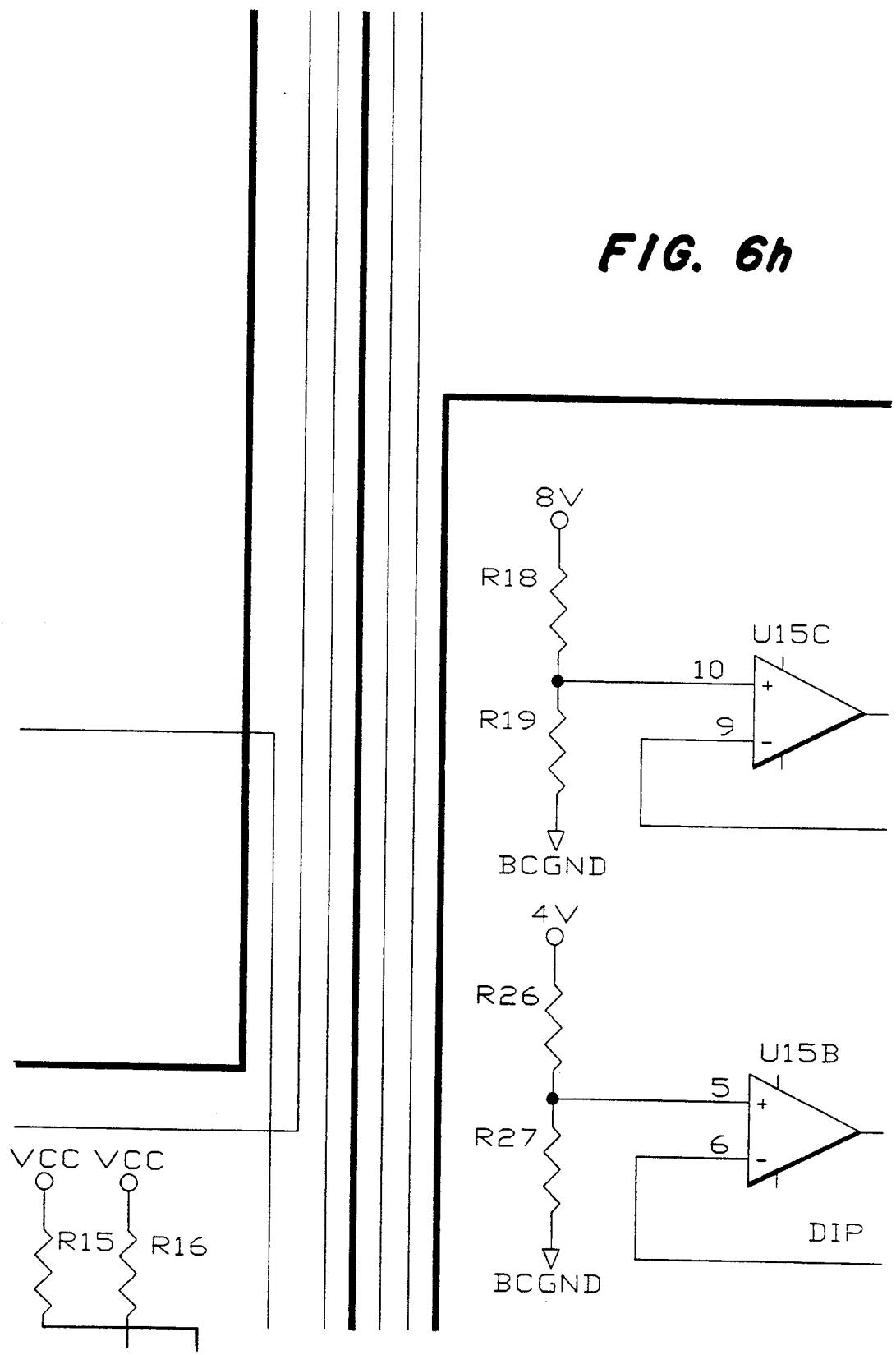
Figure 6I:
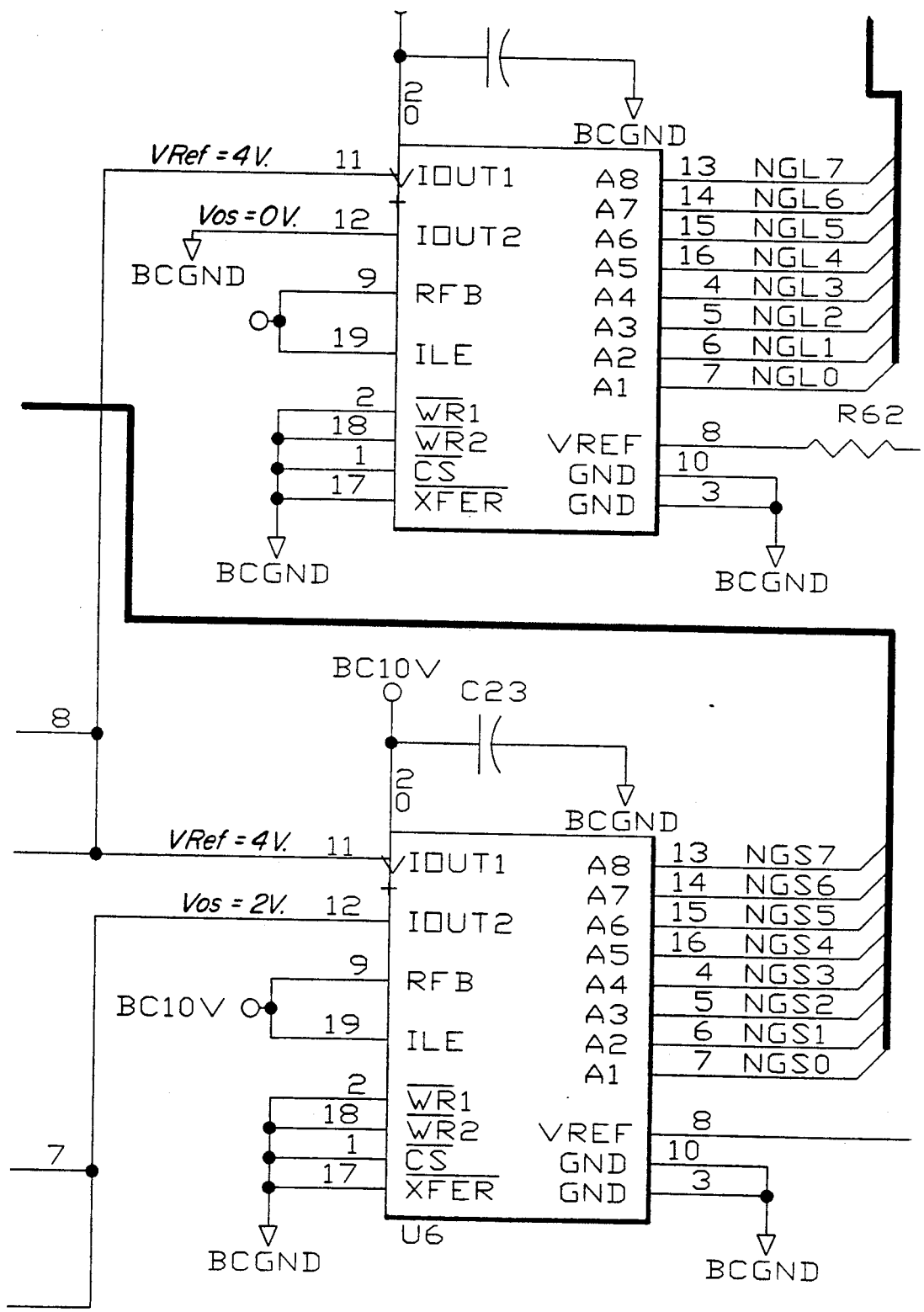
Figure 6J:
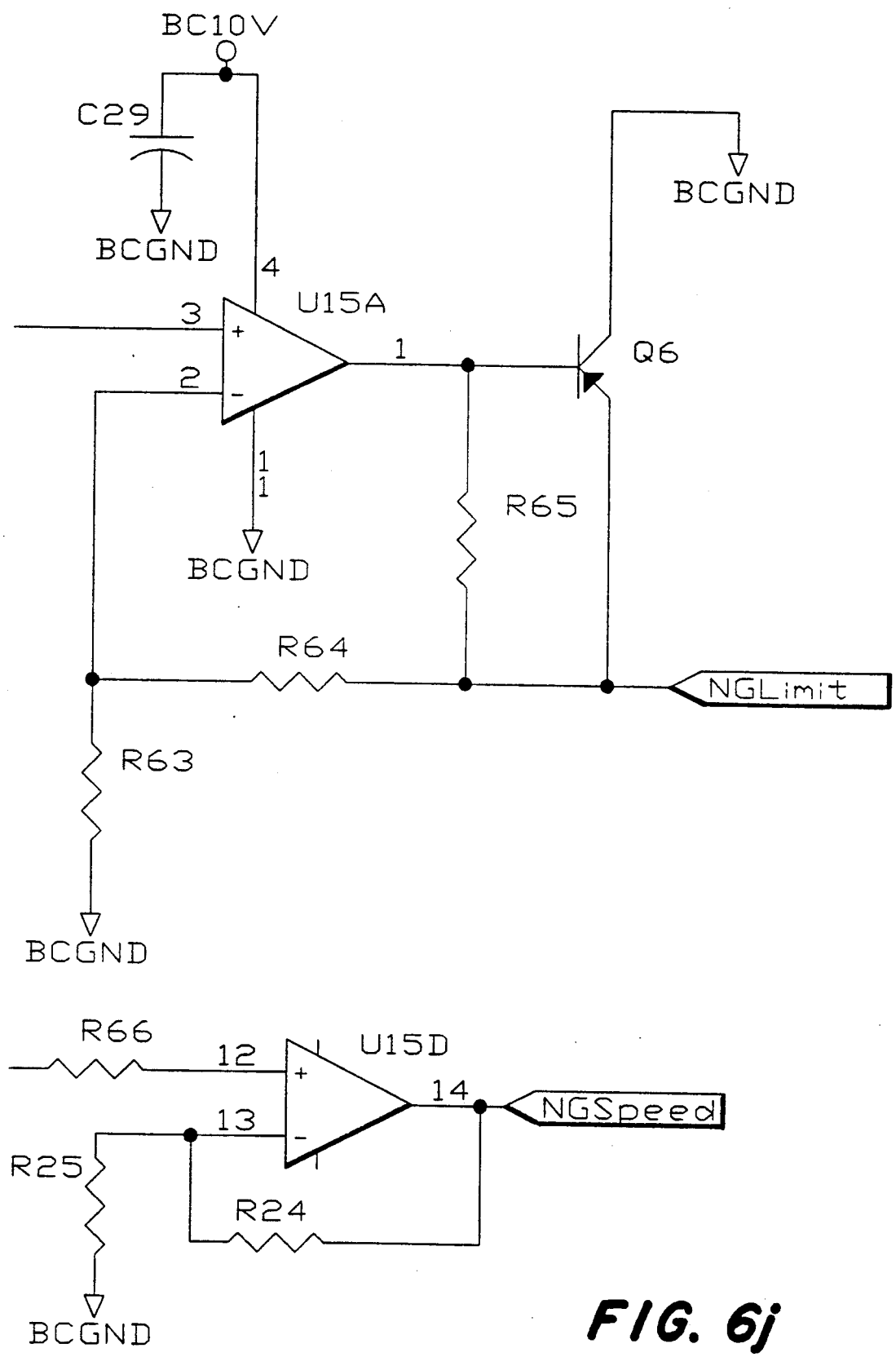
Figure 6K:
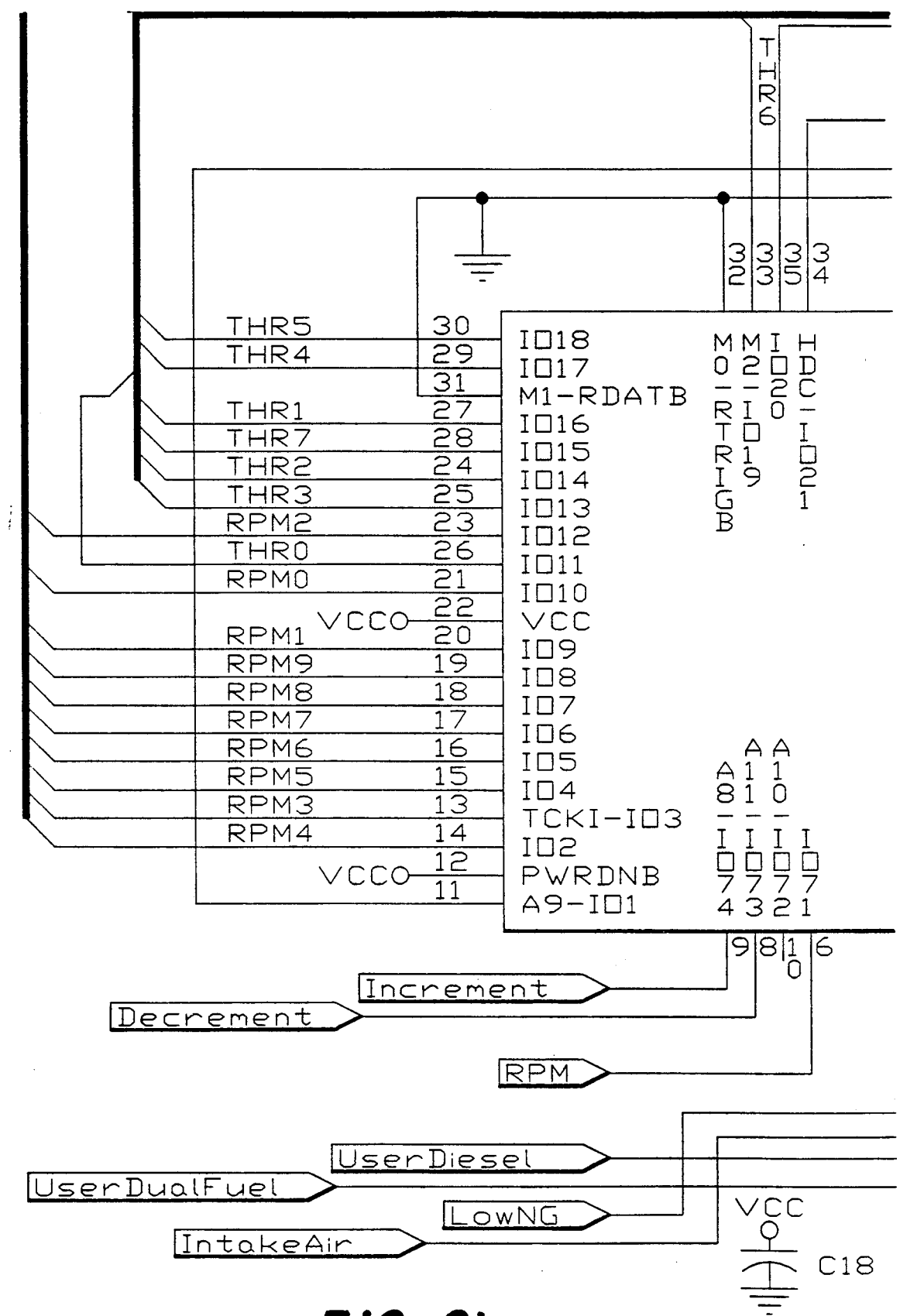
Figure 61:
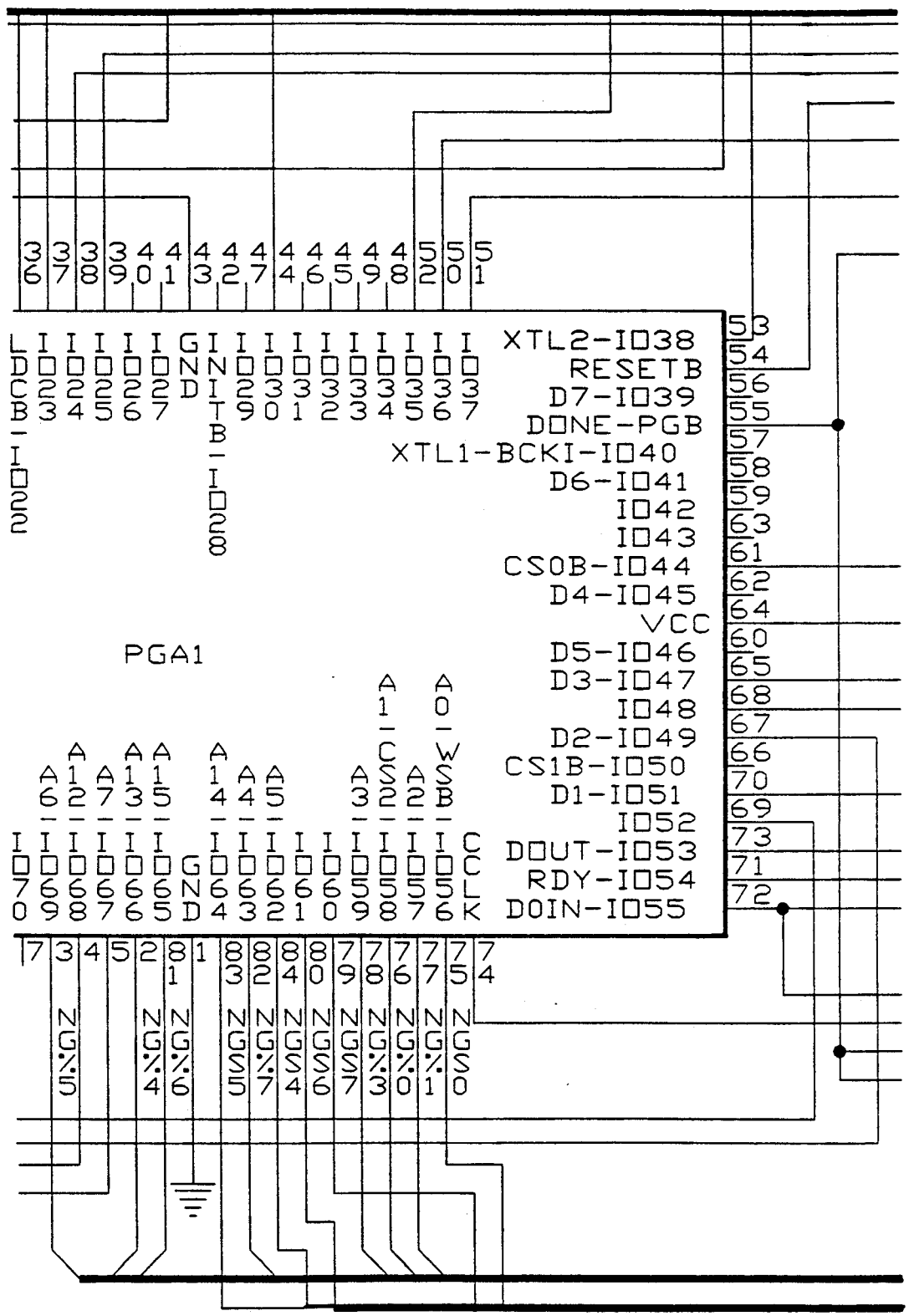
Figure 6M:
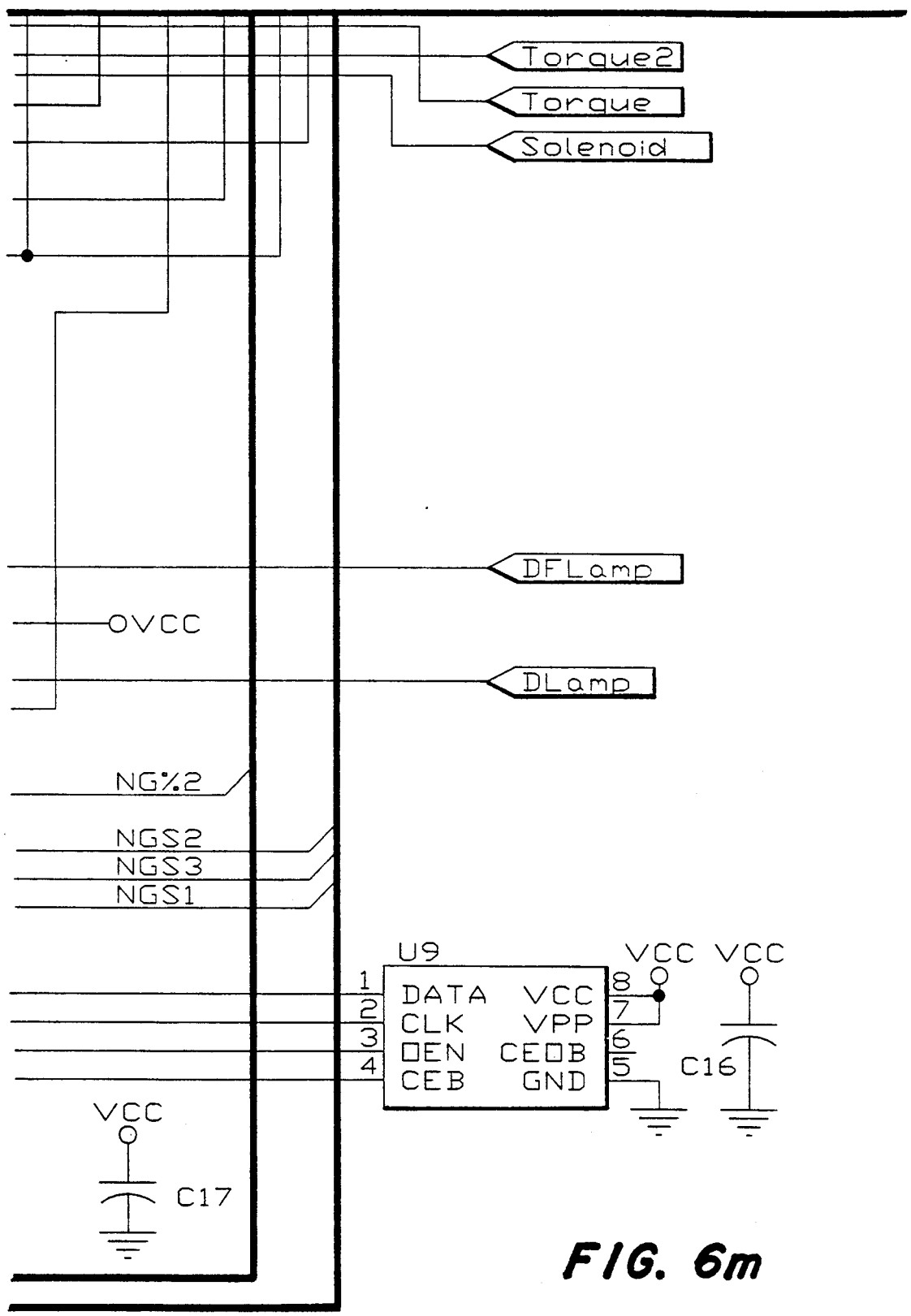
Figure 6N:
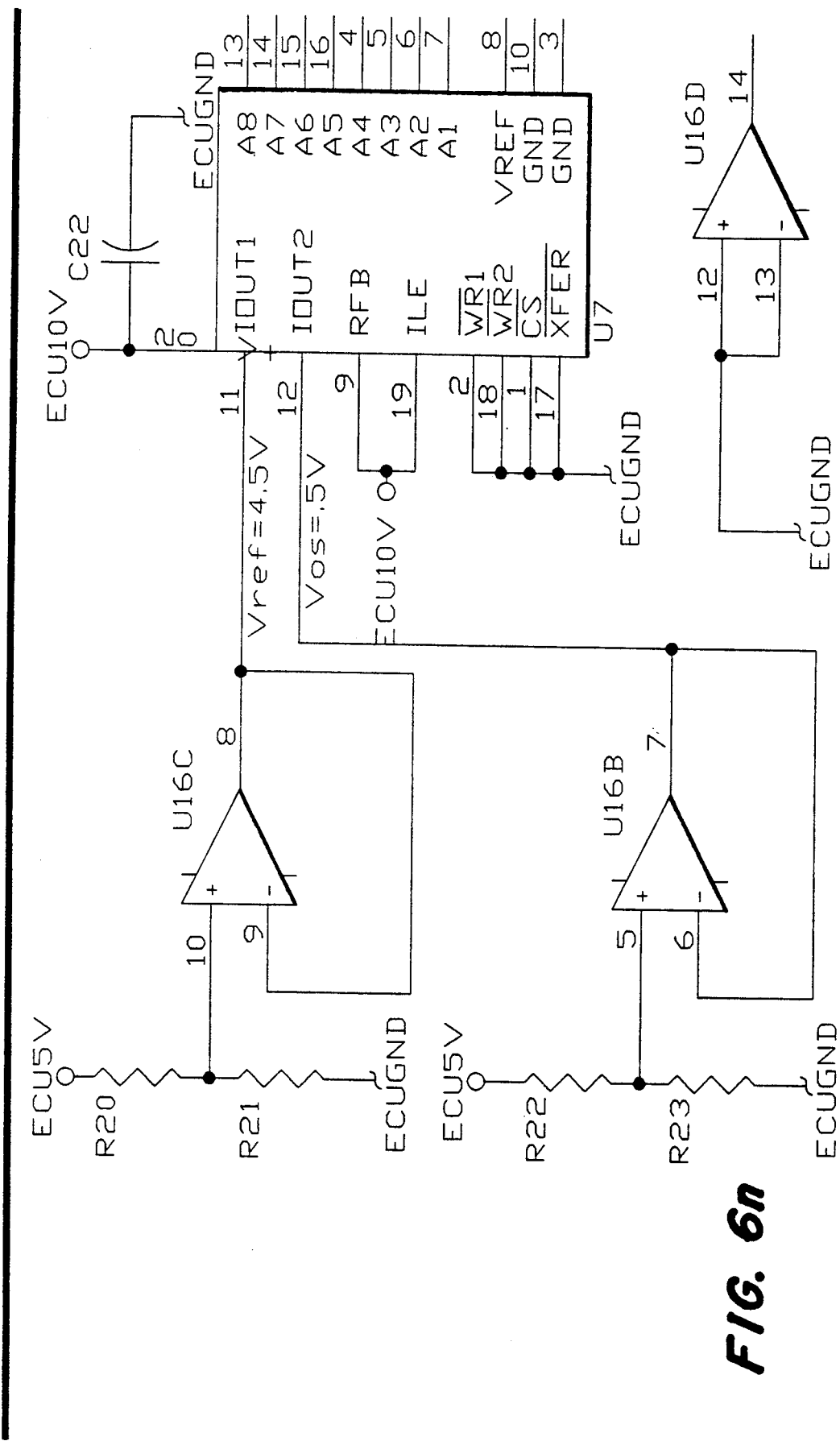
Figure 60:
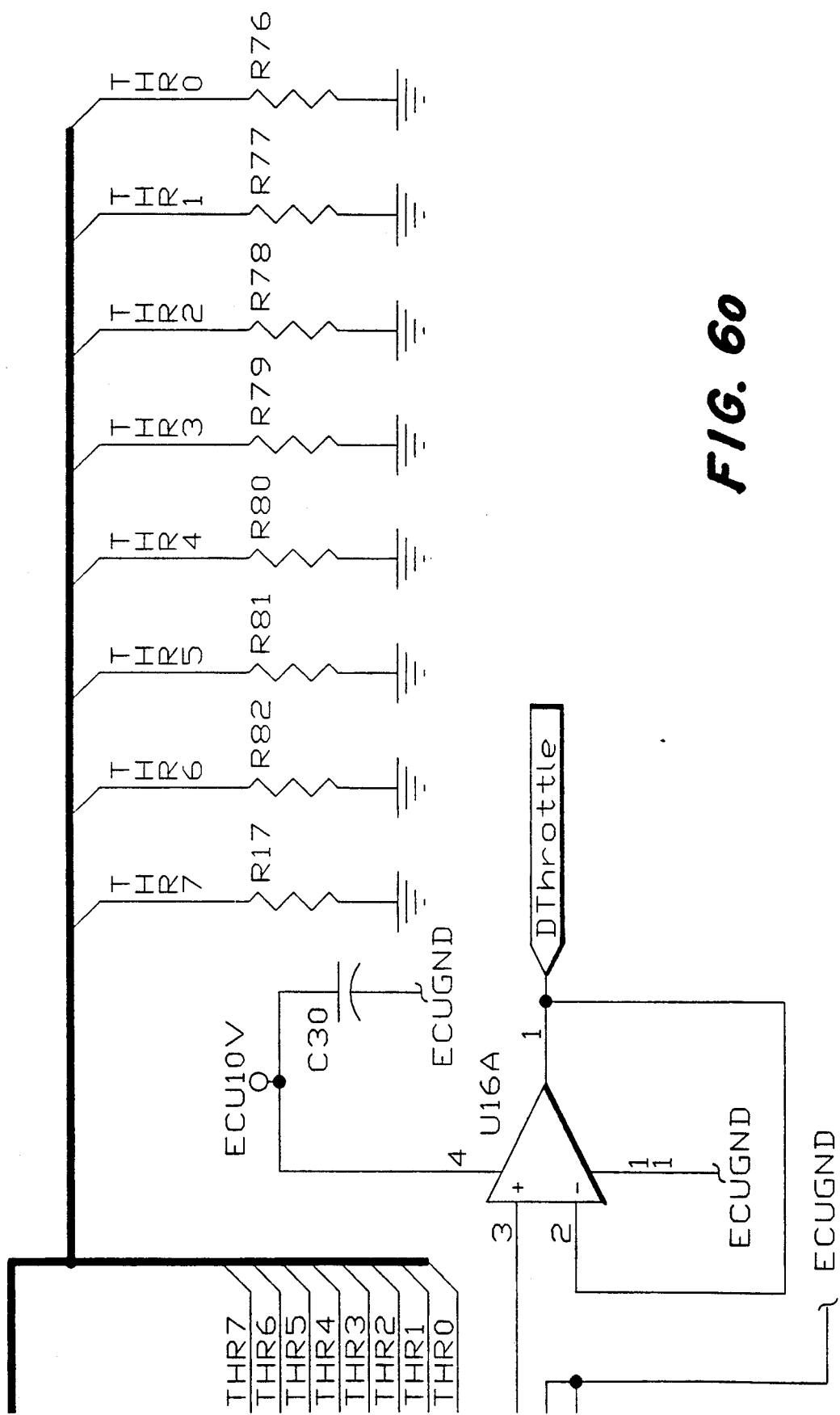

Referring now to FIGS. 5, the input conditioning circuitry 62 for the link controller 40 provides low pass filtering of all incoming signals, protects against externally generated voltage or current spikes such as ESD (electro static discharge), and conditions signals from mechanical switch contacts and external sensors in order to help reduce noise and switch contact bounce.

The four switch inputs (User Diesel/User Dual Fuel, Increment/Decrement, LowNG, Intake Air) to the link controller 40 have similar input protection circuitry, with the exception of the intake air temperature sensor switch 20 and the low NG pressure switch 16. For these inputs positive temperature coefficient thermistors (RT1 and RT2) are used to provide "contact wetting" to these sensor switches. This means that when the sensor switch closes, current will flow through the thermistor and across the contact to help keep the contact clean. As the thermistor heats up, this current flow is reduced to a trickle current. The other two inputs are provided by sealed, "dry" gold contact switches and so no "contact wetting" is required.

The resistors R7–R11, R13 and capacitors C1, C2, C5–C8, C11 provide a low-pass RC filter to ground with a 3 dB cut-off frequency of 1.45 kHz. The resistors R1–R6 are internal pull ups to Vcc for the case when a switch is open.

The Schottky diode clamps (D9–D16) protect the MC14490 switch debouncer (U2A–U2D) against positive or negative voltages, limiting the input voltages from (GND −0.4 V) to (Vcc +0.4 V). The signal diode clamps (D1–D8) protect the MC74HC14 Schmitt trigger (U1A–U1F) against positive or negative voltages, limiting the input voltages from (GND −0.7 V) to (Vcc +0.7 V).

The MC14490 is a switch debouncing circuit, used for the elimination of extraneous level changes that result from the opening and closing of user-controlled mechanical switches. The MC14490 takes an input signal from the operator switches and generates a clean digital signal four clock periods after the input has stabilized. This applies to opening and closing the contact. The capacitor C3 sets the internal R-C oscillator at 187 Hz which requires that the switch contact settle out in 20 msec before a transition is detected.

The MC74HC14 Schmitt trigger circuit serves the same purpose as the MC14490 for the engine sensor switches, enhancing noise immunity by reducing waveform transition times.

The NG valve position input is an analog 0-5 signal from a feedback position sensor (not shown) on the NG rotary actuator 38. This signal provides an indication of the engine load while operating on dual fuel. The input is filtered by the low-pass RC network to governor 36 GND with a 3 dB cut-off frequency of 159 Hz with the diodes providing overvoltage protection by limiting the input voltage between −0.7 V and 5.7 V.

The AUXRPM input is a 0-5 V TTL signal from the ECU 34 which is generated by the speed sensor 35 on the engine 12. The ECU 34 outputs 10 pulses per engine revolution, and the link controller 40 uses this signal to calculate engine RPM. Engine speeds in the range of 1200 to 2400 RPM generate RPM input frequencies of 200 to 400 Hz. This input is low-pass filtered by the RC network to ECU 34 GND (396 Hz 3 dB cut-off). The pull-down resistor (R67) pulls the input low in the case where there is no RPM input connected.

Referring now to FIG. 6, there is shown the link controller control circuitry 66 which manages the dual fuel operation of the engine 12. The link controller 66 is primarily a digital controller, with some analog input and output circuitry. The link controller control circuitry 66 includes a Programmable Gate Array (PGA) (described in detail later), such as is commercially available from Xilinx, Inc. The Xilinx PGA is a standard off-the-shelf component available in military and automotive temperature ranges. The PGA is electronically configured at power-up, by data downloaded from an 8-pin serial PROM (Programmable Read-Only Memory) U9. The PGA is configured through the use of development tools, which are also commercially available from Xilinx, Inc., to implement the circuits and functions which will be described in detail later.

The link controller 40 provides regulated power supplies and separate grounds for the digital portions of its control circuitry 66, for the ECU 34 interface circuitry and governor 36 interface circuitry. The power supply for the dual fuel system consists of a 12 V battery (not shown) and alternator (not shown), and the Transient Voltage Protection (TVP) module 45. A 12 V supply for the link controller 40 is provided from an output of the TVP module, which protects the ECU 34, governor 36 and control circuitry 66 from reverse voltage connection and large inductive load dumps from the alternator.

For the control circuitry 66 digital circuitry, +12 V is brought in on pin BATT150, with GND brought in directly from battery negative. For the ECU 34 interface circuitry, +12 V is brought in on the ECU 12 V pin with GND connected to the ECU signal GND. For the governor 36 interface circuitry +12 V is brought in on a 12 V pin with GND connected to the governor 36 power GND. In addition, the link controller 40 control circuitry 66 takes in regulated 4 V and 8 V supplies from the governor 36 and regulated 5 V supply from the ECU 34. These are used strictly for the purpose of providing voltage references for analog inputs and outputs.

The ferrite beads (L1-L8) are used on power and GND inputs to enhance noise immunity of control circuitry 66. At low frequencies, the ferrite beads look like a short circuit, but at higher frequencies, they act like a 50 ohm resistor. Thus, each ferrite bead in combination with one of capacitors C12, C19, C21, C33, C34 and C35, provides a low-pass filter with a 3 dB cutoff frequency of 3.18 KHz. This input protection increases the link controller's immunity to electromagnetic interference (EMI).

Regulators (U3, U10, U11) are low dropout voltage regulators for 5 and 10 V supplies. They can source 1 amp of output current with a dropout voltage of 0.5 V to 1 V over the 40° C. to 125° C. operating range. The 1 $\mu$F and 110 $\mu$F capacitors, C12, C25 for example, included with each such regulator, are required to maintain stability and regulation during transients and are physically located close to the regulators.

The oscillator circuit consists of a 12.8 kHz tuning fork series oscillator (Y1), three resistors (R31, R32, R33) and the MC14060 (U12) oscillator/divider. This provides a free-running clock frequency of 12.8 kHz, and also provides several divided-down clock frequencies, all for use within the PGA for timing applications (Q4: 800 Hz, Q6: 200 Hz, Q8: 50 Hz, Q10: 12.5 Hz, Q14: 0.78 Hz).

The 12.8 kHz base frequency was chosen as the most appropriate for RPM calculation, based on the incoming RPM signal from the ECU 34, and is sufficient for all other control functions.

The LM2903 comparator U13 compares the position feedback signal from the rotary actuator 38 with a 4.3 V reference. This provides an indication of whether the engine is running under or over 30% load on dual fuel. R34 and R35 provide 50 mV of hysteresis to the comparator circuit and the 10K pullup resister R28 to Vcc ensures that the comparator output is compatible to PGA logic levels.

The 27C64 EPROMs (U4, U5 of FIG. 6) provide 2 lookup tables as a function of engine RPM:
1. NG % Speed Setpoint for governor 36.
2. NG % Limit for NG Valve Position limiting on dual fuel.

The purpose of the NG % Speed setpoint lookup table is to provide a speed setpoint voltage to the governor 36, based on the engine RPM measured at the time of switchover from diesel to dual fuel. The ECU 34 requires a 0.5-4.5 VDC throttle voltage to determine fueling, whereas the governor 36 requires a 4-8 VDC speed setpoint voltage. This fundamental difference between the controllers requires that the link controller 40 calculate and provide the appropriate signals, to ensure smooth transitions between diesel and dual fuel modes.

The purpose of the NG % Limit lookup table is to prevent over-fueling of the engine by the governor 36. The governor 36 is a speed governor so it will supply whatever NG is required to attain the speed setpoint. It has been determined from engine mapping work that engine over-fueling at certain speeds will cause the engine to knock. The NG % Limit places limits on the position of NG valve 30 as a function of RPM, in order to prevent engine knocking. The NG % Limit Lookup table actually contains two maps of NG valve 30 position as a function of RPM:
1. position limit with normal diesel pilot.
2. position limit with boost diesel pilot.

The PGA controls the selection of normal or boost diesel pilot.

The three DAC0830 digital-to-analog converters, (U6, U7, U8) are required to convert internal digital values to external analog control voltages:
1. NGLimit: 0-8 VDC required by governor 36.
2. NGSpeed: 4-8 VDC required by governor 36.
3. DThrottle: 0.5-4.5 VDC required by ECU 34.

The digital-to-analog converters (DAC) U6-U8 are configured for single power supply operation with level shift and span-adjustable outputs. The LM124 op amps U15, U16 take their inputs from the appropriate resistor/divider networks to provide the various reference and offset voltages for the 3 ranges required. The output LM124 stages for NGLimit and NGSpeed have a gain of 2, so the reference voltages provided at the DAC inputs are ½ those required at the output. This is due to the fact that the DAC will only output 0-5 VDC in this configuration. As this is not a microprocessor application, the two Write lines, Chip Select and Transfer pins are not used and are tied to GND, and the RFB and ILE pins are tied to 10 V.

The pulldown resistors (R17, R68-R82) are used to pull down the DAC inputs for NGLimit and DThrottle. In the case of NGLimit, the lookup table output is enabled low by the PGA during diesel operation in order to force 100% % Limit on the governor 36 (no NG). In the case of DThrottle, the % Throttle signal to the ECU 34 is ensured to be low (0.5 V) at power up.

Link Controller Output Conditioning Circuitry

Figure 7A:
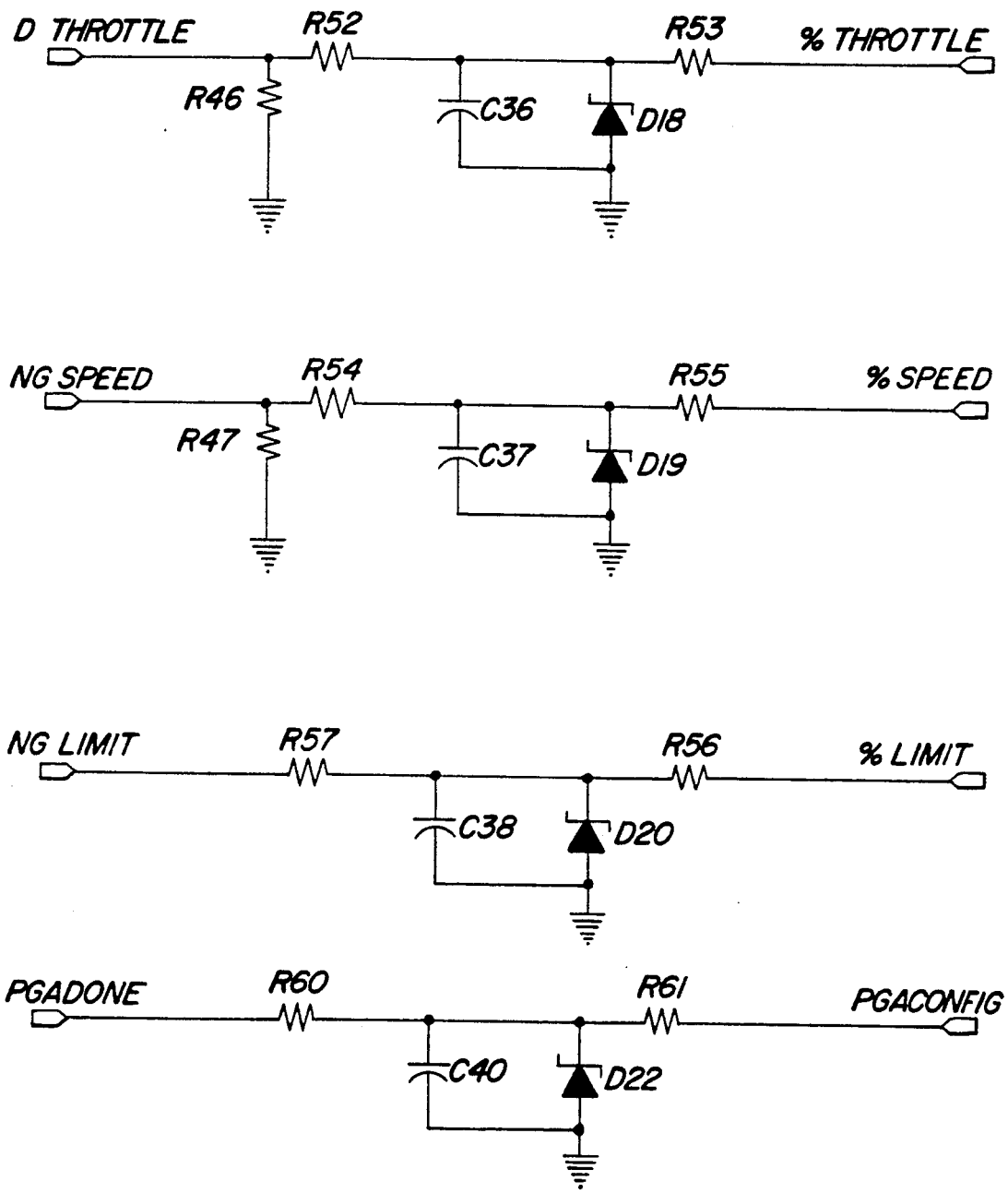
FIGS. 7a and 7b are circuit diagrams illustrating the link controller output conditioning circuitry of the present invention.
Figure 7B:
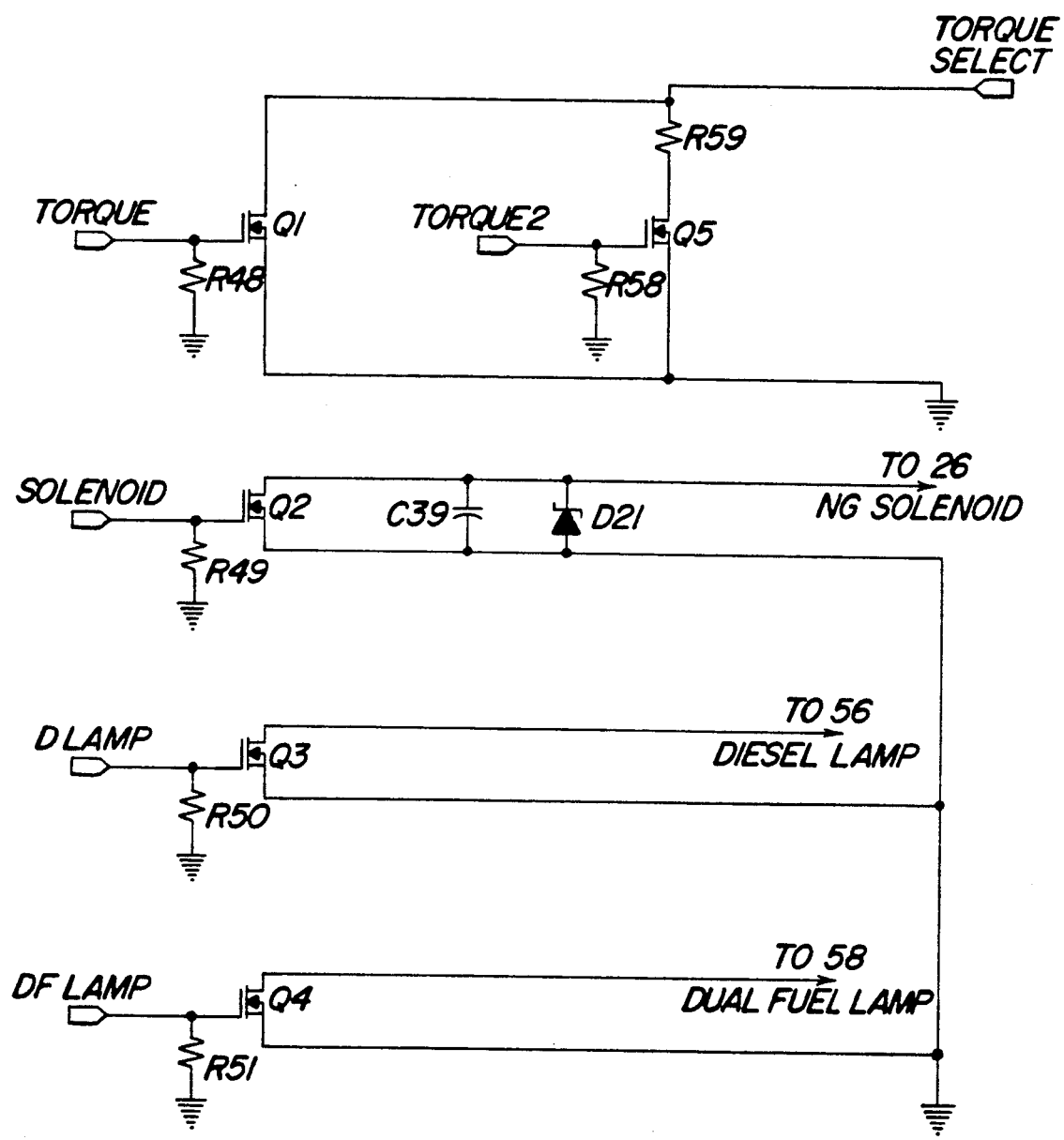
Figure 8A:
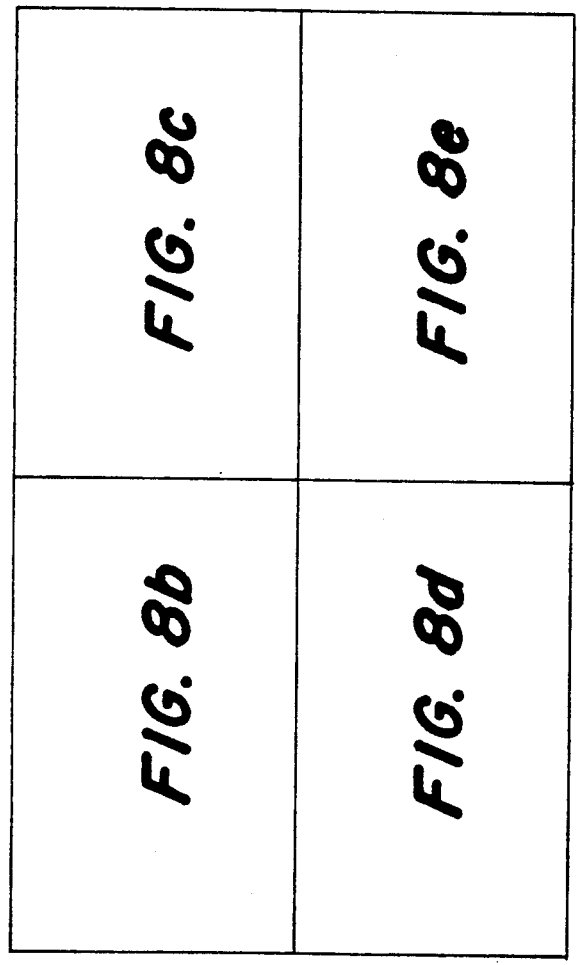
FIG. 8a shows the arrangement of FIGS. 8b-8e.
Figure 8B:
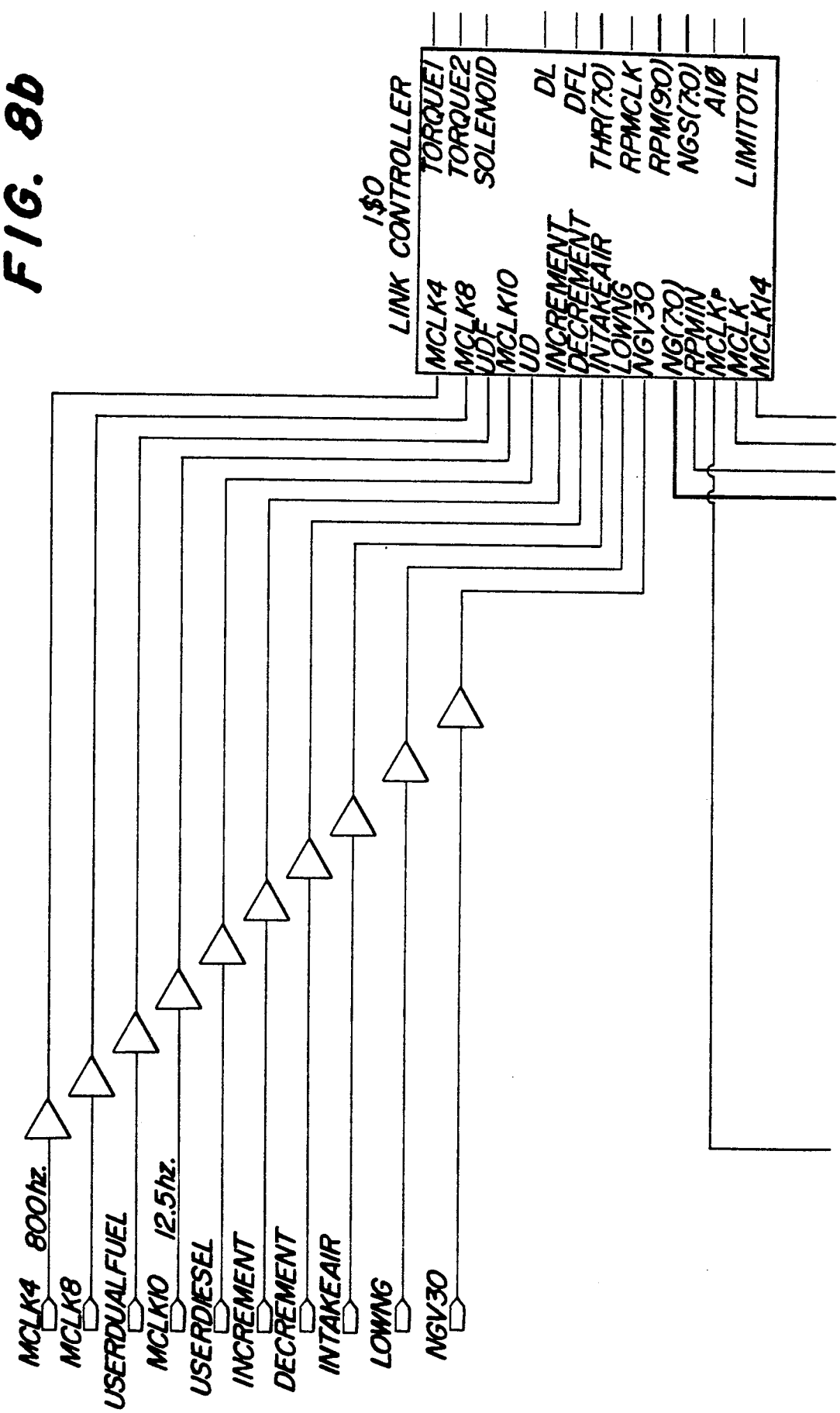
Figure 8C:
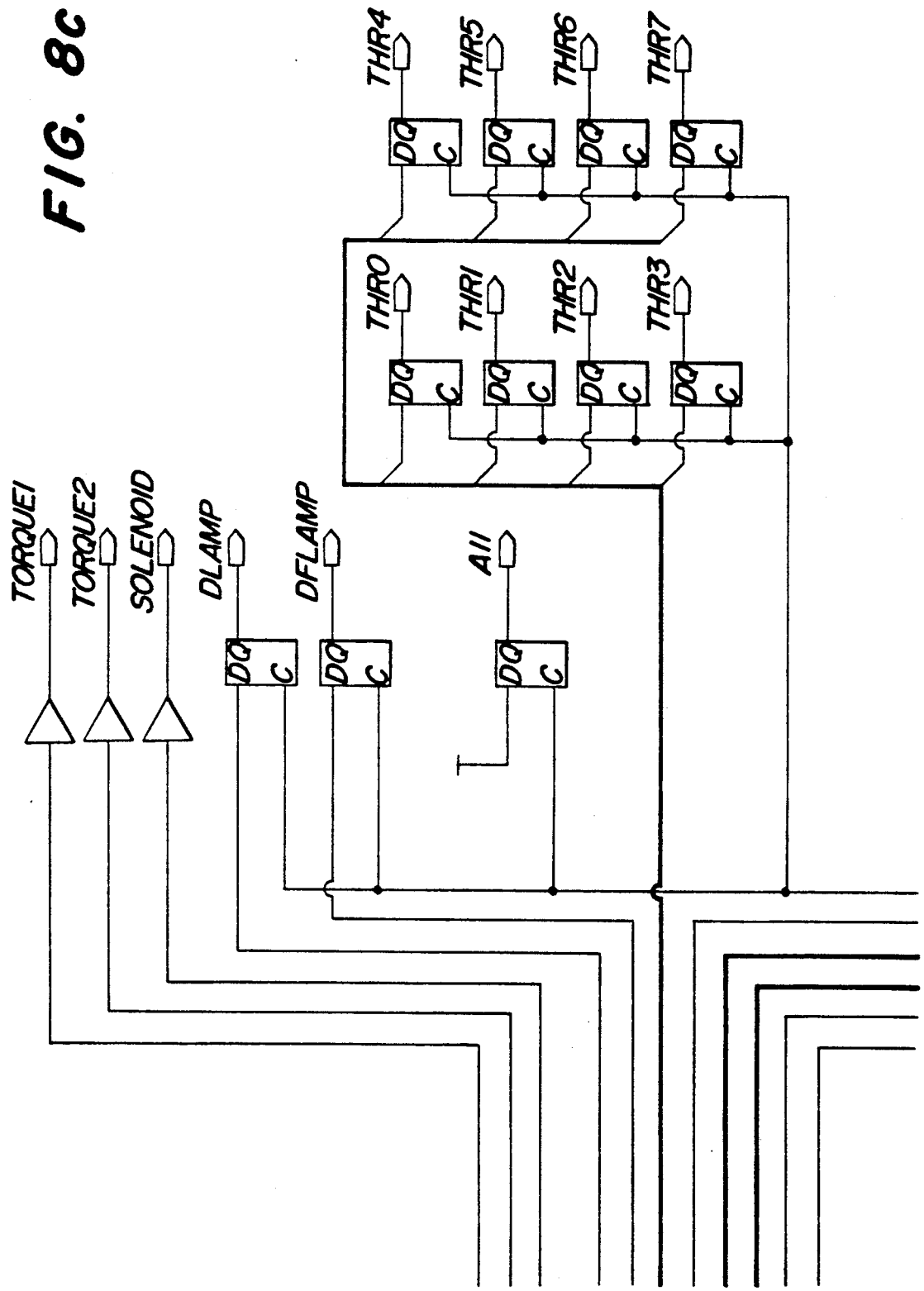
Figure 8E:
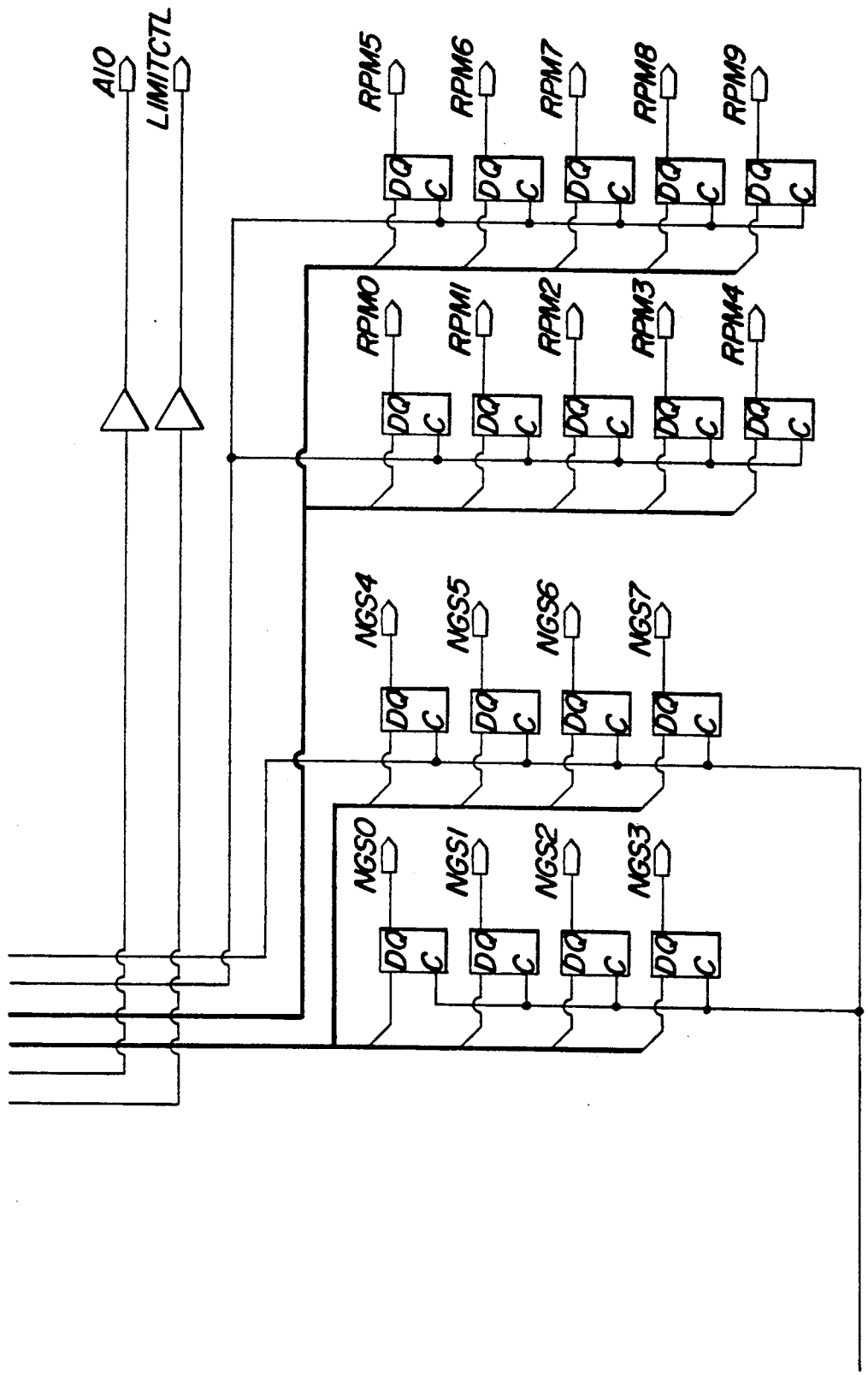
Figure 9A:
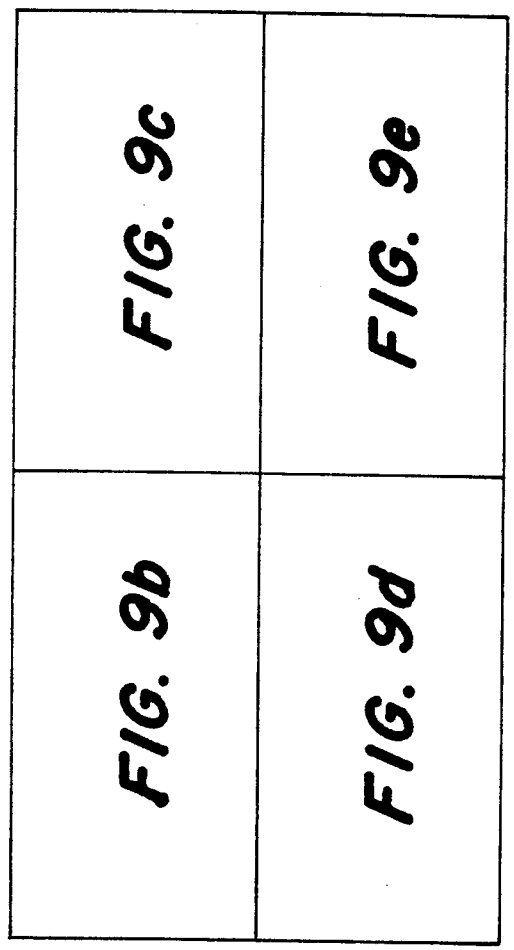
FIGS. 9a-9p are combined to form a lower level schematic diagram illustrating the Programmable Gate Array design of the link controller element I$0 of FIGS. 8a-8e.
Figure 9C:
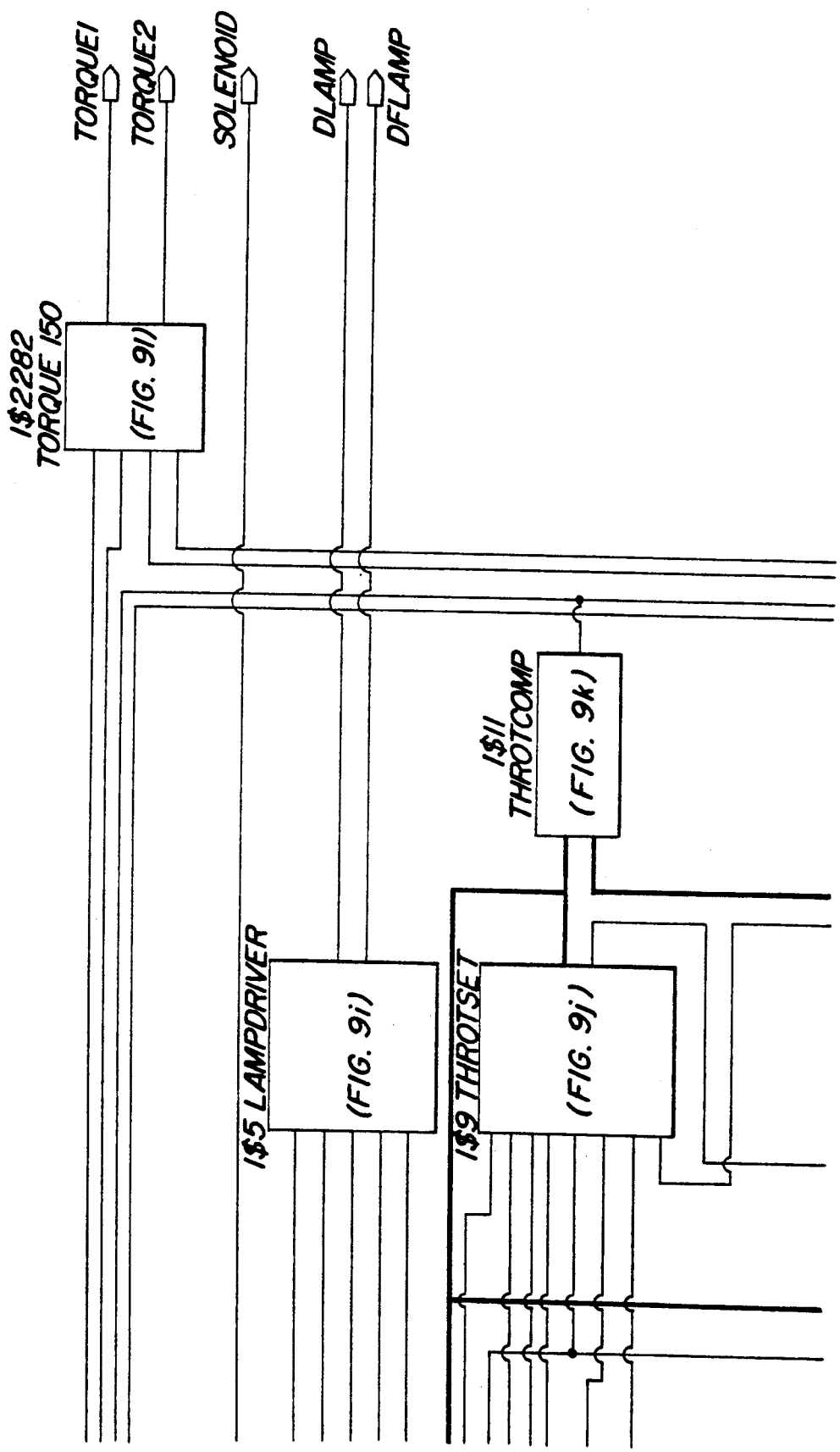
Figure 9E:
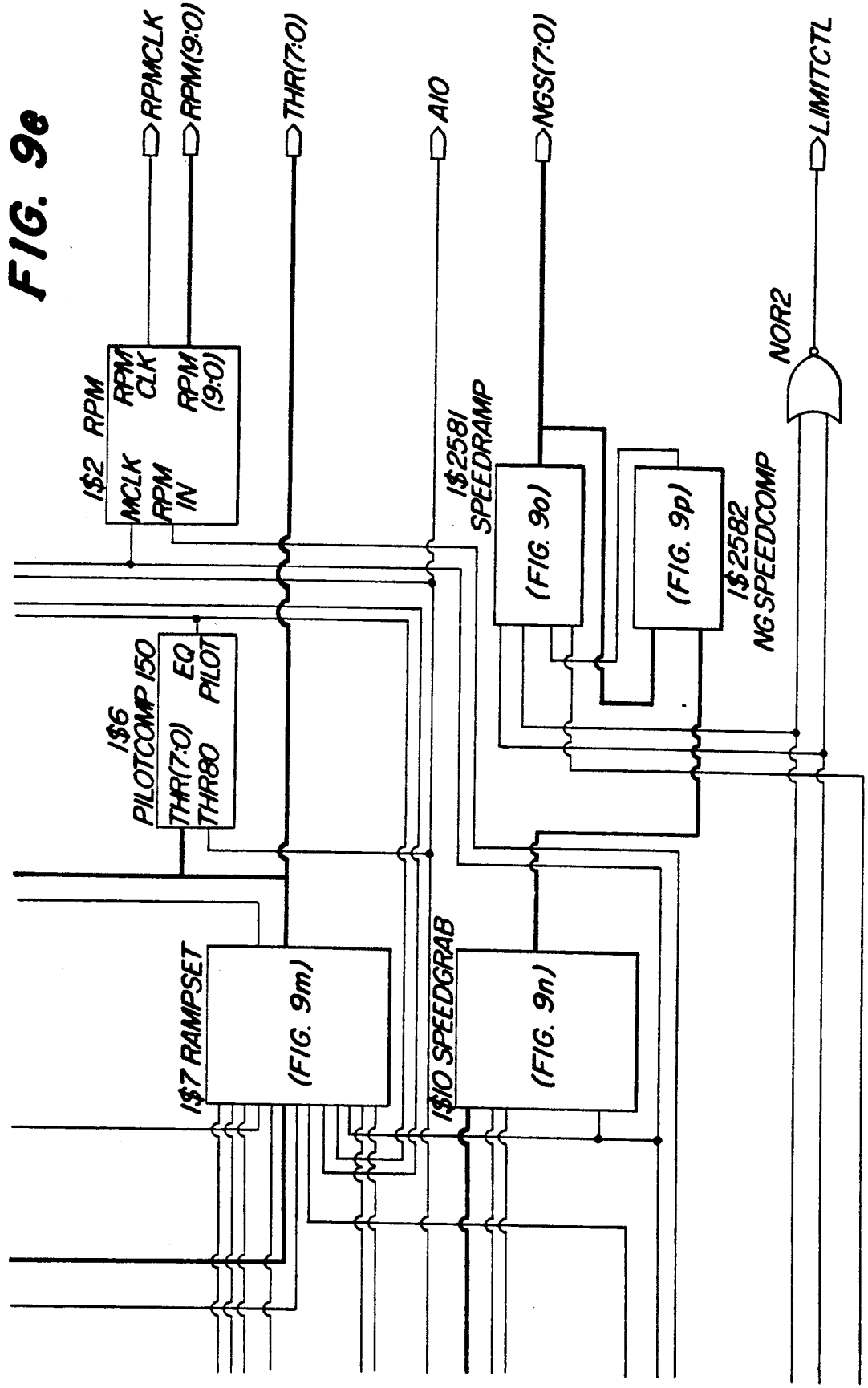
Figure 9H:
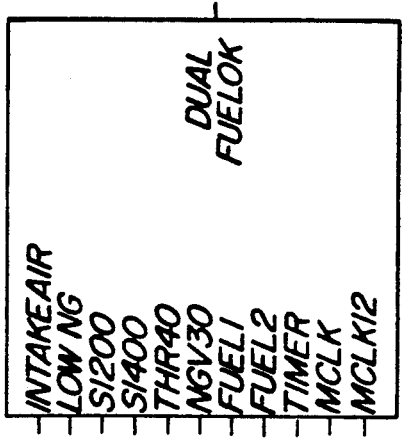
Figure 9J:
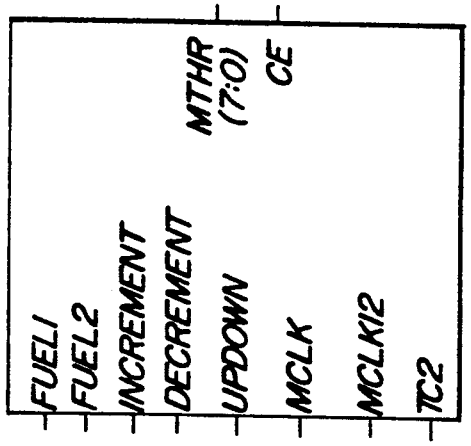
Figure 9G:
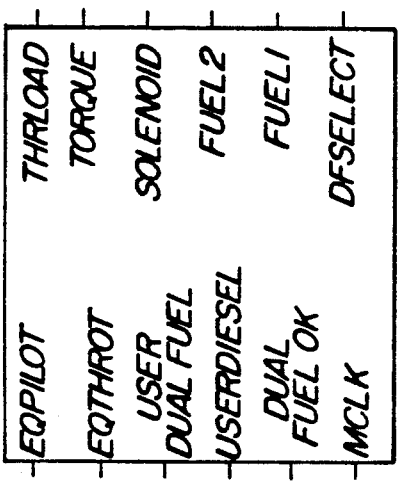
Figure 9I:
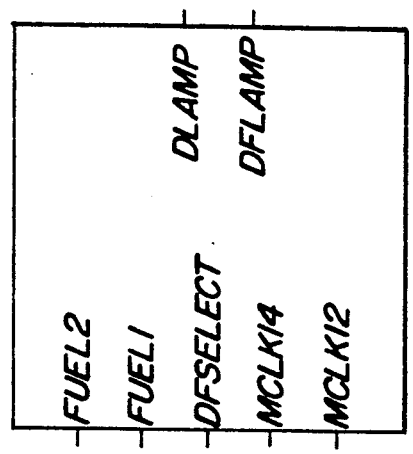
Figure 9F:
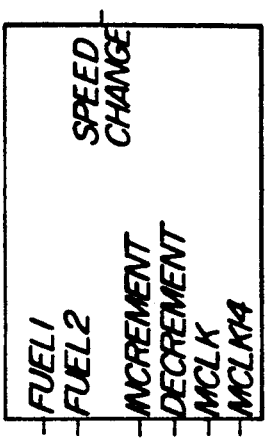
Figure 9K:
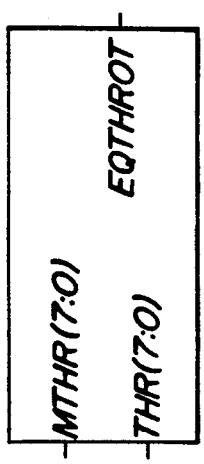
Figure 9L:
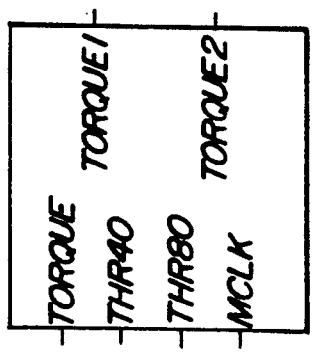
Figure 9P:
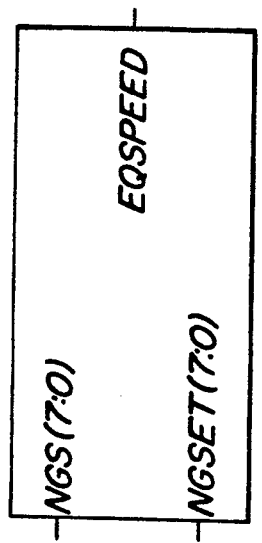
Figure 9N:
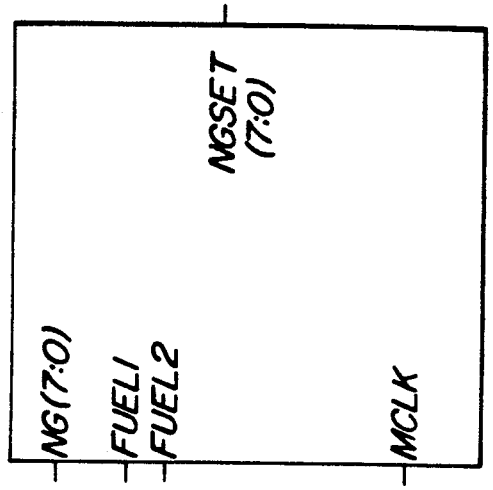
Figure 9O:
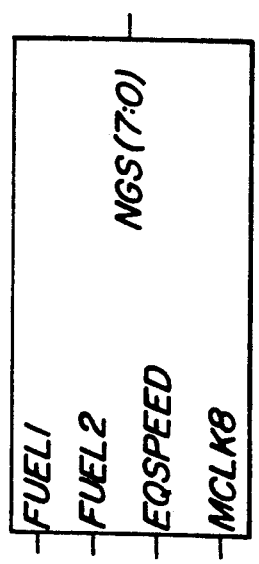
Figure 9M:
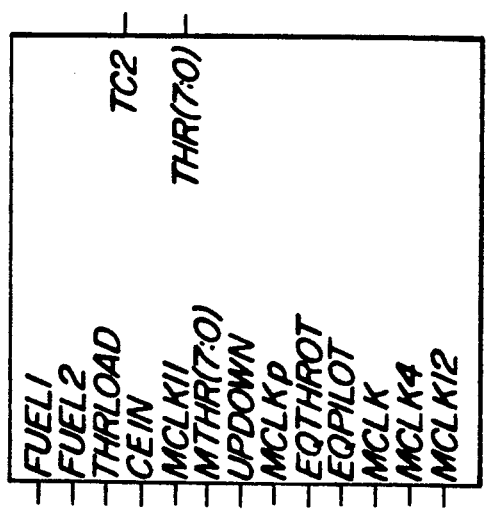

Referring now to FIG. 7, the output conditioning circuitry 64 protects the internal control circuitry 66 from voltage and current spikes which may occur externally. The circuitry 64 also conditions outgoing signals to provide appropriate impedance matching and current capabilities.

The three analog output signals are % Throttle (0.5-4.5 VDC) to the ECU 34, % Speed (4-8 VDC) and % Limit (0.6-8 VDC) to the governor 36. Each of the analog output voltages has a Zener diode which limits the voltage at the outputs to 5.1 V (% Throttle) and 8.7 V. Each resistor R52, R54 provides internal current limiting while the resistors R46, R47 for % Throttle and % Speed pull the outputs to GND at power-up.

The PGACONFIG output is a digital test signal used to indicate if the PGA configuration at power up was successfully completed. The output protection circuitry used is similar to that used for the three analog signals.

The diesel lamp 56 and dual fuel lamp 58 run off the 12 V supply (12 V, 500 mA typical) and are turned on or off by the link controller 40. The resistors R50, R51 provide pulldown at power-up and internal current limiting. The logic-level FETs Q3, Q4, when turned on (logic 1 at input), will sink the required current from the lamps.

The Torque Select driver circuit is similar to the Diesel and Dual Fuel Lamp drivers with Q1 and Q5 wired together in a wired-OR configuration. With R59 in series with Q5, the Torque Select output can be controlled to one of 3 states. These states are selected by the link controller 40 PGA.

The NG solenoid output driver circuit is also very similar to the above three discussed, with the 2 watt Zener diode (D21) added to provide protection against inductive kickback from the solenoid of NG valve 26.

Programmable Gate Array

The majority of the link controller 40 logic and control functions are designed into the PGA. Similar to a microprocessor, the PGA is a program-driven logic device. As stated earlier, an external serial PROM (Programmable Read-Only Memory) downloads a desired internal configuration into the PGA at power-up. A configuration program is loaded automatically from the PROM upon power-up or following an external reset. The configuration program is derived from the circuit diagrams shown in FIGS. 8-22 using the commercially available Xilinx design tools and software. These circuits are embodied within the configured PGA, and thus, a description of the structure and function of these circuits will constitute a description of the structure and function of the PGA.

The Link Controller design uses the XC3042PC84I-50 version of the PGA. This is an 84-pin surface mount device with 74 user-available inputs and outputs, and 144 Configurable Logic Blocks "CLB".

The PGA performs the following functions:
1. Calculates an engine RPM value from the ECU 34 supplied RPM signal.
2. Allows start-up in pure diesel fuel mode and allows normal diesel operation if desired.
3. Controls fuel selection and changeover from diesel to dual fuel and vise versa.
4. Controls operator speed adjustments and provide appropriate signals to the ECU 34 and governor 36. This includes selection of the ECU 34 Torque limiting function (Torque Select).
5. Compares NG Valve 30 position with a fixed reference value representing approximately the position at 30% load.
6. Compares diesel throttle with fixed reference values representing approximately 40% load and 80% load values.
7. Monitors diagnostics (Intake Air Temperature, Low NG Pressure, Engine RPM and Engine Load) which would affect the engine mode of operation and forces a fuel changeover to diesel, if necessary.
8. Controls illumination of the Diesel lamp 56 and Dual Fuel lamp 58.

The control circuitry implemented by the PGA will now be described in a hierarchical manner. Referring now to FIG. 8, there is shown a top level schematic of the functional blocks in the PGA.

The Link Controller (IS0) functional block represents all digital logic which is configured using the Xilinx PGA CLBs (not shown). The circuitry shown external to this block is configured using the Xilinx PGA Input-/Output Blocks (IOBs) (not shown). The inputs and outputs are buffered or latched and can be configured for CMOS or TTL logic.

The following inputs are buffered:
1. A UserDualFuel input allows the user to select dual fuel operation from a momentary contact switch. A UserDualFuel=1 represents no selection, while a UserDualFuel=0 represents dual fuel selection.
2. A UserDiesel input allows the user to select diesel operation from a momentary contact switch. A UserDiesel=1 represents no selection, while a UserDiesel=0 represents diesel fuel selection.
3. An Increment input allows the user to increase engine speed via actuation of a momentary contact switch. An Increment=1 represents no selection, while an Increment=0 represents an increase in engine speed.
4. A Decrement input allows the user to decrease engine speed via actuation of a momentary contact switch. A Decrement=1 represents no selection, while a Decrement=0 represents a decrease in engine speed.
5. An IntakeAir sensor switch input indicates when the intake air temperature to the engine exceeds 53 degrees C. An IntakeAir=1 represents no fault (T<53), while an IntakeAir=0 represents a fault (T>53).
6. A LowNG sensor switch input indicates when available NG Pressure for dual fuel operation is less than 13 psi.

7. The RPMin (0-5 VDC TTL) signal, 10 pulses per engine revolution, is the engine speed signal from the ECU 34 auxiliary speed sensor. The Link Controller user this signal to measure engine RPM.

8. MCLK (12.8 kHz) is a master clock signal, generated externally, which clocks the majority of the PGA control circuitry.

9. MCLK4 (800 Hz) is a clock signal, generated externally, used to ramp the diesel throttle (% Throttle) when switching from dual fuel to diesel fuel.

10. MCLK8 (50 Hz) is a clock signal, generated externally, used to ramp the % Speed setpoint from 0 to the captured value.

11. MCLK10 (12.5 Hz) is a clock signal, generated externally, used to ramp the diesel throttle when switching from diesel fuel to dual fuel. This clock signal also determines the rate of user speed adjustments.

12. MCLK14 (0.78 Hz) clock signal, generated externally, used to clock the link controller timer circuits.

13. NGV30 is the output signal from the NG Valve position feedback comparator (not shown), and provides an indication of engine load while operating on dual fuel.

The following inputs are latched:

1. NG0, NG1, NG2, NG3, NG4, NG5, NG6, and NG7 are 8-bit Speed Setpoint values from an EPROM Lookup table, used to provide a speed setpoint to the governor 36 at switchover to dual fuel.

The following are buffered outputs:

1. Torque and Torque2 are ECU 34 Torque limiting select lines which select one of three torque curves which are programmed into the ECU 34 (see FIG. 23).

2. A Solenoid output enables or disables the NG supply solenoid valve 26.

3. A10 is a control line for address bit A10 of a lookup table which makes available position limit values with both the normal and boost diesel pilot quantities.

4. A11 is a control line for address bit A11 of a lookup table which makes position limit values for engines with different horsepower ratings.

5. Limitctl is a control line for an output enable (OE) line of an NGLimit Lookup Table which permits the link controller 40 to tri-state the lookup table outputs when running on diesel fuel. Pull down resistors at the lookup table output force 100% % Limit value during diesel fuel operation (no NG).

The following are latched outputs:

1. DLamp is the diesel lamp control line.

2. DFLamp is the dual fuel lamp control line.

3. THR0, THR1, THR2, THR3, THR4, THR5, THR6 and THR7 are a 8-bit throttle value sent to the diesel ECU 34. These digital values are converted to 0.5-4.5 VDC analog voltages by a DAC0830 digital-to-analog converter (U7 of FIG. 6).

4. RPM0, RPM1, RPM2, RPM3, RPM4, RPM5, RPM6, RPM7, RPM8 and RPM9 are a 10-bit RPM value calculated by the link controller 40 from the RPMin input signals and are used to address EPROM Lookup tables (U4, U5 of FIG. 6).

5. NGS0, NGS1, NGS2, NGS3, NGS4, NGS5, NGS6 and NGS7 are an 8-bit speed setpoint value sent to the governor 36. These digital values are converted to 4-8 VDC analog voltages by a DAC0830 digital-to-analog converter (U6 of FIG. 6).

Referring now to FIG. 9, this schematic is a functional block diagram for the PGA of the link controller element I$0 of FIG. 8. The link controller 40 element I$0 is partitioned into 13 functional blocks and some associated "glue" logic:

1. RPM (FIG. 10).

The RPM calculation circuit takes the auxiliary speed sensor input from the diesel ECU 34 (10 pulses per engine revolution, 0-5 VDC, TTL) and calculates a 10-bit engine RPM value (RPM(9:0)), which is used to address the link controller 40 Lookup tables.

Figure 11:
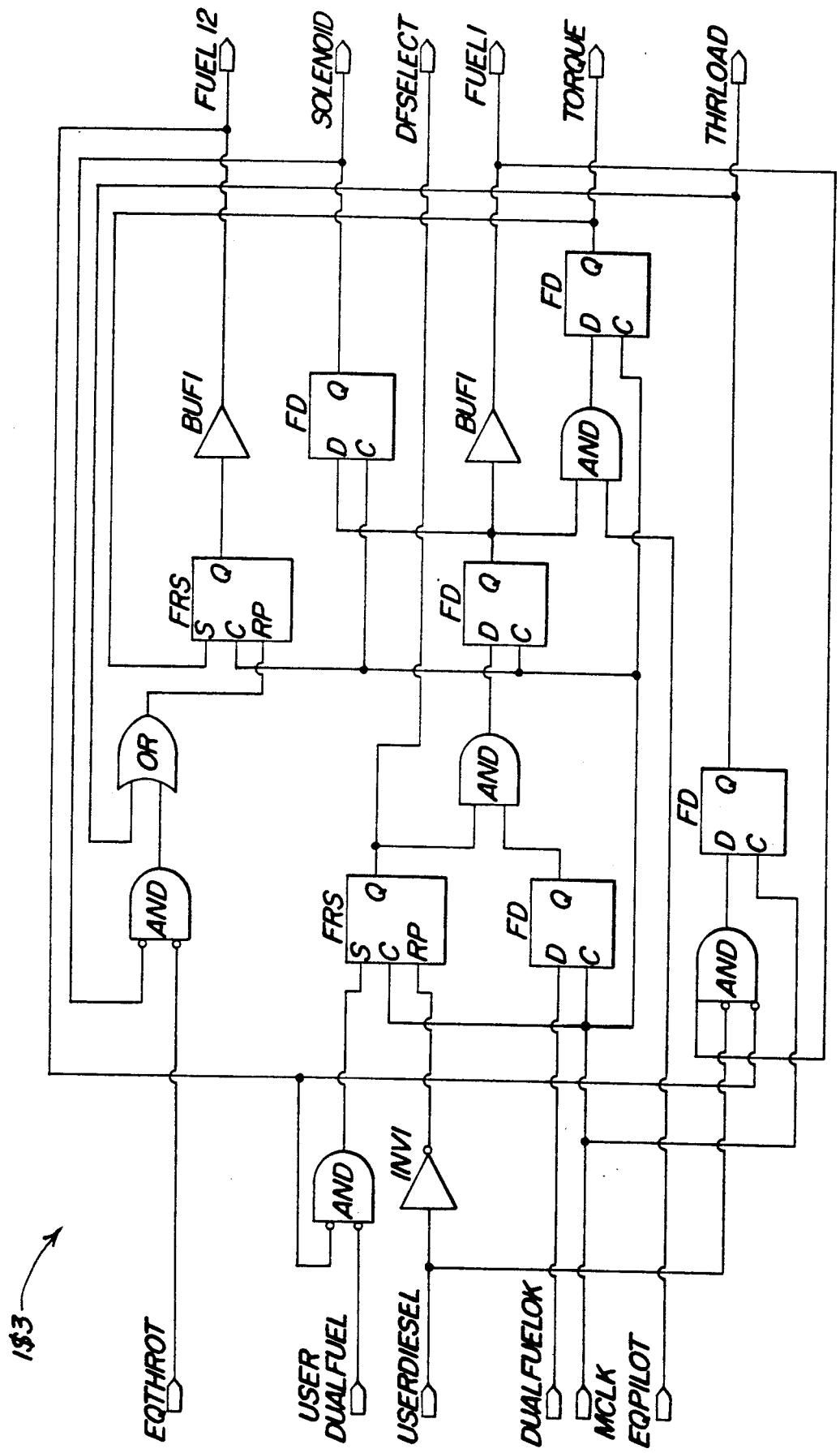
FIG. 11 is a detailed schematic diagram illustrating the Programmable Gate Array design of the fuel select circuit (element I$3) of FIGS. 9b and 9o.

2. Fuel Select (FIG. 11).

The fuel select circuit has several functions. At powerup the system defaults to diesel operation mode. If the link controller 40 diagnostics (FIG. 13) determines that conditions are OK for dual fuel operation, this circuit allows the user to select diesel fuel or dual fuel modes. If conditions do not permit dual fuel operation (such as low NG pressure) this circuit will disable dual fuel operation. This could result in a forced return to diesel. In all cases this circuit also controls the selection of diesel ECU 34 torque limiting function (Torque) and NG Solenoid enable/disable (which controls valve 26).

Figure 12:
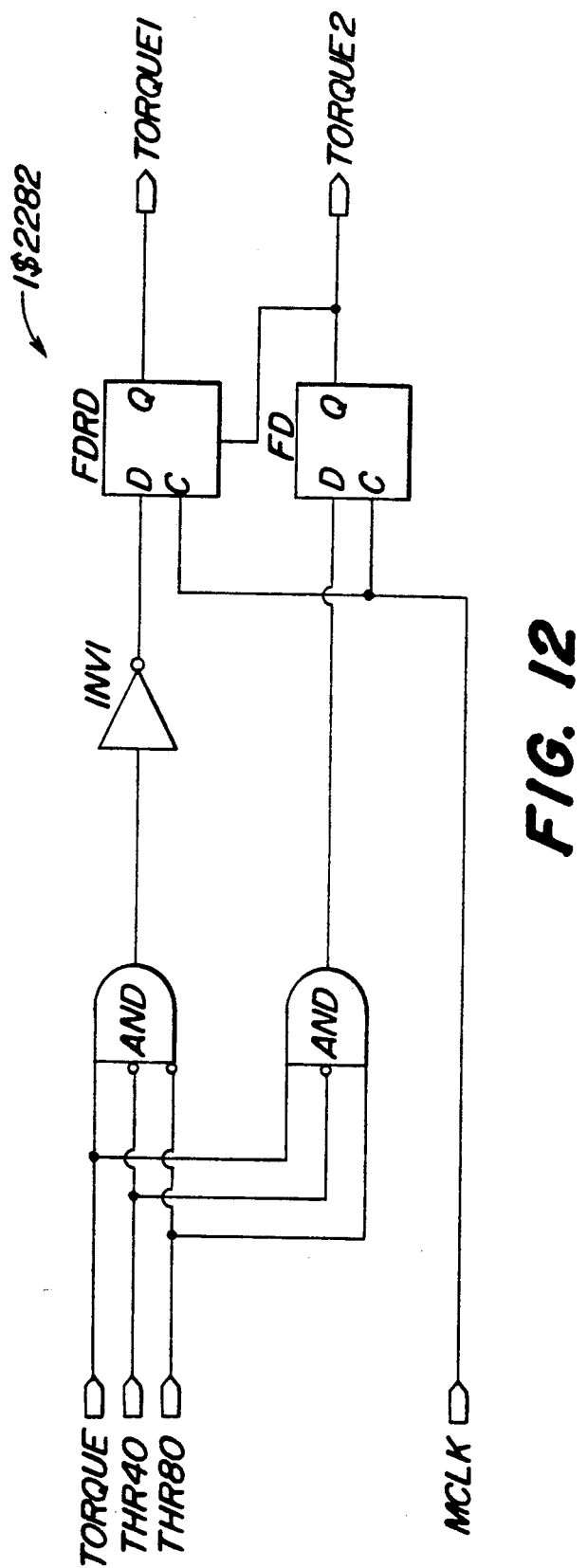
FIG. 12 is a detailed schematic diagram illustrating the Programmable Gate Array design of the torque select circuit (element I$2282) of FIGS. 9c and 9l.

3. Torque150 (FIG. 12).

The Torque circuit monitors the Torque output of the fuel select circuit (FIG. 11) and the outputs of the Thrload circuit (FIG. 15) to control the ECU 34 Torque Select 0/P FETs.

Figure 13:
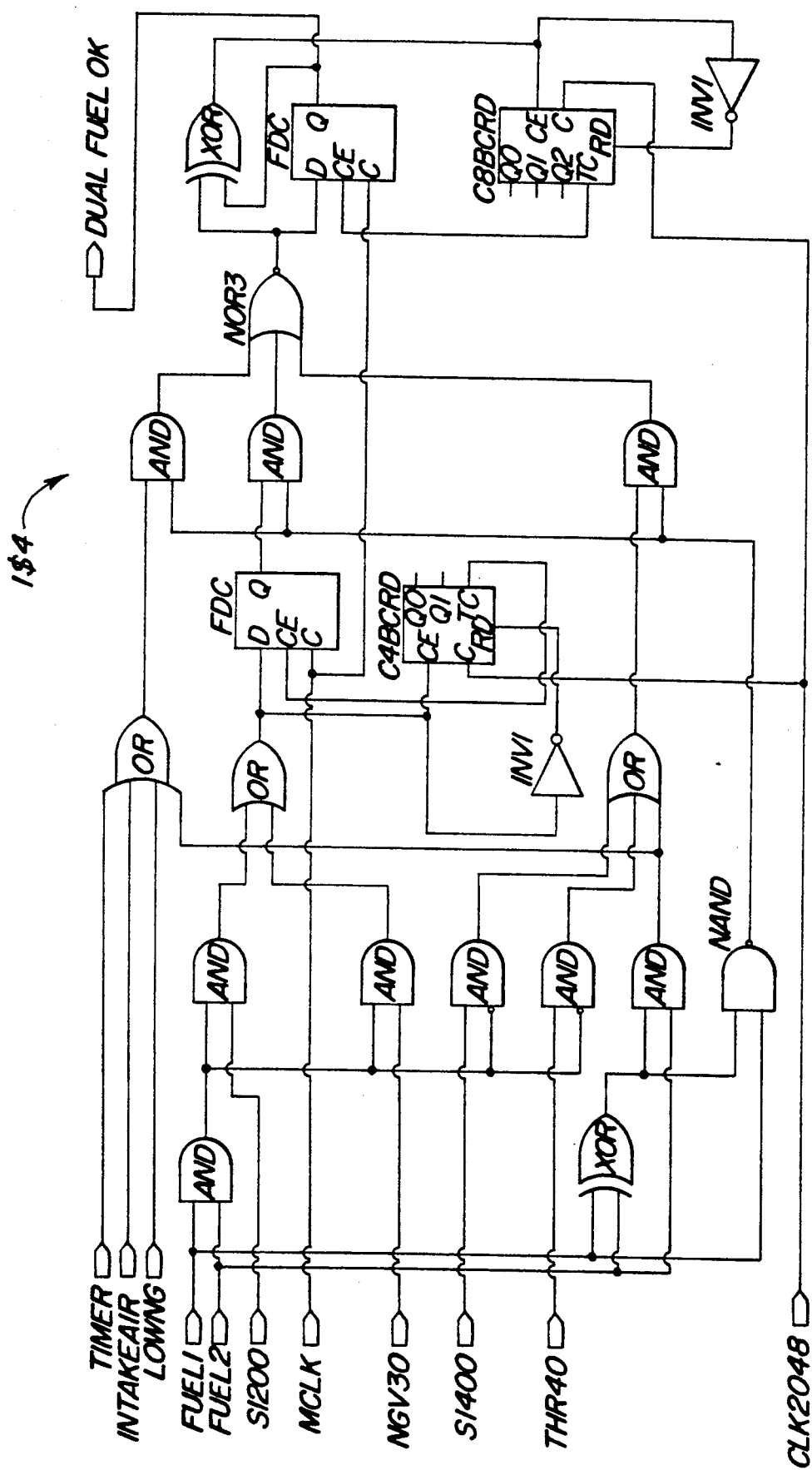
FIG. 13 is a detailed schematic diagram illustrating the Programmable Gate Array design of the diagnostics circuit (element I$4) of FIGS. 9d and 9h.

4. Diagnostic (FIG. 13).

The diagnostics circuit monitors the engine speed, engine load, NG pressure and intake air temperature and determines if conditions are OK for dual fuel operation. The result is output via a single control line (DualFuelOK). Engine speed is actually monitored by the SpeedComp circuit (FIG. 14) and engine load by a Thrload150 circuit (FIG. 15) which pass their result to the diagnostic circuit.

The diagnostic circuitry implements a 1.25 second time delay filter in detecting any changes in the fault status of the dual fuel engine. This means that any fault must be present or absent for 1.25 seconds in order for it to be detected. Also, when operating on dual fuel, the speed and NG Valve Position faults are flagged as a critical errors. Therefore, if either of these two faults occur the link controller 40 disallows dual fuel operation. A system reset is required to permit dual fuel operation.

Figure 14:
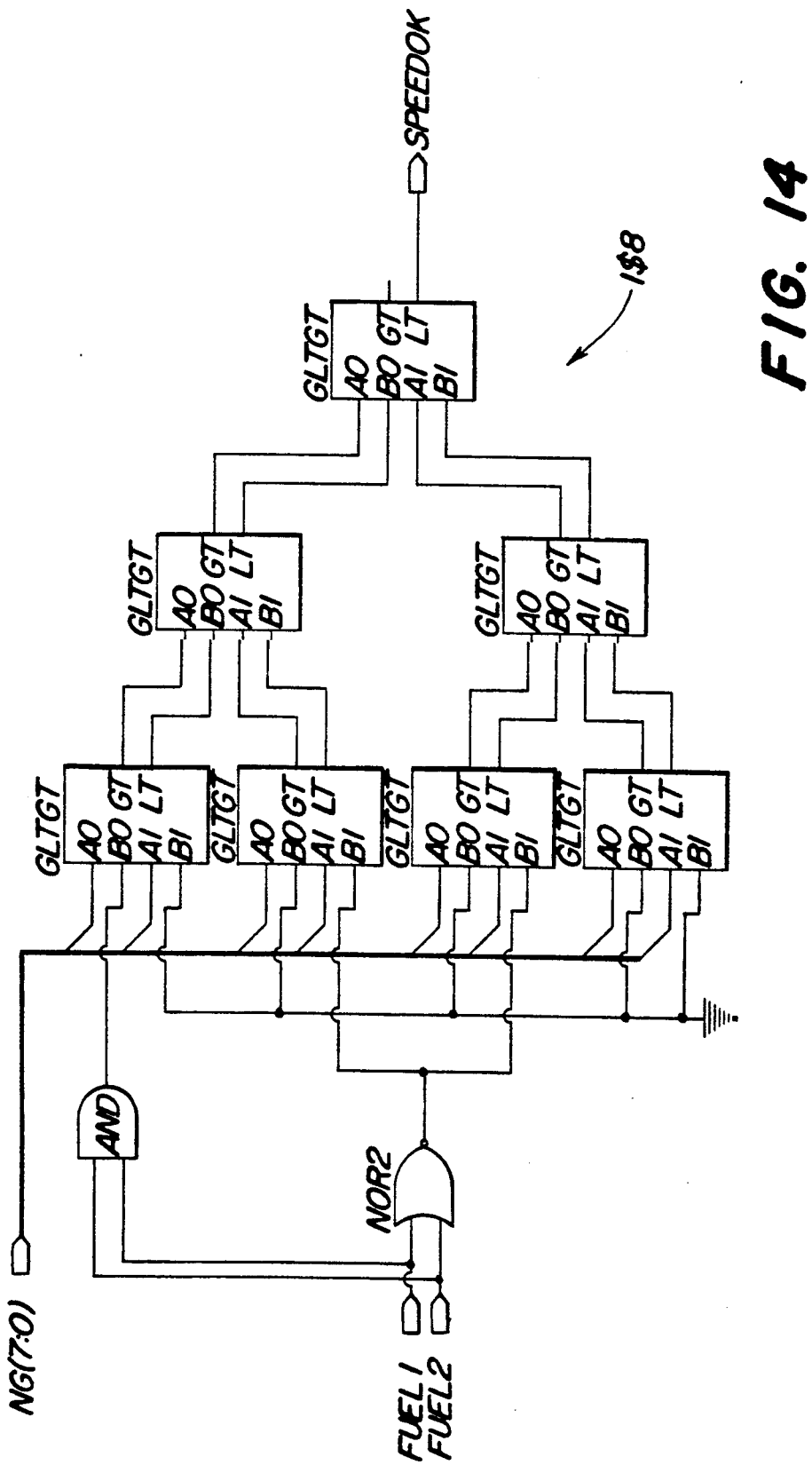
FIG. 14 is a detailed schematic diagram illustrating the Programmable Gate Array design of the engine speed comparator circuit (element I$8) of FIG. 9d.

5. SpeedComp (FIG. 14).

The speed comparison circuit compares the engine speed with two internally set pre-determined speed settings to determine if it is less than these two values. During diesel operation, the link controller 40 monitors when the engine speed is less than 1400 RPM (this disables switchover to dual fuel), while during dual fuel operation it monitors when the engine speed is less than 1200 RPM (this forces a return to diesel).

Figure 15:
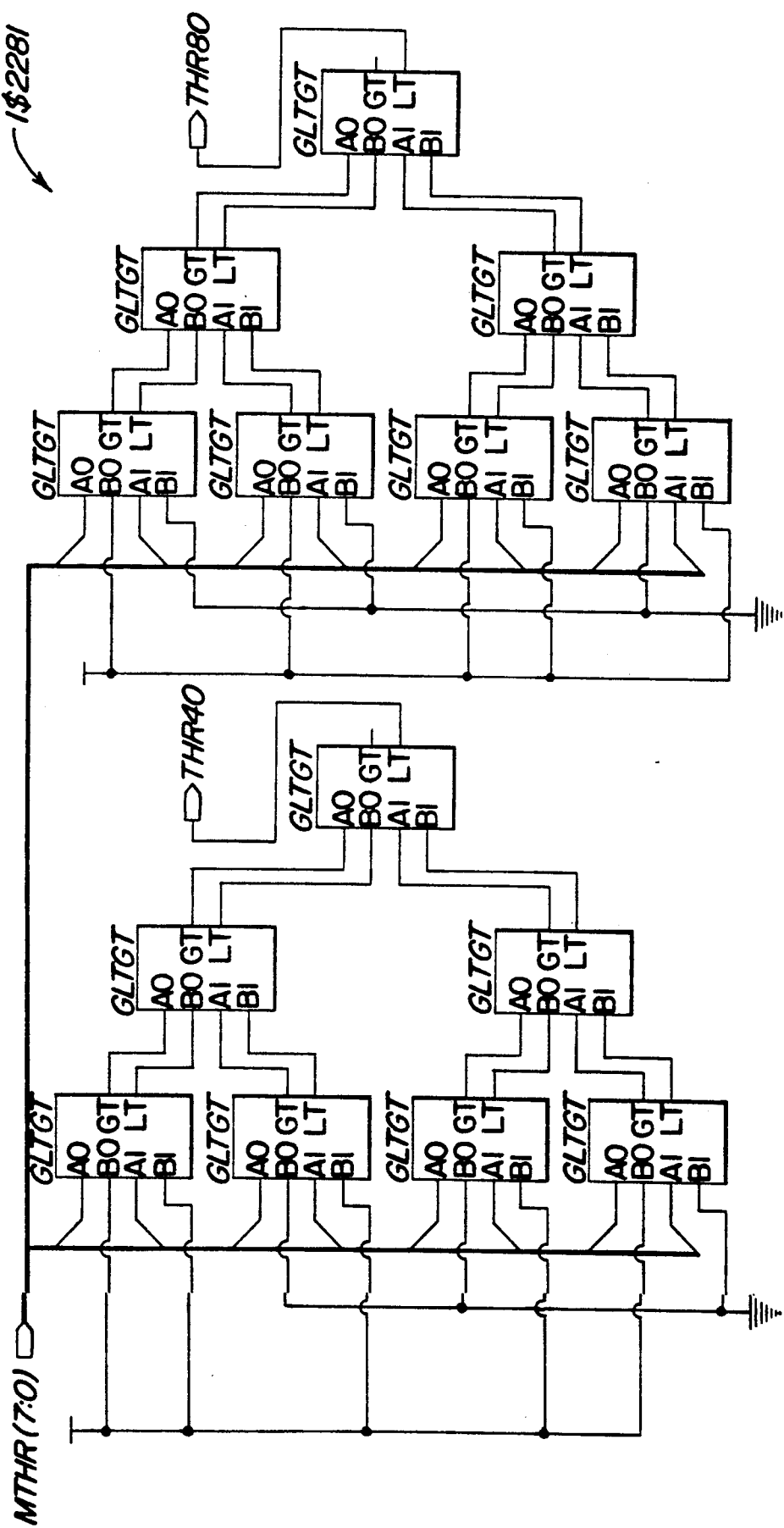
FIG. 15 is a detailed schematic diagram illustrating the Programmable Gate Array design of the engine load comparator circuit (element IS2281) of FIG. 9d.

6. Thrload150 (FIG. 15).

The comparator circuit used to provide an indication of engine load. The circuit compares the throttle value set by the operator with internally programmed constant values for 40% and 80% load. The outputs THR40 and THR80 are then used by the Diagnostic circuit (FIG. 13), the Torque circuit (FIG. 12) and to control the A10 output address bit.

Figure 16:
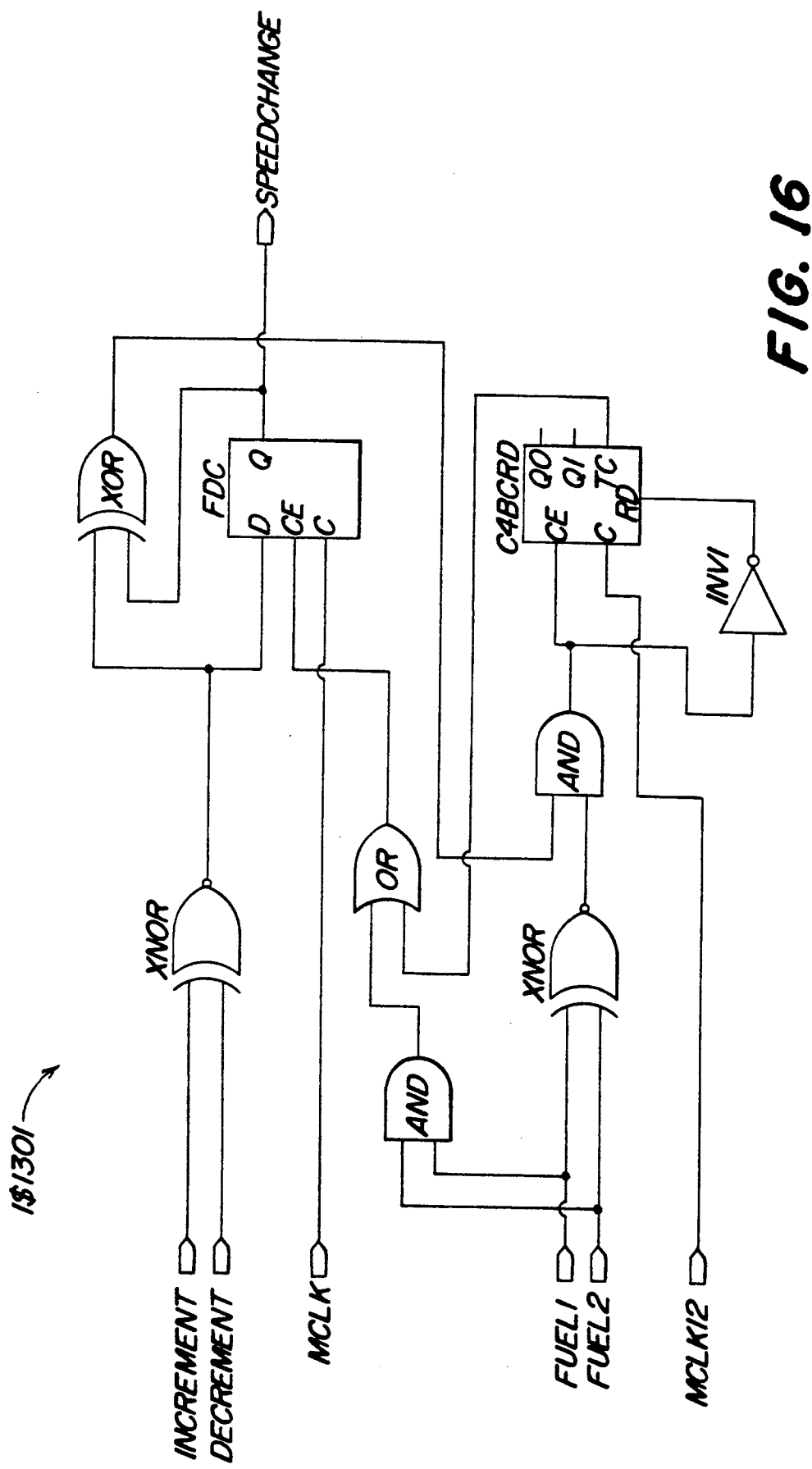
FIG. 16 is a detailed schematic diagram illustrating the Programmable Gate Array design of the speed adjust detection circuit (element IS1301) of FIGS. 9b and 9f.

7. Speed Change (FIG. 16).

The speed change circuit detects when the operator has selected a speed adjustment during dual fuel operation (by toggling switch 52) and forces a return to diesel fuel operation, where the speed adjustment is made by changing the throttle signal (% Throttle) to the ECU 34. There is a 2.5 second time delay filter implemented before returning to dual fuel operation following any speed adjustments.

Figure 17:
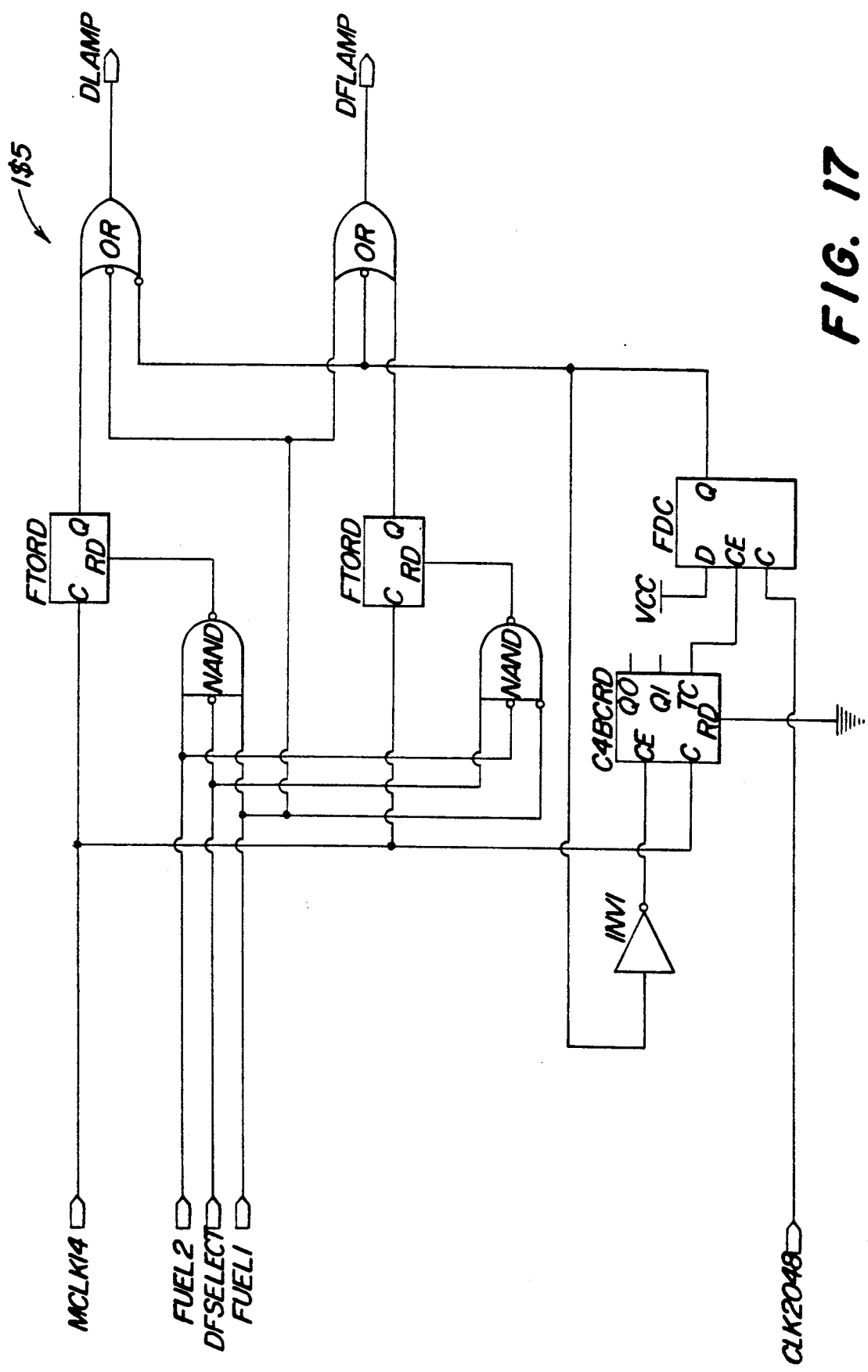
FIG. 17 is a detailed schematic diagram illustrating the Programmable Gate Array design of the lamp driver circuit (element IS5) of FIGS. 9c and 9i.

8. LampDriver (FIG. 17).

The lampdriver circuit controls the state of the Diesel lamp 56 and the Dual Fuel lamp 50. The lamps are illuminated for 5 seconds at power-up as a test feature. Following this the lamps indicate the status of the system as follows:

| Diesel | Dual Fuel | Engine Status |
| --- | --- | --- |
| ON | OFF | diesel operation |
| ON | FLASH | user select dual fuel switchover to dual fuel disabled |
| OFF | ON | dual fuel operation |
| FLASH | ON | switchover to diesel fault |

9 and 10. Throtset (FIG. 18), Rampset (FIG. 19).

The throtset and rampset circuitry work together to control the throttle signal to the diesel ECU 34. The 8-bit digital throttle value (THR(7:0)) is converted to a 0.5–4.5VDC analog voltage by the DAC0830 digital-to-analog converter (U7).

At power-up (diesel mode), the user can increase or decrease engine speed over the range 0.5 VDC to 4.5 VDC. Engine speed adjustments are enabled only in diesel mode. The XNOR gate and 3-input AND gate are used to disable user speed adjustments during switchovers. At the start of the changeover sequence to dual fuel the rampset circuitry implements a 5 second delay before pulling back the diesel throttle. This allows the governor 36 dynamics 5 seconds to settle. Following this 5 second delay the rampset circuitry ramps down the throttle voltage to an internally preprogrammed pilot value for dual fuel operation. During dual fuel operation the pilot throttle voltage is maintained constant and limited by the reduced torque curve (FIG. 11 and FIG. 12) in the diesel ECU 34. When the system returns to diesel mode, the rampset circuitry ramps up the throttle voltage to the value set by the user in diesel mode (MTHR(7:0)). If the user selects diesel operation during a changeover to dual fuel, the rampset circuit aborts the changeover by loading the user set % Throttle value instantaneously (MTHR(7:0)).

Figure 20:
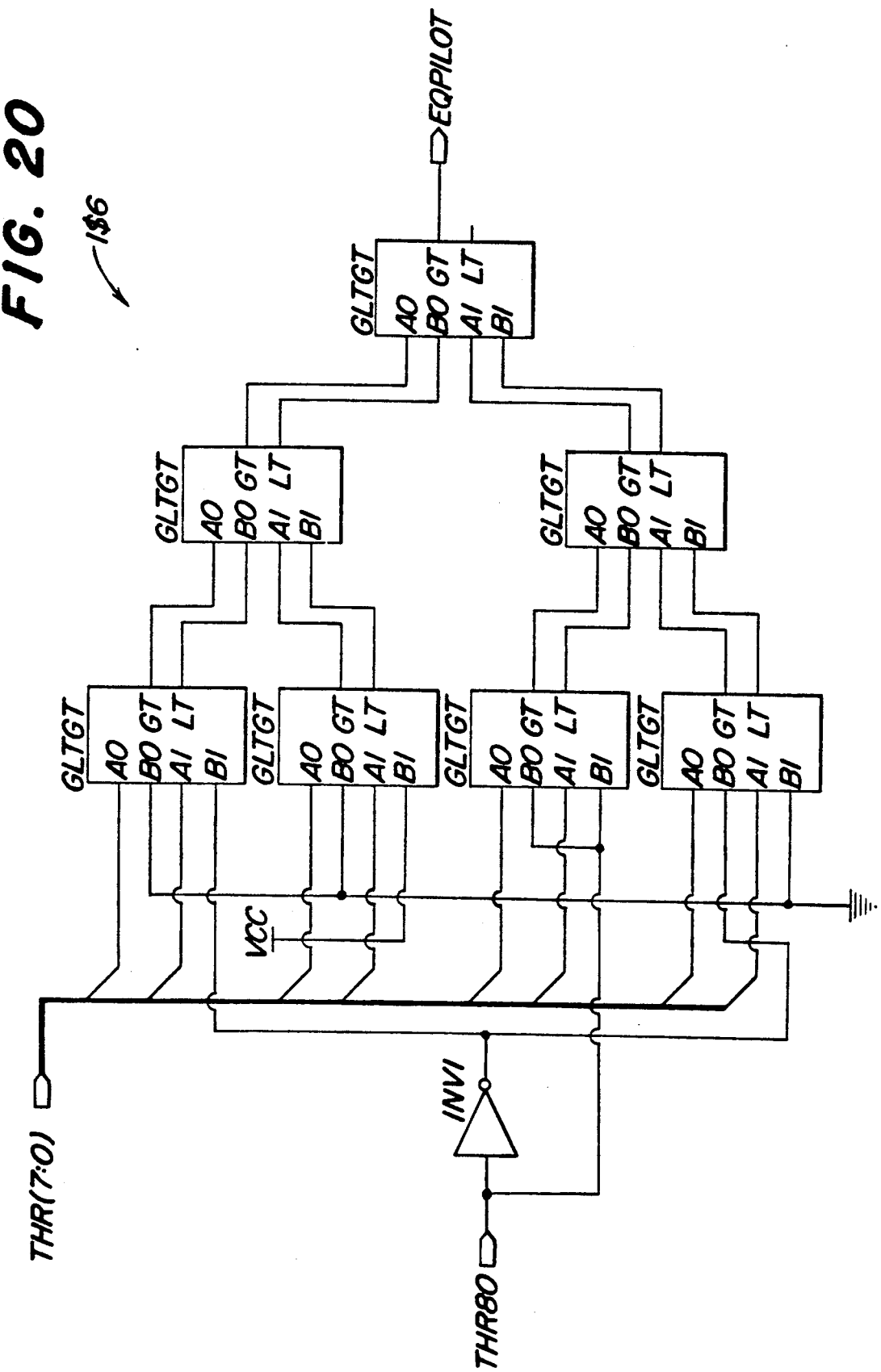
FIG. 20 is a detailed schematic diagram illustrating the Programmable Gate Array design of the pilot throttle comparator circuit (element IS6) of FIG. 9e.

11. PilotComp (FIG. 20).

The pilot comparison circuit compares the diesel throttle voltage to a pre-programmed diesel pilot voltage during switchover to dual fuel. Once the two values are equal, the throttle voltage is held by rampset (FIG. 19) and the switchover to dual fuel is completed. There are actually two pre-programmed diesel pilot voltages, one for normal diesel pilot (<80% load) and one for boost diesel pilot (>80% load).

Figure 21:
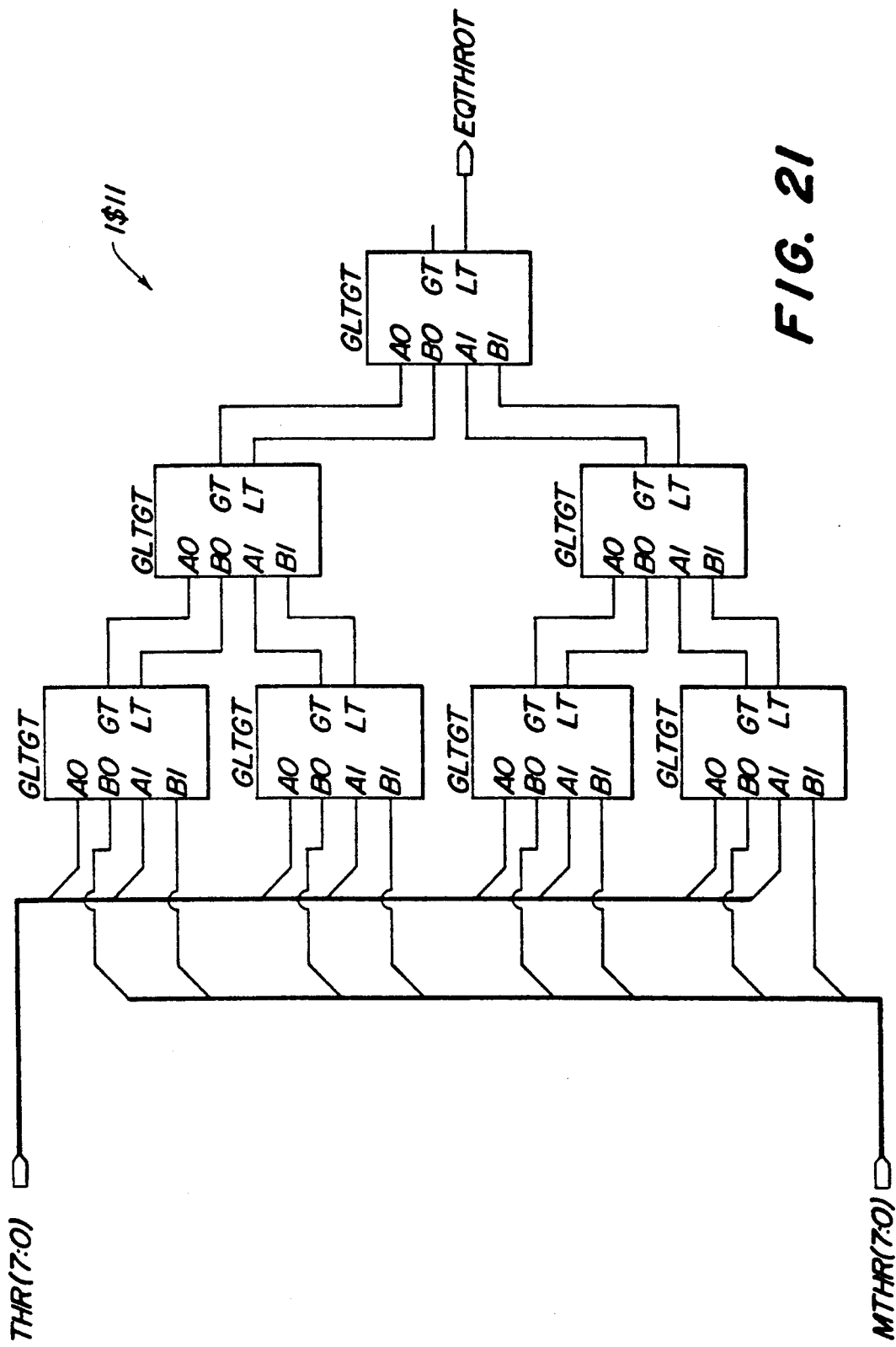
FIG. 21 is a detailed schematic diagram illustrating the Programmable Gate Array design of the throttle comparator circuit (element IS11) of FIGS. 9c and 9k.

12. ThrotComp (FIG. 21).

The throttle comparison circuit compares the diesel throttle voltage to the user set throttle voltage (MTHR(7:0)) during switchover to diesel. Once the two values are equal, the throttle voltage is held by rampset (FIG. 19) and the switchover to diesel is completed.

Figure 22:
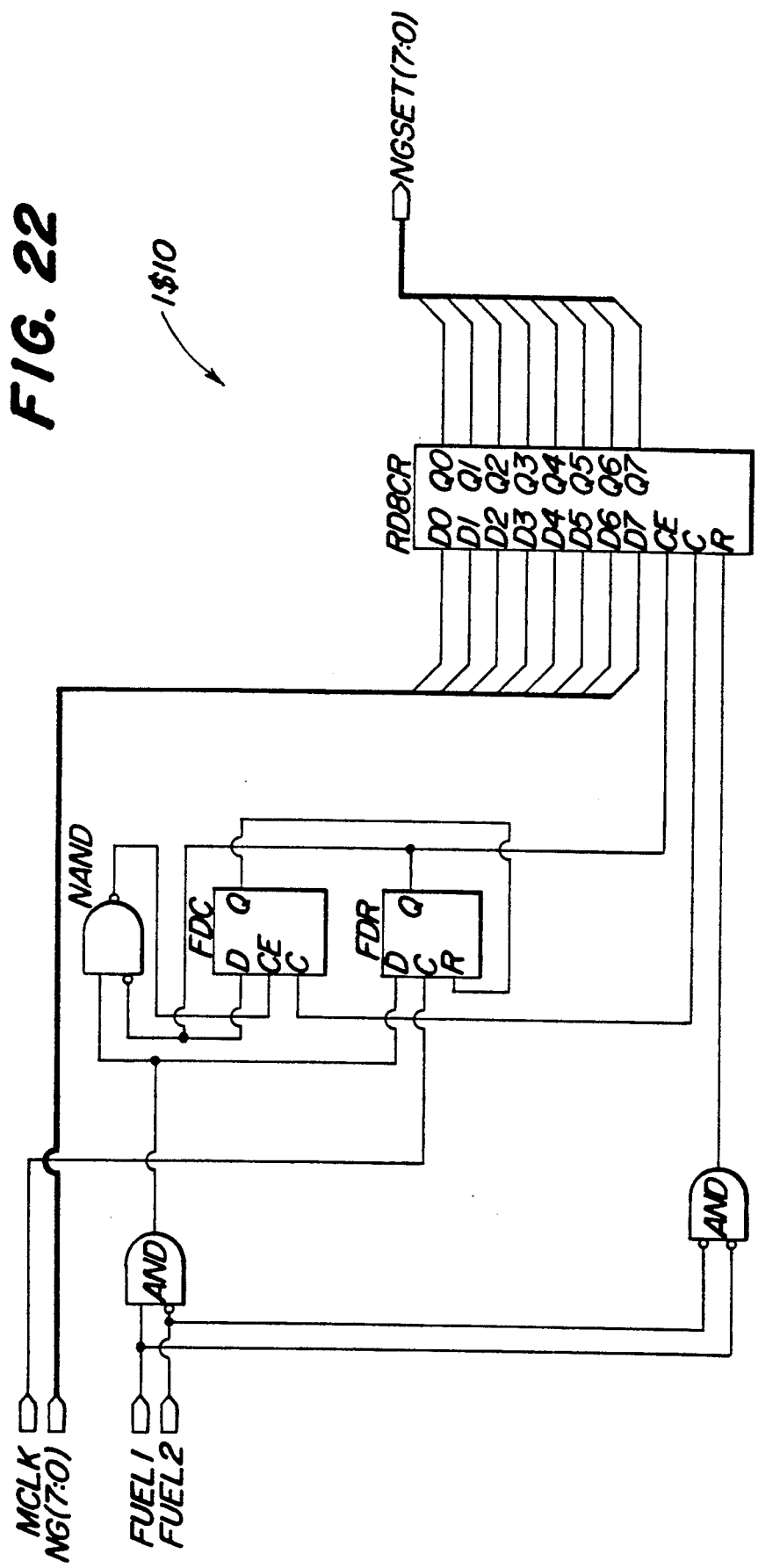
FIG. 22 is a detailed schematic diagram illustrating the Programmable Gate Array design of the NG speed setpoint circuit (element IS10) of FIGS. 9e and 9n.

13. Speedgrab (FIG. 22).

The speedgrab circuit latches the speed setpoint voltage for the governor 36. The 8-bit digital speed value NGset (7:0) is latched from the EPROM lookup table (U5) on the link controller circuit board.

Figure 23:
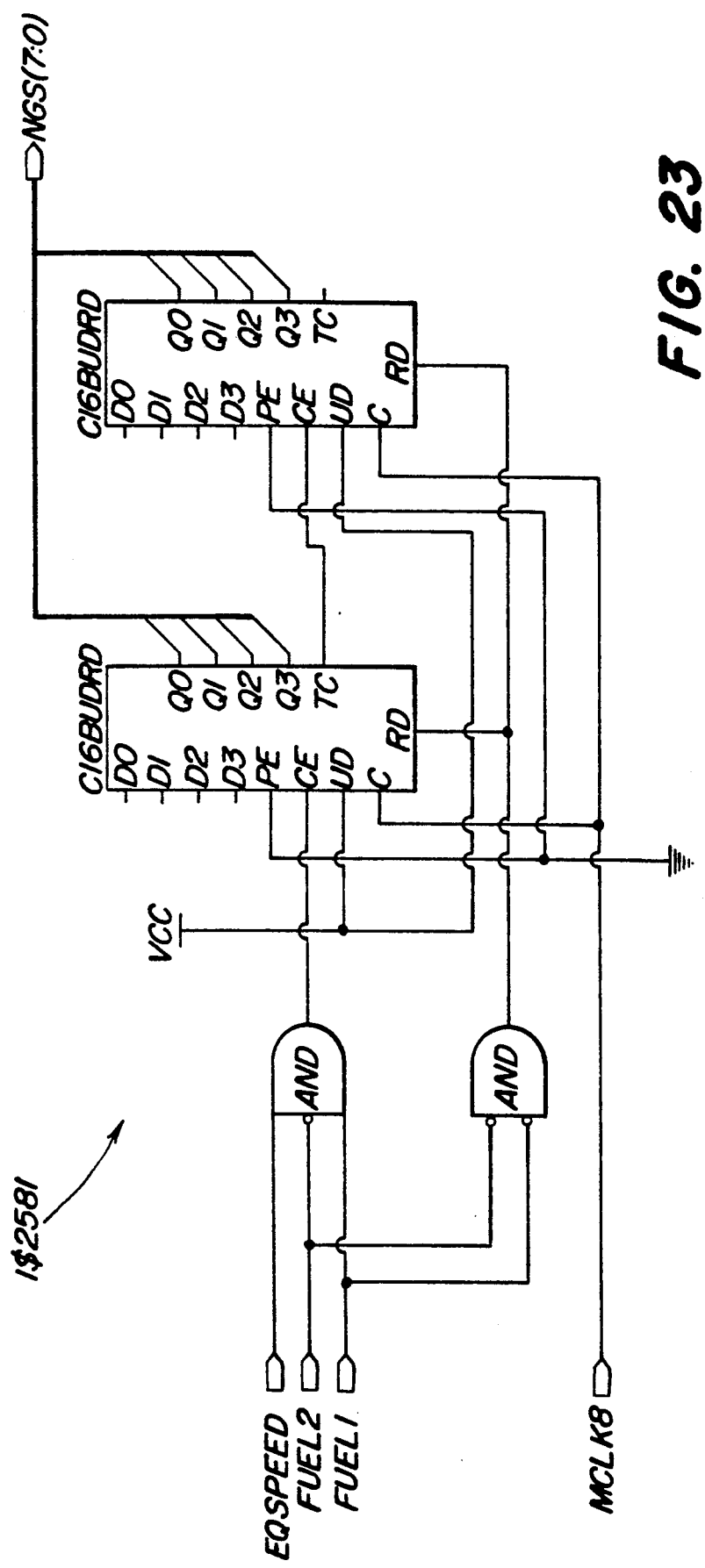
FIG. 23 is a detailed schematic diagram illustrating the Programmable Gate Array design of the Speedramp circuit (element IS2581) of FIGS. 9e and 9o.

14. Speedramp (FIG. 23).

The Speedramp circuit ramps the NG Speed setpoint (NGS(7:0)) from 0% to the latched speed setpoint value (NGSet(7:0)).

Figure 24:
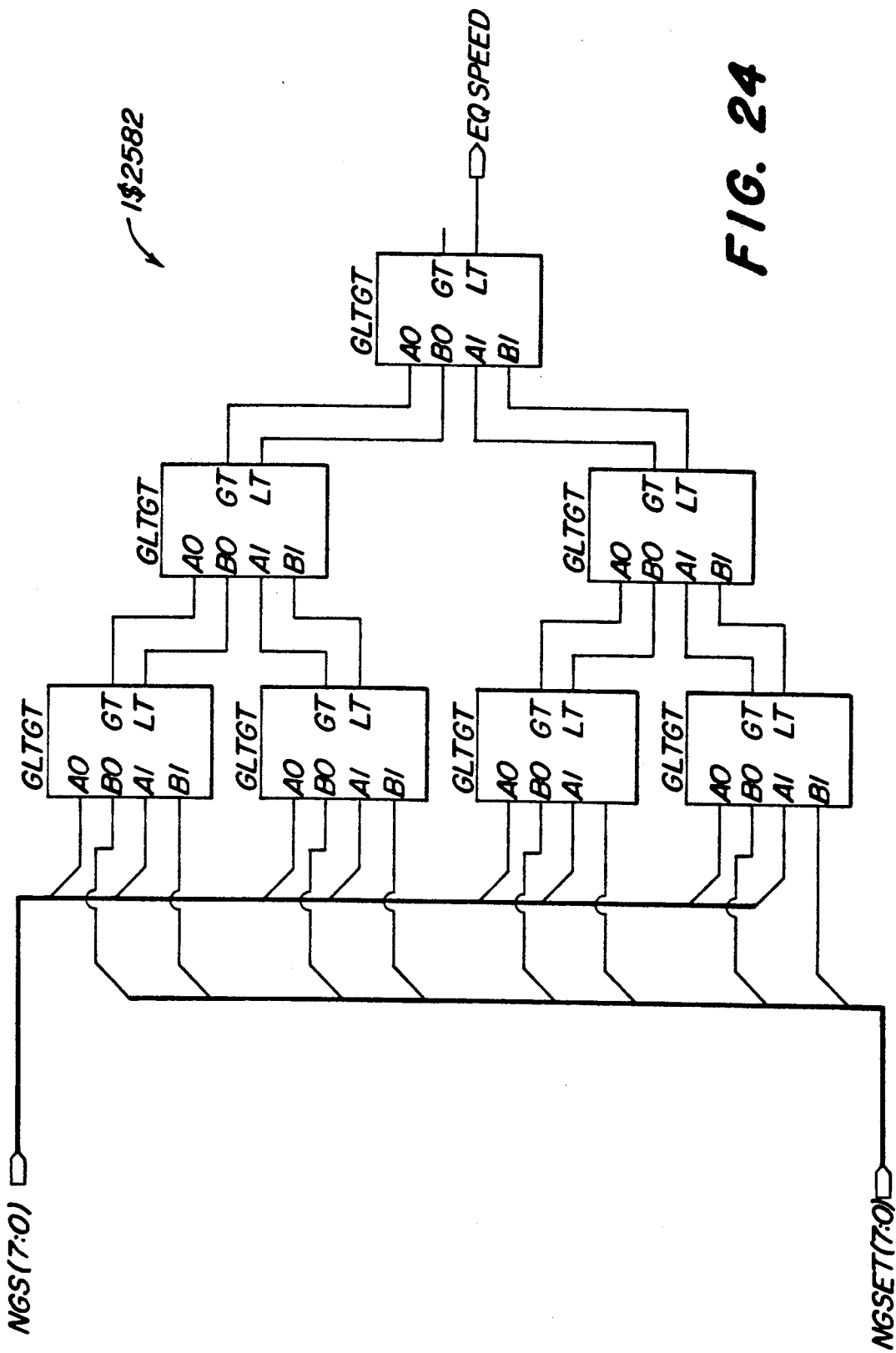
FIG. 24 is a detailed schematic diagram illustrating the Programmable Gate Array design of the NGspeedcomp circuit (element IS2582) of FIGS. 9e and 9p.

15. NG SpeedComp (FIG. 24).

The speed setpoint comparator circuit compares the NG Speed value (NGS(7:0)) with the latched speed setpoint (NGSet(7:0)). Once these two values are equal, the NG SpeedComp circuit signals the Speedramp circuit to stop ramping up.

Figure 10:
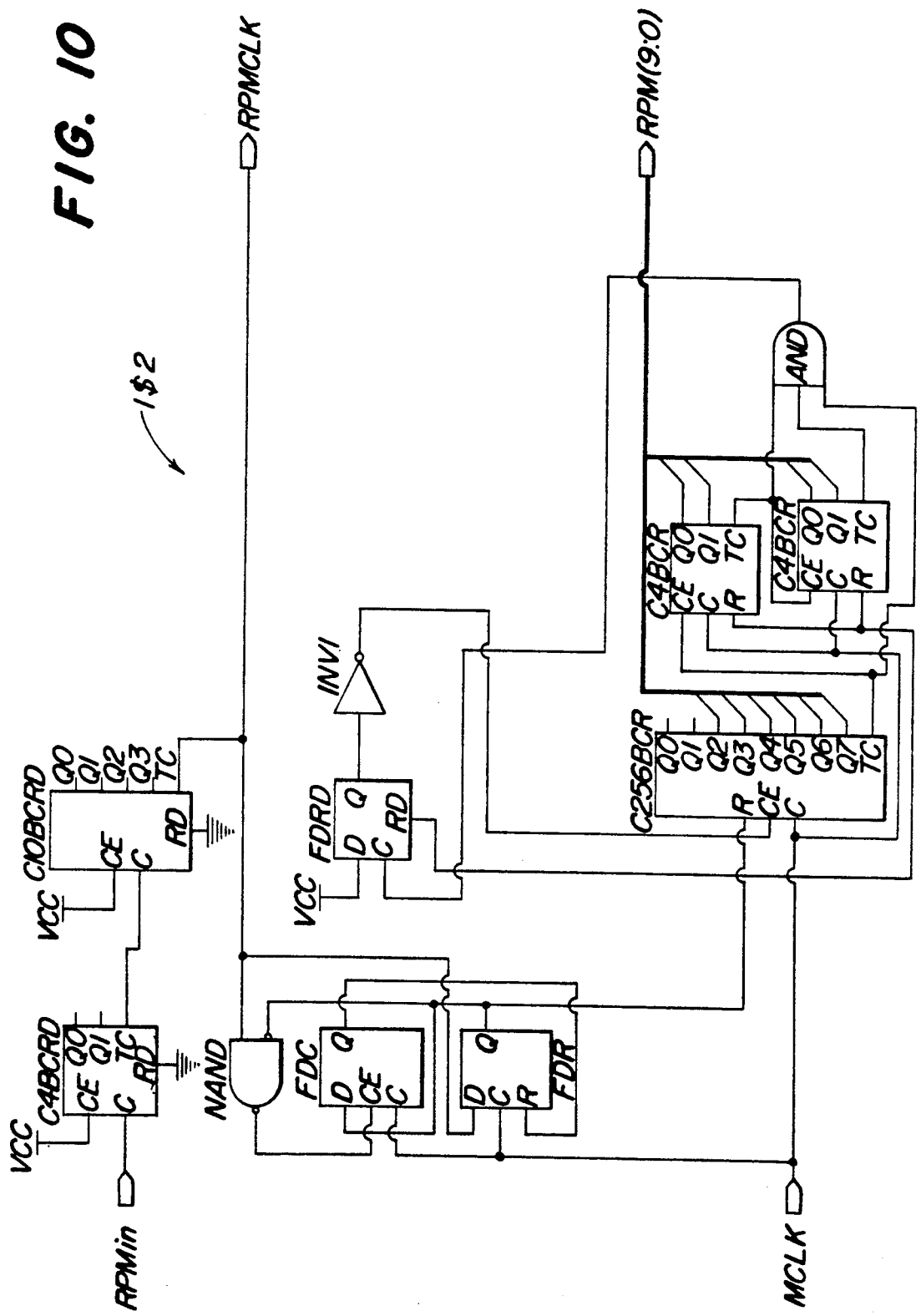
FIG. 10 is a detailed schematic diagram illustrating the Programmable Gate Array design of the RPM calculation circuitry (element I$2) of FIG. 9e.

Referring now to FIG. 10, this schematic diagram represents the RPM calculation circuitry of the link controller 40 (element (IS2) of FIG. 9). The input (RPMin) from the ECU 34 auxiliary speed sensor is a 0–5 VDC TTL signal (10 pulses per engine revolution) and the output is a 10-bit RPM value (RPM(9:0)), used to address Lookup tables on the link controller 40 PCB. This circuit counts the time required for 40 RPM input pulses and uses this value to address the Lookup tables.

A 2-bit counter (C4BCRD) and a decade counter (C10BCRD) counts 40 RPM pulses and sets the decade counter output TC=1. This transition latches the RPM count (RPMCLK) from the 12-bit binary counter (C256BCR and C4BCR). The decade counter resets itself (TC=0) and it counts to 40 again.

The 12-bit binary counter is free-running at the MCLK frequency (12.8 kHz). The decade counter output TC controls latching the RPM value and resetting the counter 1 clock cycle later. This is accomplished by the two D FlipFlops (FDC and FDR) and the 2-input NAND gate. When TC goes high, it is latched by FDR. This resets the 12-bit counter. On the next clock cycle this high value is latched by FDC, which resets FDR and re-enables the 12-bit counter.

The TC outputs of C256BCR and C4BCR are "ANDed" together and clock the D FlipFlop FDRD. This provides counter overflow inhibit to prevent the counter from resetting itself. This might otherwise occur at low RPM (<700 RPM).

Referring now to FIG. 11, this schematic diagram represents the fuel select circuit portion (element (IS3) of FIG. 9) of the link controller 40. The fuel select circuit controls the operating state of the dual fuel engine, and directs switchovers between diesel fuel and dual fuel operating modes using two control lines Fuel1 and Fuel2. Fuel1 represents the fuel choice (diesel fuel or dual fuel) of the user and the link controller 40. The link controller 40 can override the user's choice in the event of a fault as detected by the diagnostic circuit (FIG. 13). This is accomplished by the DualFuelOK input, which is latched by the fuel select circuit (D FlipFlop FD).

Fuel2 represents the current operating mode of the engine, so that when Fuel2 is not equal to Fuel1 the system initiates a switchover as follows:

| Fuel1 | Fuel2 | Operating Mode |
| --- | --- | --- |
| 0 | 0 | diesel mode (power-up condition) |
| 1 | 0 | switchover to dual fuel |
| 1 | 1 | dual fuel mode |
| 0 | 1 | switchover to diesel |

If the user selects dual fuel, a Set/Reset FlipFlop (FRS) is set=1. If the user selects diesel, the Set/Reset FlipFlop is reset=0. The user and system choices are ANDed and latched by a D FlipFlop (FD), which stores the Fuel1 value.

The Fuel2 value is latched by a Set/Reset FlipFlop (FRS). It is set=1 by the link controller 40 at the termination of a switchover to dual fuel and reset=0 following a return to diesel fuel operation. These functions coincide directly with selecting the reduced ECU 34 torque curve (Set Fuel2) and throttle equal to user set value (EQThrot=0, Reset Fuel2).

If the user selects diesel during a switchover to dual fuel (Fuel1=1, Fuel2=0), both Fuel1 and Fuel2 are reset to 0 and the THRLoad output is set=1 which signals the Rampset circuit (IS7) to latch the user set % Throttle value (MTHR(7:0)).

The Torque select and NG Solenoid enable values are stored in D FlipFlop (FD). At powerup, both values are reset. The Torque value is set=1 at the end of the switchover sequence when the EQPilot input makes a high-to-low transition. It is reset=0 at the start of a switchover to diesel when EQPilot makes a low-to-high transition. The Solenoid value is set=1 at the start of a switchover to dual fuel (when Fuel1 is set=1) and reset=0 at the start of a switchover to diesel (when Fuel1 is Reset=0).

The DFSelect output line indicates the users choice of operating mode (1= Dual Fuel, 0= Diesel Fuel). This output is used only by the LampDriver -circuit (FIG. 17) which flashes the dual fuel lamp 58 if dual fuel operation has been selected by the user, but is not allowed by the link controller 40 due a detected fault (such as low NG pressure).

Referring now to FIG. 12, this schematic diagram represents the ECU torque select circuit portion (element (IS2282) of FIG. 9) of the link controller 40. The torque select circuit monitors the Torque output from the fuel select circuit (FIG. 11) and the THR40 and THR80 outputs of the Thrload circuit (FIG. 15) and controls the state of the ECU 34 torque select FETs (Q1, Q5 in FIG. 6). This circuit selects normal rated torque curve for diesel fuel operation and either normal diesel pilot (<80% load) or boost diesel pilot (>80% load) for dual fuel operation.

In connection with this torque curve selection function, it was determined that a particular throttle setting will correspond to a particular level of load on the engine. This is because the throttle setting relates directly to the amount of fuel flowing to the engine, and the amount of fuel determines how much load the engine can sustain at a particular speed. Also, the Throtset circuit (FIG. 18) generates a MTHR value which represents a user selected throttle setting, and this MTHR value is provided as an input to the Thrload circuit (FIG. 15) which compares this throttle setting value to a pair of threshold values. Thus, the Throtset circuit (FIG. 18), the Thrload circuit (FIG. 15) and the Torque circuit (FIG. 12) cooperate together, and essentially operate to select the torque curve as a function of engine load (as represented by the MTHR signal). More particularly, during dual fuel operation, either torque curve A or C is selected (viewing FIG. 25), depending upon the relationship of engine load to the threshold values.

Referring now to FIG. 13, this schematic diagram represents the Diagnostic Circuit (element IS4 of FIG. 9) of the link controller 40. The diagnostic circuit monitors the status of sensors for engine speed, engine load, intake air temperature and NG pressure and determines if conditions are OK for dual fuel operation. The result is communicated via a single output control line DualFuelOK.

If the intake air temperature is greater than 53 ° C. (IntakeAir=1 or NG pressure is less than 13 psi (LowNG=1), then DualFuelOK=0, otherwise DualFuelOK is determined by engine speed, engine load and the mode of operation.

In diesel operation (Fuel1=0, Fuel2=0), the link controller 40 monitors if engine speed is less than 1400 RPM (S1400=1) or if engine load is less than 40% (THR40=1), while S1200 and NGV30 are disabled. If S1400=1 OR THR40=1 then Dual FuelOK=0.

In dual fuel operation (Fuel1=1, Fuel2=1), the link controller 40 monitors if engine speed is less than 1200 RPM (S1200=1) or if engine load is less than 30% (NGV30=1), while S1400 and THR40 are disabled. If S1200=1 OR NGV30=1 then Dual FuelOK=0.

All Diagnostic faults are disabled during switchovers, since changes in throttle and NG Valve Position must occur and must not be interpreted as a fault. Also, the Diagnostic circuit implements a 1.25 second time delay filter in detecting any changes in the fault status of the dual fuel engine. The XOR gate close to the DualFuelOK output detects the change in the fault status which enables the counter (C8BCRD) to count for 1.25 seconds. If the change in fault status still exists, it is latched by the Flip Flop (FDC) to the DualFuelOK output.

The NG Valve Position fault (NGV30) or speed fault (S1200) which can occur during dual fuel operation are interpreted as critical faults. Therefore, if this fault occurs while operating on dual fuel, the link controller 40 will force a return to diesel and not allow the system to return to dual fuel. A 0.75 second time delay filter, similar to the one described above, is also implemented for monitoring NG Valve Position and speed during dual fuel operation.

Referring now to FIG. 14, this schematic diagram represents Speed Comparison Circuit (element IS8 of FIG. 9) of the link controller 40. The speed comparator circuit compares the engine speed with two internally set speed settings to determine if it is less than these two values.

Engine RPM is calculated by the RPM circuit (FIG. 10) which addresses the two link controller 40 Lookup tables. The NG % Speed setpoint Lookup table (U4 of FIG. 6) provides a linear RPM output with approximately 5 RPM resolution.

The 8-bit speed setpoint (NG(7:0)) is used by this circuit to monitor engine speed and the speedgrab circuit (FIG. 22) to provide a speed setpoint to the governor 36.

The speed comparator circuit uses a greater than/less than (GLTGT) comparator tree to monitor the engine RPM. The output of the speedcomp circuit is used by the diagnostic circuit (FIG. 13).

Referring now to FIG. 15, this schematic diagram represents the Load Comparison Circuit (element IS2281 of FIG. 9) of the link controller 40. The load comparison circuit monitors the diesel % Throttle setting for comparison with two internally set values representing 40% and 80% engine load. The outputs provide an indication of how heavily the engine is loaded.

The load comparison circuit uses a greater than/less than comparator tree (GLTGT) to monitor the two conditions.

Referring now to FIG. 16, this schematic diagram represents the Speed Change Detect Circuit (element IS1301 of FIG. 9) of the link controller 40. The speed change circuit detects when the operator has selected an increase or decrease in engine speed. If the engine is operating in diesel fuel mode, the speed adjustment occurs instantaneously. If the engine is operating in dual fuel mode, the speed change circuit flags the diagnostic circuit (FIG. 13) to return to diesel operation, where the speed adjustment is made. Once any speed adjustments are complete, the circuit will allow the link controller to return to dual fuel operation automatically (unless diesel operation was manually selected, or conditions at the new speed are not suitable for dual fuel operation as determined by the diagnostic circuit (FIG. 13)).

In dual fuel mode (Fuel1=1, Fuel2=1) there is no delay in returning to diesel when a speed adjustment is made. Once the speed adjustment is complete there is a 2.5 second delay before returning to dual fuel. The 2.5 second time delay filter is implemented with a 2-bit binary counter (C4BCRD) and provides a window of time for minor speed adjustments in diesel mode. The speed change circuit is disabled during changeovers via the 2-input XNOR gate (XNOR2) fed by Fuel1 and Fuel2.

Referring now to FIG. 17, this schematic diagram represents the Lamp Driver Circuit (element I$5 of FIG. 9) of the link controller 40. The lamp driver circuit controls the state of the diesel indicator lamp 56 and the dual fuel indicator lamp 58.

At power-up a 2-bit binary counter (C4BCRD) counts up from 0 to 3 at a rate of 0.78 Hz. While it counts, the D FlipFlop at its output (FDC) is reset and forces the two indicator lamps ON. Once the counter reaches 3 (in 5 sec.), its terminal count line (TC) goes high enabling the D FlipFlop to be Set=1, which removes the forced ON condition for the two lamps and disables the 2-bit counter.

Once the forced ON condition is removed after power-up, the lamps are controlled by three inputs from the fuel select circuit (FIG. 11). The lamps are forced ON by the Fuel2 input, and toggled or turned OFF via the two T Flipflops with Reset (FTORD). A summary of input/output is shown below (1=ON, T=toggle, 0=OFF):

| Fuel1 | Fuel2 | DFSelect | DLamp | DFLamp | Mode |
|---|---|---|---|---|---|
| 0 | 0 | 0 | 1 | 0 | diesel |
| 0 | 0 | 1 | 1 | T | select dual fuel |
| 1 | 0 | 1 | 0 | 1 | switch to dual fuel |
| 1 | 1 | 1 | 0 | 1 | dual fuel |
| 1 | 1 | 0 | T | 1 | select diesel |
| 0 | 1 | 0 | 1 | 0 | switch to diesel |
| 0 | 1 | 1 | 1 | T | force to diesel |

Figure 18:
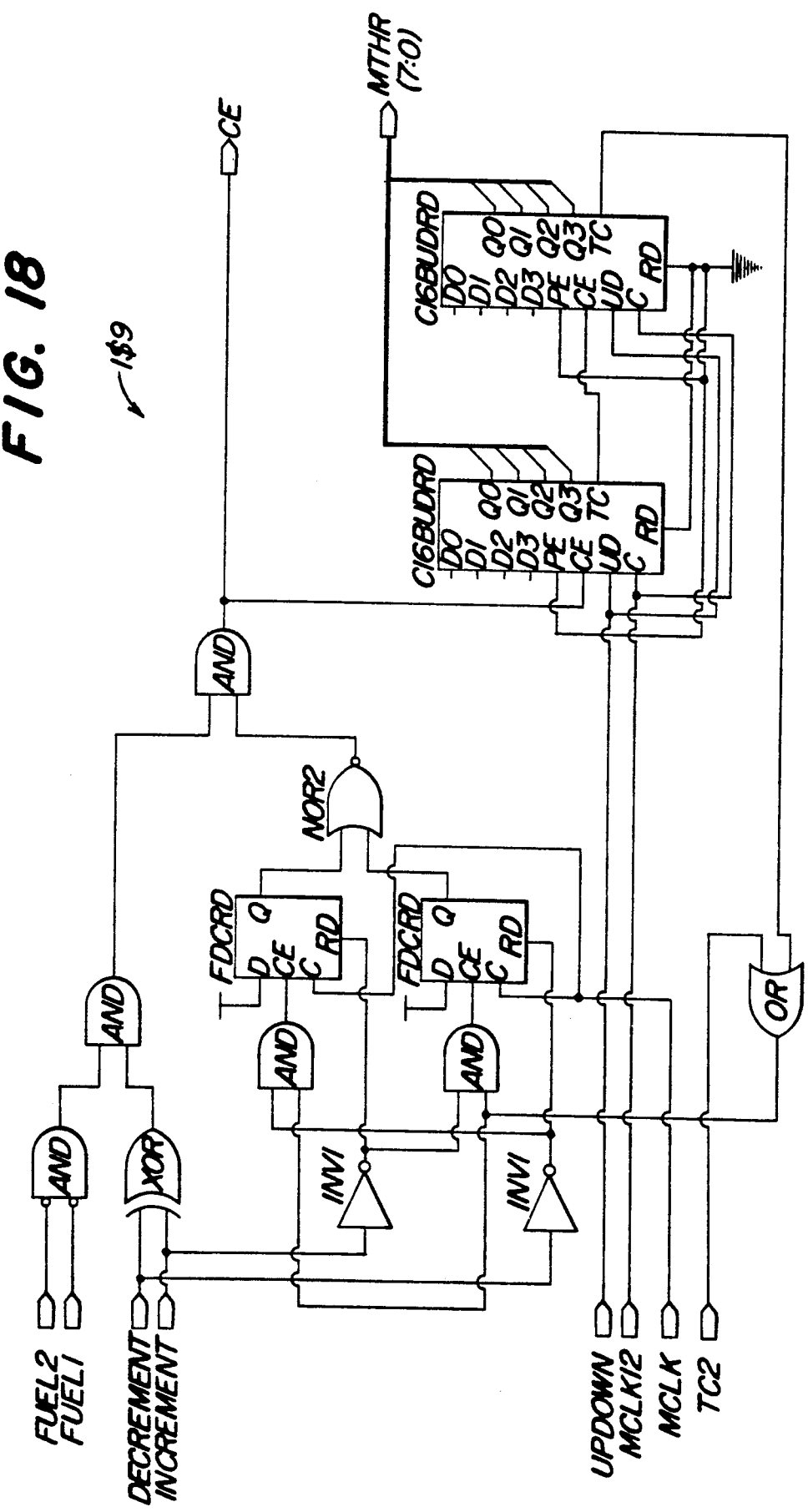
FIG. 18 is a detailed schematic diagram illustrating the Programmable Gate Array design of the throttle setpoint circuit (element IS9) of FIGS. 9c and 9j.
Figure 19:
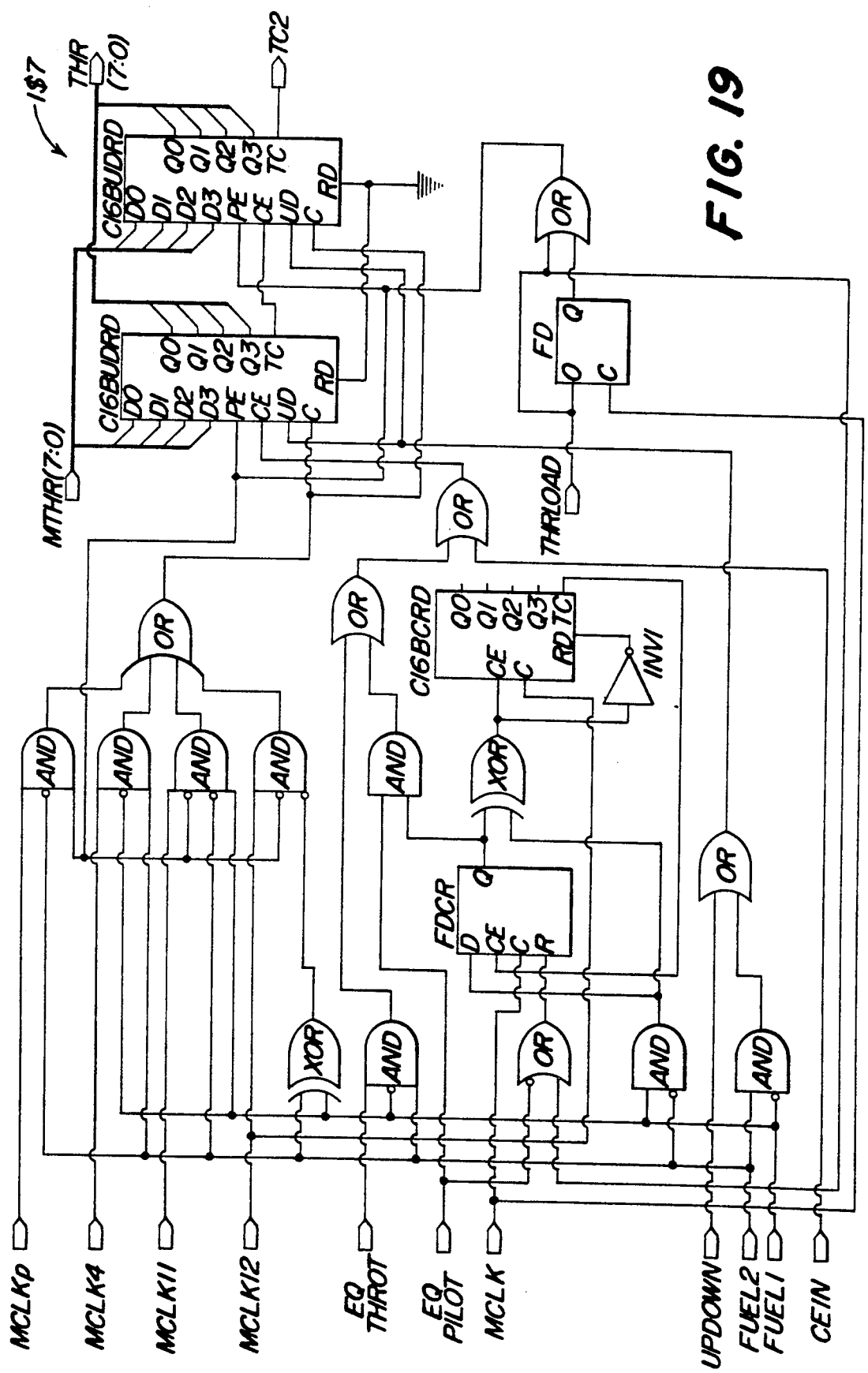
FIG. 19 is a detailed schematic diagram illustrating the Programmable Gate Array design of the throttle ramp control circuit (element IS7) of FIGS. 9e and 9m.

Referring now to FIG. 18, this schematic diagram represents the throttle control, or "throtset" circuit (element I$9 of FIG. 9) of the link controller 40. The throtset circuit works in conjunction with the rampset circuit (FIG. 19) to control the throttle signal to the diesel ECU 34. The link controller 40 allows the user to set the engine speed only in diesel operation. When the system switches over to dual fuel, the throttle voltage is ramped down to a predetermined pilot value and the governor 36 adds NG to keep the engine at the desired speed. When the system returns to diesel operation, the link controller 40 must ramp the throttle voltage to the user-set value before switchover to dual fuel occurred. The purpose of the throtset circuit is to store the throttle voltage set by the user.

User speed adjustments (Increment and Decrement) are enabled only in diesel mode (Fuel1=0, Fuel2=0) via the clock enable (CE) line on the 8-bit counter (2-C16BUDRD). This clock enable signal is also used by the rampset circuit. The throttle output is the 8-bit value MTHR(7:0). At power-up the counter is reset to 00, which corresponds to diesel throttle voltage at idle. External to throtset, the Increment and Decrement inputs pass through a logic AND gate to determine the value on the UpDown input.

The throtset circuit also contains logic to prevent the user from overflowing or underflowing the 8-bit counter. It is imperative that the % Throttle signal for the engine NOT go from 0% to 100% instantaneously or from 100% to 0%. If the counter counts up to FF or down to 00, its terminal count TC) signal will go high. This will inhibit the count enable and force the throttle value to remain at the maximum or minimum value by setting one of the two D Flipflops (FDCRD). Only one D FlipFlop is enabled at a time, depending on whether the user counts up to maximum or down to minimum throttle.

The throtset circuit is clocked by MCLK12, which allows the user to change % Throttle from 0% to 100% in 80 seconds (MCLK12 is currently a 3.125 Hz clock).

Referring now to FIG. 19, this schematic diagram represents the throttle ramping or "rampset" circuit (element I$7 of FIG. 9) of the link controller 40. The rampset circuit works in conjunction with the throtset circuit (FIG. 18) to control the throttle signal to the ECU 34. The throttle voltage sent to the ECU 34 is the output of the rampset circuit (THR(7:0)), and so this value can be set by the user and ramped up and down during fuel switchovers.

User speed adjustments (Increment and Decrement) are enabled only in diesel fuel mode (Fuel1=0-,Fuel2=0) via the clock enable output (CEin) of the throtset circuit to the clock enable line of the 8-bit counter (2 C16BUDRD). At power-up, the counter is reset to 00, which corresponds to the diesel throttle voltage at idle. External to rampset, the Increment and Decrement inputs pass through a logic AND gate to determine the value on the UpDown input.

The logic to prevent the counter from overflowing and underflowing is contained in the throtset circuit and is similar to the corresponding logic described hereinbefore in connection with the throtset circuit. When operating in diesel mode the throttle values MTHR(7:0) in throtset and THR(7:0) in rampset are equal and are simultaneously adjusted by the user.

At the start of switchover to dual fuel (Fuel1=1, Fuel2=0) the rampset circuit counts a 5 second delay before ramping down the diesel throttle (THR (7:0)). The start of switchover is determined by lower XOR2 gate in the schematic, which enables the 4-bit counter (C16BCRD) to count for 5 seconds. Following the delay, the signal to enable the throttle counter to count down is latched by the Flip Flop FDCR. The 8-bit counter counts down (with EQPilot=1, UpDown=0) until EQPilot is Reset=0 by the Pilotcomp circuit I$6). EQPilot is Reset=0 when the throttle voltage THR(7:0) equals the internally set diesel pilot voltage. User adjustments and EQThrot are disabled during the switchover to dual fuel.

However, if the user selects diesel during a switchover to dual fuel, the THRLoad input from the Fuel Select circuit (I$3) enables Rampset to load the user set % Throttle value (MTHR(7:0)).

During dual fuel operation (Fuel1=1, Fuel2=1) the throttle voltage is held constant at the diesel pilot voltage. User adjustments, EQThrot and EQPilot are disabled, but any user adjustments detected by the speed-change circuits (I$1381) would force a return to diesel operation.

During switchover to diesel fuel operation (Fuel1=0, Fuel2=1) the 8-bit counter is enabled to count up (via EQThrot=1, UpDown=1) until EQThrot is Reset=1 by the ThrotComp circuit (FIG. 21). EQThrot is Reset=0 when the throttle voltage THR(7:0) equals the user-set throttle voltage for diesel-only operation MTHR(7:0). User speed adjustments and EQPilot are disabled.

The MCLKp 12.8 kHz clock frequency is used to load MTHR(7:0) if the operator aborts dual fuel changeover. The MCLK4 800 Hz clock frequency is used to ramp up diesel throttle on switchover from dual fuel to diesel fuel. The MCLK11 6.25 Hz clock frequency is used to ramp down diesel throttle on switchover to dual fuel. The MCLK12 3.125 Hz clock frequency is used to allow user to adjust throttle from to 100% in 80 seconds.

Referring now to FIG. 20, this schematic diagram represents the pilot comparison "pilotcomp" circuit (element I$6 of FIG. 9) of the link controller 40. The pilotcomp circuit compares the diesel throttle voltage to a preprogrammed programmed diesel pilot voltage during switchover to dual fuel and outputs EQPilot=1 when throttle is not equal to pilot, and EQPilot=0 when throttle is equal to pilot. The pilotcomp circuit has diesel pilot values programmed for normal (<80% load) and boost (>80% load) pilot conditions, with the appropriate value selected by the THR80 input from the THRLoad circuit (I$2281).

Referring now to FIG. 21, this schematic diagram represents the diesel throttle comparison "throtcomp" circuit element I$11 of FIG. 9) of the link controller 40. The throtcomp circuit compares the diesel throttle voltage (THR(7:0)) to the user-set throttle voltage (MTHR(7:0)) during not equal to MTHR(7:0), and EQThrot=0 when THR(7:0) equal to MTHR(7:0). The throtcomp circuit uses greater than/less than comparator tree (GTLT) to compare each bit of the 8-bit values to give EQThrot.

Referring now to FIG. 22, this schematic diagram represents the speedgrab circuit (element I$10 of FIG. 9) of the link controller 40. The speedgrab circuit provides the speed setpoint voltage to the governor 36. There is no user speed adjustment allowed while operating on dual fuel; the speedgrab circuit simply latches an 8-bit speed setpoint value (NG(7:0)) from the link controller 40 % Speed setpoint lookup table (U4 of FIG. 6) and outputs this (NGSet(7:0)) for comparison with the NG SPeed setpoint output (NGS(7:0)) from the Speedramp circuit (I$2581). If a user speed adjustment is detected by the speed change circuit (I$1381), the link controller 40 forces a return to diesel operations where the speed change is made. On returning to dual fuel operation the speedgrab circuit would latch the new speed setpoint value.

The speedgrab circuit consists of an 8-bit loadable register (RD8CR) which latches the NGSpeed setpoint value at the start of a switchover to dual fuel (Fuel1=1, Fuel2=0). The two D Flipflops (FDR and FDC) and 2-input NAND gate are used to generate a 2-clock cycle load enable signal, which ensures that only one speed setpoint value is latched at the start of switchover to dual fuel. The speed setpoint is reset during diesel fuel operation by the 2-input AND gate (AND2B).

Referring now to FIG. 23, this schematic diagram represents the NG Speedramp circuit (element I$2581 of FIG. 9) of the link controller 40. NG Speedramp circuit ramps up the NG % Speed setpoint from 00 (Hex) to the speed setpoint value latched from the NGSpeed lookup table (U4) on the Link Controller circuit board. Ramping up the % Speed setpoint prevents the NG governor 36 from "kicking" the rotary actuator 38 to wide open throttle at the start of a changeover to dual fuel.

The speedramp circuit consists of an 8-bit binary up-down counter (2-C16BUDRD) with an asynchronous reset. At the start of a switchover to dual fuel (Fuel1=1, Fuel2=0, EQSpeed=1) the counter is enabled to count up at a rate of 50 Hz. This means that the circuit will count from 00 (Hex) to FF (Hex) in 5 seconds, before the diesel % Throttle begins ramping down. Once the % Speed value (NGS(7:0) equals the % Speed setpoint, the NGSpeedcomp circuit (I$2582) forces EQSpeed=0 which disables the updown counter and causes it to hold its present value. On returning to diesel operation (Fuel1=0, Fuel2=0) the speedramp circuit is reset.

Referring now to FIG. 24, this schematic diagram represents the NG Speedcomp circuit (element I$2582 of FIG. 9) of the link controller 40. The NGSpeedcomp circuit compares the NG % Speed value (NGS(7:0)) with the desired NG % Speed setpoint (NGSet(7:0)) during a switchover to dual fuel operation and outputs EQSpeed=1 when NGS(7:0) is not equal to NGSet(7:0) and outputs EQSpeed=0 when NGS(7:0) is equal to NGSet(7:0).

The NGSpeedcomp circuit uses a greater than/less than comparator tree (GLTGT) to compare each bit of the 8-bit values to give EQSpeed.

Mode of Operation

At power up, the ECU 34 momentarily illuminates the amber Fault lamp 54 on the operator's panel, as a test feature. Upon start-up, the link controller 40 defaults to diesel operation and the ECU 34 manages the engine starting procedure as for a normal diesel engine. The link controller 40 selects the normal torque curve and generates a 0 % Throttle signal to idle the engine.

At power-up, the link controller 40 illuminates the diesel lamp 56 and the dual fuel lamp 58 for 5 seconds as a test feature, after which only the diesel lamp 56 remains on. The solenoid of the NG shut-off valve remains off and the link controller 40 provides a 0 % Speed setpoint and 100 % Limit to the governor 36 to ensure that the rotary actuator 38 closes the metering valve 30.

After starting, the operator may change the engine speed via the speed control switch 52 on the operator's panel 42. The fuel pump 14 must be operating when adjusting the engine speed because the throttle signal is a fuel set point for the ECU 34. The engine must be connected to the load and operating under normal load conditions for proper adjustment of speed when operating on diesel. This is because the % Throttle signal is a fuel setpoint for the ECU 34. The link controller 40 will ramp the throttle signal sent to the ECU 34, at a fixed rate in response to the + speed and − speed inputs from switch 52, accelerating and decelerating the engine 12. Operator speed adjustments are possible only in diesel operation, and not during fuel switchovers or dual fuel operation. If the system is running on dual fuel, the link controller 40 will automatically force a return to diesel operation in order to adjust the engine speed. When any speed adjustments are complete, the engine will be returned to dual fuel operation automatically unless otherwise selected. With the ECU 34 governing as a fuel controller and the governor 36 governing as a speed controller, this restriction ensures that for any system initiated switchovers in the absence of an operator, the engine will continue to run at the same speed in both diesel and dual fuel modes.

The operator selects dual fuel operation via the fuel select switch 50 on the operator's panel. If the present operating conditions are suitable for dual fuel operation, the link controller 40 will initiate a switchover. If the operating conditions are not suitable for dual fuel operation, the link controller 40 will continue to operate the engine on diesel. The dual fuel indicator lamp 58 will flash on and off to indicate that the operator has selected dual fuel operation. When conditions are suitable for dual fuel operation the link controller 40 will automatically switch to dual fuel, enabling the NG system and extinguishing the diesel lamp 56. The operator can also abort a switchover to dual fuel operation by selecting diesel operation via the fuel select switch 50 on the operator's panel 42.

If, during dual fuel operation, engine speed changes are made via the speed select switch 52, the system responds by automatically returning to pure diesel fuel operation. Once the engine speed has been adjusted, the system automatically returns to dual fuel operation at the new speed.

As part of the dual fuel engine diagnostics, the link controller 40 monitors the intake air temperature sensor 20, the low NG pressure sensor and calculates engine RPM and engine load to determine if conditions permit the engine 12 to be operated on dual fuel.

With the engine 12 running on pure diesel fuel, the following conditions must exist for the link controller 40 to allow dual fuel operation: dual fuel operation must be selected via fuel select switch 50, the NG supply pressure must be greater than 18 psi (sensor switch 46 open), the engine speed must be greater than 1400 RPM, the engine load must be greater than 40% as determined by the % Throttle signal required by the ECU, and the intake air temperature must be less than 53° C. (sensor switch 20 open).

During dual fuel operation of the engine 12 the governor 36 governs to a speed setpoint voltage provided by the link controller 40. This signal corresponds to the RPM at which the engine is running just prior to the start of the changeover sequence. The speed values are generated by a look-up table in the link controller 40 which contains speed setpoint versus RPM information. The governor 36 preferably has a % Speed setpoint versus RPM characteristic within the limits shown in FIG. 26.

Figure 27:
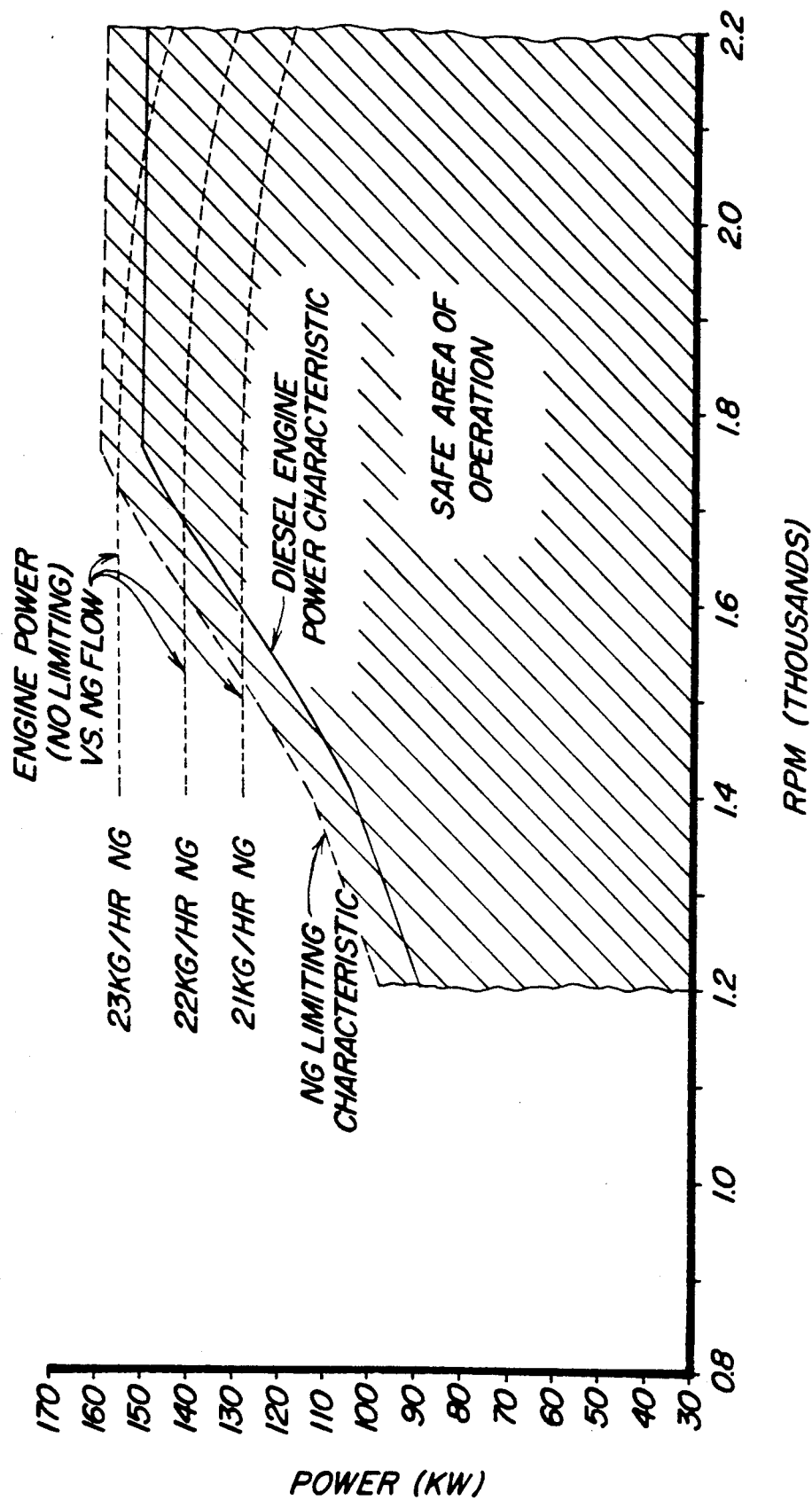
FIG. 27 is a graphical illustration of the NG fuel limiting curves for the dual fuel engine of the present invention.

The link controller 40 also provides a % Limit signal to the governor 36 to prevent over-fueling of the dual fuel engine at lower RPM. This allows the link controller 40 to approximate the torque curve of the diesel engine 12. The limit signal is also generated by a limit versus RPM look-up table in the link controller 40. FIG. 27 shows the NG fuel limiting requirement for safe engine operation and the limit versus RPM relationship programmed into the link controller 40. Without this limiting feature, the engine power at lower speeds would exceed the safe area of operation (shown shaded in FIG. 27). If NG flow were reduced by reducing maximum supply pressure for instance, the engine might operate within the safe area at low speeds, but at higher speeds the engine would not produce adequate power. By limiting the maximum position of the NG valve at various speeds, dual fuel power can be limited to a value of approximately 5% greater than on diesel fuel. This achieves safe dual fuel operation over a wide range of speeds and full power operation is maintained.

Figure 28:
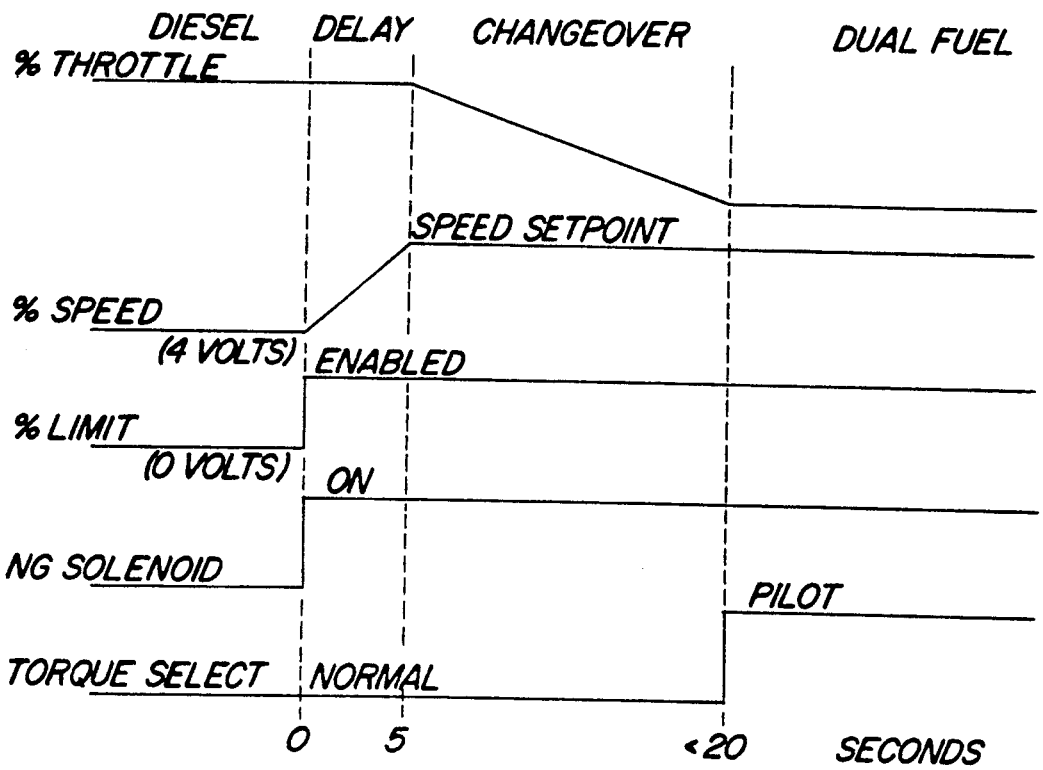
FIG. 28 illustrates the changeover sequence from diesel fuel to dual fuel operation.

The changeover sequence from diesel to dual fuel is illustrated by FIG. 28. The diesel lamp 56 is turned OFF while the dual fuel lamp 58 is turned ON. The link controller 40 monitors the engine speed and captures a speed setpoint voltage for the governor 36 representing the same speed. At the same time, the link controller 40 opens the NG supply solenoid valve 26 and enables the limit voltage to the governor 36. The link controller 40 implements a 5 second delay before ramping down the % Throttle signal to the ECU 34. During this time, the % Speed setpoint is ramped up from 0 to the captured value. This is to allow the governor 36 internal dynamics time to adjust to the release of the % limit voltage, and permits the NG regulator 28 to stabilize the NG supply pressure to the metering valve 30.

The % Throttle signal to the ECU 34 is ramped down from the user-selected value to a programmed diesel pilot value. The % Throttle signal is ramped down at a clock frequency of 6.25 Hz, which corresponds to a time of 30 seconds to ramp % Throttle from 100% to 25%. This slow ramping speed is required in order to avoid a large speed drop during switchover. At this point, the governor 36 assumes control of the engine speed.

The link controller 40 selects the de-rated torque curve programmed into the ECU 34 representing the required diesel pilot quantity for dual fuel operation under the given load conditions. This occurs when the link controller 40 detects that the % Throttle signal has reached the programmed pilot value.

Once the engine is operating on dual fuel, the operator can adjust the engine speed. The link controller 40 detects a speed change and forces a return to pure diesel fuel operation where the speed adjustment is made. Once any speed adjustments are complete, the link controller 40 automatically returns to dual fuel mode, unless diesel was manually selected.

As part of the dual fuel diagnostics the link controller 40 will force a return to diesel if any one of the following conditions occur:

NG supply pressure<13 psi (sensor switch 46 closed),
OR engine speed<1200 RPM,
OR engine load<30%,
OR Intake Air Temperature>53° C. (switch sensor 20 closed).

The operator can also force a return to diesel fuel operation by selecting diesel operation using the fuel select switch 50 on the operator's panel 24.

Figure 29:
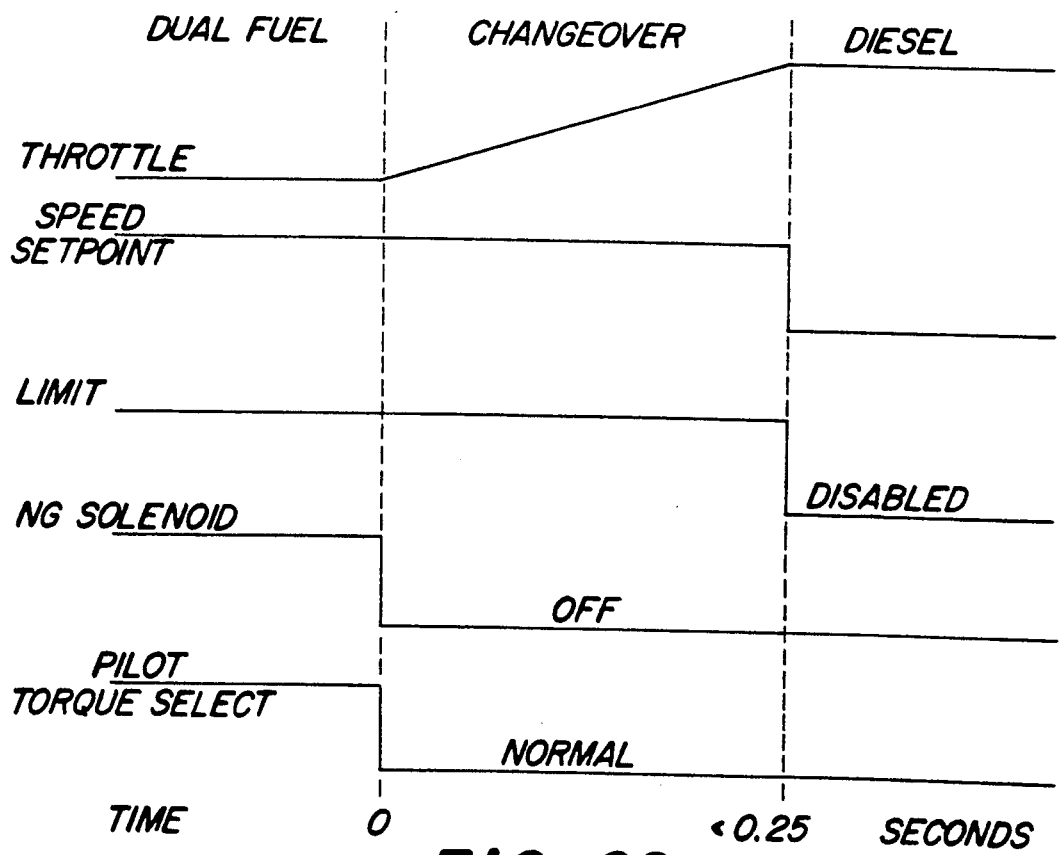
FIG. 29 illustrates the changeover sequence from dual fuel to diesel fuel operation.

The changeover sequence from dual fuel to diesel fuel operation is illustrated by FIG. 29. The dual fuel lamp 58 is turned OFF while the diesel lamp 56 is turned ON. The link controller 40 selects the normal torque curve in the ECU 34 and closes the NG supply solenoid valve 26. The % Throttle signal to the ECU 34 is ramped up from the programmed diesel pilot quantity to the value last set by the operator in diesel fuel mode. The % Throttle is ramped up at a clock frequency of 800 Hz, which corresponds to a time of 255 milliseconds to ramp from 25% to 100%. This fast ramping speed is required to avoid a large speed drop during switchover, as the NG supply is shut off. At this point, the ECU 34 re-assumes control of the engine 12.

The % Speed setpoint to the governor 36 is reset to 4 V and the % Limit signal is set to 100%. This ensures that the metering valve 30 is closed during diesel fuel operation.

If a diagnostic fault (eg. high intake air temperature or low NG pressure) forces a return to pure diesel fuel operation, the dual fuel lamp 58 will flash on and off and the diesel lamp 56 is turned on. If the detected fault later disappears, the link controller 40 will return the engine 12 to dual fuel operation. The lamps would then indicate dual fuel operation.

If the user selected a return to diesel, the dual fuel lamp 58 is extinguished and the diesel lamp 56 is turned on.

It should be mentioned that the link controller 40 diagnostic circuitry implements a 1.25 second time delay filter for detecting any changes in the fault status of the dual fuel engine. This means that any fault must be absent or present for at least 1.25 seconds for it to be detected by the link controller 40. Also, the speed and load faults during dual fuel operation are latched as critical faults. Therefore, the occurrence of one of these faults would disallow any return to dual fuel operation without a power-down or system reset. A 0.75 second time delay filter is implemented in the detection of these faults.

The link controller 40 software controls the selection of the appropriate one of the ECU 34 torque curves shown in FIG. 25. The boost pilot curve A is selected if the engine 12 is operating over 80% load. Under heavy load conditions, the additional diesel fuel in the dual fuel mixture helps to cool the diesel injectors and prevent nozzle sooting. Under 80% load the minimum de-rated pilot curve C is used to minimize fuel operating costs.

While the invention has been described in conjunction with a specific embodiment, it is to be understood that many alternatives, modifications, and variations will be apparent to those skilled in the art in light of the foregoing description. For example, a microprocessor could replace the PGA and its serial PROM, the EPROMs and the oscillator circuitry. Alternatively, although such an alternate design would require a much larger circuit board and would lack the flexibility of a programmable device, the link controller could be built with discrete IC components since the PGA integrates a large number of discrete functions into a single custom IC. Accordingly, this invention is intended to embrace all such alternatives, modifications, and variations which fall within the spirit and scope of the claims which are appended hereto following the part list.

The following is a parts list of the components included in the circuits of FIGS. 5, 6, and 7, it being understood that the particular parts may be varied without departing from the scope of this invention.

| Reference | Description | Temp. | Tolerance |
|---|---|---|---|
| C1,C2,C5,C6, C7,C8,C10, C11,C13,C14, C15,C16,C17, C18,C28,C29, C30 | 0.1 μF Capacitor | −55° C./+100° C. | ±20% |
| C3,C4,C9, C36,C37,C38 | .01 μF Capacitor | −550° C./+100° C. | ±20% |

| Reference | Description | Temp. | Tolerance |
|---|---|---|---|
| C39,C40 C12,C19,C21, C22,C23,C24, C33,C34,C35 | 1 μF Capacitor | −40° C./+100° C. | |
| C25,C26,C27 | 110 μF Capacitor | −55° C./+105° C. | −10% + 50% |
| D1,D2,D3, D4,D5,D6, D7,D8 | Signal Diode | −40° C./+85° C. | ±5% |
| D9,D10,D11, D12,D13, D14,D15, D16 | Schottky Diode | −40° C./+85° C. | ±5% |
| D18 | 5.1 V, 225 mW Zener | −40° C./+85° C. | ±5% |
| D19,D20 | 8.7 V, 225 mW Zener | −40° C./+85° C. | ±5% |
| D21 | 47 V, 5W Zener | −40° C./+85° C. | ±5% |
| D22 | 5.6 V, 225 mW Zener | −40° C./+85° C. | ±5% |
| J1 | 30-pin Connector | −40° C./+85° C. | |
| L1,L2,L3,L4, L5,L6,L7,L8 | Ferrite Beads | −40° C./+85° C. | ±5% |
| PGA1 | Xilinx PGA | −40° C./+85° C. | Digital |
| Q1,Q2,Q3,Q4, Q5 | Logic-level FET | −40° C./+85° C. | Analog |
| Q6 | PNP Transistor | −40° C./+85° C. | |
| R1,R2,R3,R4, R5,R6 | 22K Resistor | −55° C./+125° C. | 1% |
| R7,R8,R9, R10,R11,R13, R20,R23 | 1.1K Resistor | −55° C./+125° C. | 1% |
| R12,R15,R16, R17,R28,R34, R46,R47,R48, R49,R50,R51, R58,R65, and R68–R82 | 10K Resistor | −55° C./+125° C. | 1% |
| R14 | 4.02K Resistor | −55° C./+125° C. | 1% |
| R18,R19,R21, R22,R26,R27, | 9.09K Resistor | −55° C./+125° C. | 1% |
| R24,R25,R63, R64,R67 | 100K Resistor | −55° C./+125° C. | 1% |
| R31 | 4.87M Resistor | −55° C./+125° C. | 1% |
| R32,R33 | 464K Resistor | −55° C./+125° C. | 1% |
| R35 | 1M Resistor | −55° C./+125° C. | 1% |
| R40 | 18.7K Resistor | −55° C./+125° C. | 1% |
| R41 | 21.5K Resistor | −55° C./+125° C. | 1% |
| R52,R53,R54, R55 | 301 ohm Resistor | −55° C./+125° C. | 1% |
| R56,R57 | 51 ohm Resistor | −55° C./+125° C. | 1% |
| R59,R60,R61 | 2K Resistor | −55° C./+125° C. | 1% |
| R62,R66 | 51.1K Resistor | −55° C./+125° C. | 1% |
| RT1, RT2 | THERMISTOR | −40° C./+85° C. | NA |
| U1 | Schmitt Trigger | −55° C./+125° C. | Digital |
| U2 | Switch Debouncer | −55° C./+125° C. | Digital |
| U3 | 5 V Regulator | −40° C./+125° C. | 5% |
| U4,U5 | EPROM | −40° C./+85° C. | Digital |
| U6,U7,U8 | Digital-analog Converter | −40° C./+85° C. | ±1/2LSB |
| U9 | Serial PROM | −40° C./+85° C. | Digital |
| U10,U11 | 10 V Regulator | −40° C./+85° C. | 5% |
| U12 | Oscillator/Divider | −55° C./+125° C. | Digital |
| U13 | Comparator | −40° C./+85° C. | Analog |
| U15,U16 | Op Amp | −55° C./+125° C. | Analog |
| Y1 | Oscillator | −40° C./+85° C. | .003% |

We claim:

1. A dual fuel system for an engine having a liquid fuel supply, a source of gaseous fuel, and a controller coupled to the supply, to the source and to the engine, the controller operating the engine in a first mode wherein it is supplied with liquid fuel only and in a second mode wherein it is supplied with both liquid and gaseous fuel, characterized by:

an engine speed sensor generating a speed signal representing a rotation speed of the engine; and the controller comprising means responsive to the speed signal for maintaining engine speed during dual fuel operation substantially the same as the engine speed during liquid fuel operation.

2. A dual fuel system for an engine having a liquid fuel supply, a source of gaseous fuel, a fuel select command device having a first position for commanding liquid fuel operation of the engine and having a second position for commanding dual liquid and gaseous fuel operation of the engine, and a controller responsive to the fuel select command device for operating the engine in a first mode wherein it is supplied with liquid fuel only and in a second mode wherein it is supplied with both liquid and gaseous fuel, characterized by:

an engine speed sensor generating a speed signal representing a rotation speed of the engine; and the controller comprises means responsive to the engine speed signal for automatically preventing conversion of the engine from liquid to dual fuel operation if the sensed engine speed is less than a certain speed.

3. A dual fuel system for an engine having a liquid fuel supply, a source of gaseous fuel, a fuel select command device having a first position for commanding liquid fuel operation of the engine and having a second position for commanding dual liquid and gaseous fuel operation of the engine, and a controller responsive to the fuel select command device for operating the engine in a first mode wherein it is supplied with liquid fuel only and in a second mode wherein it is supplied with both liquid and gaseous fuel, characterized by:

means for generating a load signal representing a load on the engine; and the controller comprises means responsive to the load signal for automatically preventing conversion of the engine from liquid to dual fuel operation if the engine load is less than a certain load.

4. A dual fuel system for an engine having a liquid fuel supply, a source of gaseous fuel, a fuel select command device having a first position for command liquid fuel operation of the engine and having a second position for commanding dual liquid and gaseous fuel operation of the engine, and a controller responsive to the fuel select command device for operating the engine in a first mode wherein it is supplied with liquid fuel only and in a second mode wherein it is supplied with both liquid and gaseous fuel, characterized by:

an air temperature sensor for sensing the temperature of engine intake air; and the controller comprises means responsive to the sensed air temperature for automatically preventing conversion of the engine from liquid to dual fuel operation if the sensed air temperature is greater than a certain temperature.

5. A dual fuel system for an engine having a liquid fuel supply, a source of gaseous fuel, and a controller coupled to the supply, to the source and to the engine, the controller operating the engine in a first mode wherein it is supplied with liquid fuel only and in a second mode wherein it is supplied with both liquid and gaseous fuel, characterized by:

an air temperature sensor for sensing the temperature of engine intake air; and the controller comprises means responsive to the sensed air temperature of automatically converting the engine from dual fuel operation to liquid operation if the sensed air temperature is greater than a certain temperature.

6. A dual fuel system for an engine having a liquid fuel supply, a source of gaseous fuel, and a controller coupled to the supply, to the source and to the engine, the controller operating the engine in a first mode wherein it is supplied with liquid fuel only and in a second mode wherein it is supplied with both liquid and gaseous fuel, characterized by:

an operator adjustable speed command device generating a signal representing a desired increase or decrease in operating speed of the engine; and the controller comprises means for receiving the signal from the speed command device and for automatically converting the engine from dual fuel operation to liquid fuel operation in response to adjustment of the speed command device to increase the operating speed of the engine and also in response to adjustment of the speed command device to decrease the operating speed of the engine.

7. The invention of claim 6, wherein the link controller comprises:

means for detecting completion of an adjustment to the engine speed; and means for automatically converting the engine back to dual fuel operation in response to the completion of an adjustment to the engine speed.

* * * * *